United States Patent [19]

Shirasaki et al.

[11] Patent Number: 5,639,431
[45] Date of Patent: Jun. 17, 1997

[54] HYDROGEN PRODUCING APPARATUS

[75] Inventors: Yoshinori Shirasaki, Kawaguchi; Masayuki Gondaira, Tokyo; Yoshu Ohta, Zushi; Hiroshi Uchida, Yokohama; Kennosuke Kuroda, Tokyo; Toshiyuki Uchida, Hiroshima; Yoshimasa Fujimoto, Hiroshima; Hiroshi Makihara, Hiroshima; Shinsuke Ohta, Hiroshima; Kazuto Kobayashi, Hiroshima, all of Japan

[73] Assignees: Tokyo Gas Co. Ltd.; Mitsubishi Jukogyo Kabushiki Kaisha, both of Tokyo, Japan

[21] Appl. No.: 213,802

[22] Filed: Mar. 16, 1994

[30] Foreign Application Priority Data

| Mar. 16, 1993 | [JP] | Japan | 5-055862 |
|---|---|---|---|
| Mar. 16, 1993 | [JP] | Japan | 5-055863 |
| Mar. 16, 1993 | [JP] | Japan | 5-055864 |
| Mar. 16, 1993 | [JP] | Japan | 5-055865 |
| Oct. 8, 1993 | [JP] | Japan | 5-252704 |
| Oct. 8, 1993 | [JP] | Japan | 5-252705 |
| Oct. 8, 1993 | [JP] | Japan | 5-252706 |

[51] Int. Cl.⁶ .................................................. B01J 8/02
[52] U.S. Cl. .......................... 422/212; 48/94; 48/127.9; 422/218
[58] Field of Search ................................. 422/204, 211, 422/212, 218; 48/94, 127.9; 423/652, 653, 655; 252/373

[56] References Cited

U.S. PATENT DOCUMENTS

| 3,208,198 | 9/1965 | Rubin | 55/16 |
|---|---|---|---|
| 3,595,805 | 7/1971 | Cohn et al. | 252/373 |
| 4,094,962 | 6/1978 | Cocuzza et al. | 423/573 |
| 4,254,086 | 3/1981 | Sanders | 422/187 |
| 4,376,759 | 3/1983 | Cook et al. | 423/648 |
| 4,393,038 | 7/1983 | Sun et al. | 423/584 |
| 4,460,673 | 7/1984 | Sukigara et al. | 430/128 |
| 4,490,349 | 12/1984 | Horvath | 423/657 |
| 4,496,373 | 1/1985 | Behr et al. | 55/16 |
| 4,528,003 | 7/1985 | Dittrich et al. | 55/158 |
| 4,692,306 | 9/1987 | Minet et al. | 48/94 |
| 4,713,234 | 12/1987 | Weirich et al. | 423/648 |
| 4,774,065 | 9/1988 | Penzhorn et al. | 423/210 |
| 4,781,734 | 11/1988 | Behr et al. | 55/16 |

(List continued on next page.)

FOREIGN PATENT DOCUMENTS

| 657241 | 4/1965 | Belgium . |
|---|---|---|
| 0015428 | 9/1980 | European Pat. Off. . |
| 0251979 | 1/1988 | European Pat. Off. . |
| 0360505 | 3/1990 | European Pat. Off. . |
| 47-15441 | 9/1972 | Japan . |

OTHER PUBLICATIONS

Derwent Publications Ltd., Ondon, G.B.; AN 91–047144/07 & JP-A-2 311 301 (Mitsubishi Heavy Ind KK), Week 9107, Dec. 26, 1990.

*Primary Examiner*—Robert J. Warden
*Assistant Examiner*—Robert Carpenter
*Attorney, Agent, or Firm*—Jacobson, Price, Holman & Stern, PLLC

[57] ABSTRACT

A hydrogen producing apparatus for producing hydrogen on an industrial scale by steam reforming reactions and separating hydrogen using a hydrogen-permeable membrane, including nested outer (14), intermediate (18) and inner (20) cylinders, a combustion burner (44) disposed toward the inner hollow chamber of the inner cylinder (20), a catalyst layer (A) in the annulus (30) between the intermediate (18) and inner (20) cylinders, hydrogen-permeable tubes (32) disposed in the catalyst layer (A-30), and sweep gas supply tubes (34) in the hydrogen-permeable tubes (32). The raw material gas is fed to the catalyst layer (A) and is converted into hydrogen at a high temperature produced by the burner (44), the produced hydrogen permeates the hydrogen-permeable tubes (32) which selectively separate and collect the hydrogen, and the permeated hydrogen flows with the sweep gas out of the apparatus through the outlet (52) for the sweep tubes (34).

30 Claims, 29 Drawing Sheets

U.S. PATENT DOCUMENTS

| | | | |
|---|---|---|---|
| 4,849,155 | 7/1989 | Penzhorn et al. | 376/146 |
| 4,861,347 | 8/1989 | Szydlowski et al. | 48/94 |
| 4,886,048 | 12/1989 | Labaton et al. | 165/104.27 |
| 4,892,142 | 1/1990 | Labaton | 165/134.1 |
| 4,909,808 | 3/1990 | Voecks | 48/94 |
| 4,921,680 | 5/1990 | Bonk et al. | 422/204 |
| 4,935,037 | 6/1990 | Koyama et al. | 48/94 |
| 4,981,676 | 1/1991 | Minet et al. | 423/552 |
| 5,226,928 | 7/1993 | Makabe et al. | 48/94 |
| 5,229,102 | 7/1993 | Min et al. | 423/652 |
| 5,326,550 | 7/1994 | Adris et al. | 423/652 |

F I G. 35
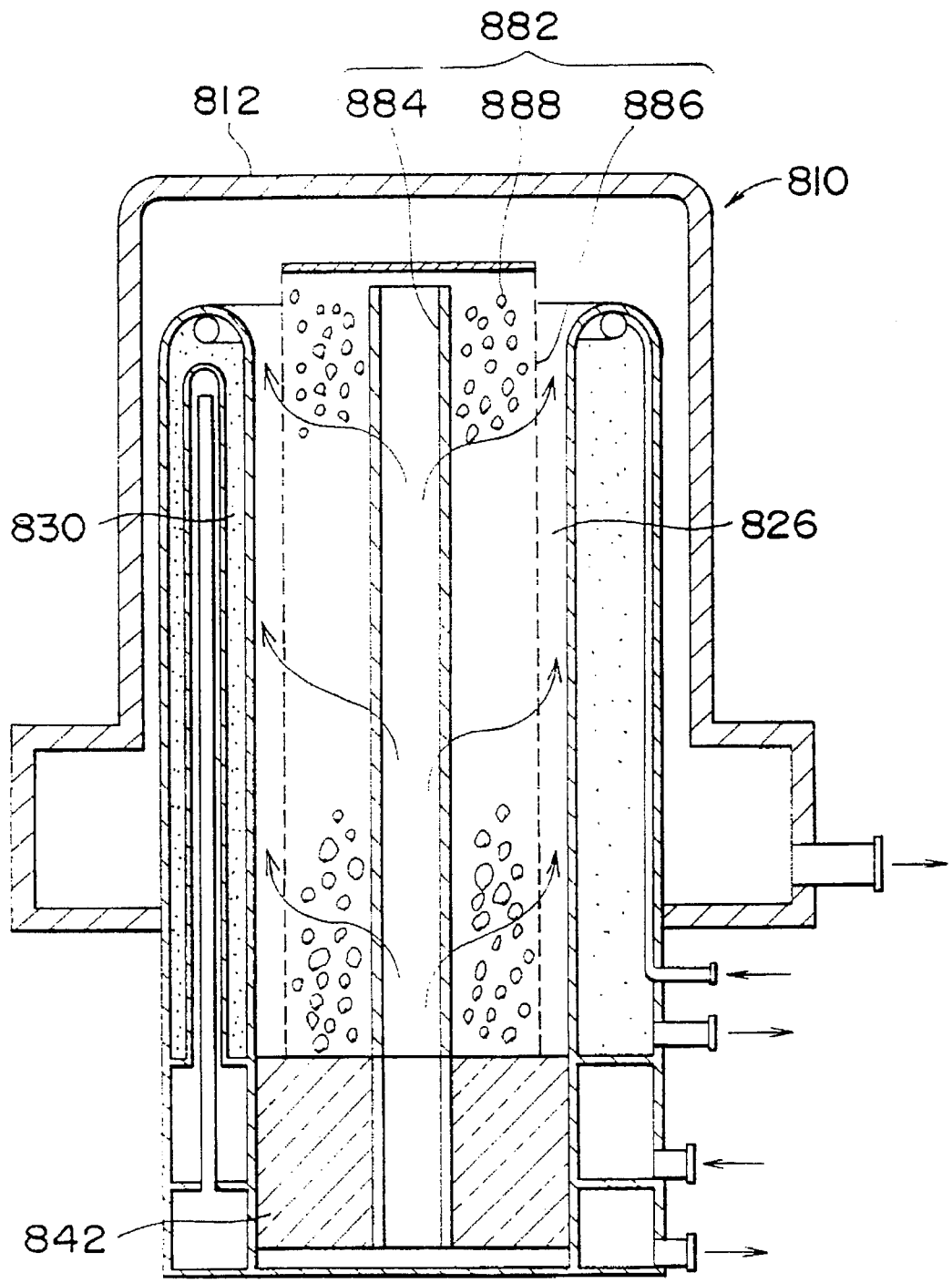

HYDROGEN PRODUCING APPARATUS

BACKGROUND OF THE INVENTION

This invention relates to an industrial scale hydrogen producing apparatus which manufactures hydrogen from a mixed gas of steam and either hydrocarbons or methanol through a steam reforming reaction. More specifically, this invention relates to an industrial scale hydrogen producing apparatus for obtaining hydrogen of sufficiently high purity for use in solid polymer fuel cells (polymer fuel cells) at low reaction temperatures.

The content of CO in hydrogen for fuel cells, in particular solid polymer fuel cells, is preferably less than 10 ppm. Hydrogen obtained from naphtha, natural gas and town gas through a steam reforming reaction has low purity and is not, as it is, suitable for fuel cells. Hydrogen obtained through steam reforming reactions is often further refined in a carbon monoxide reformer and a hydrogen refiner to boost the hydrogen purity to a desired degree.

This approach to obtaining high-purity hydrogen requires complex manufacturing processes. These processes require high temperature and high pressure equipment and significant heat energy, with resultant high production cost. Hydrogen produced through such processes cannot be economically used in fuel cells.

As disclosed in documents, such as Japanese Patent Provisional Publication (Kokai) No. 61-17401, proposals have been made to obtain high purity hydrogen using permeable membranes which is selectively permeable to hydrogen.

The above Provisional Publication, for example, disclosed a method and an apparatus for continuously separating generated hydrogen through a selective hydrogen-permeable partitioning wall, from a reaction space which is at a temperature of 500°–1000° C. This method and the required equipment can be applied to $CH_4/H_2O$ reforming reactions or reactions for producing water gas. The publication explained that it is possible to separate high purity hydrogen through this method.

Published documents, including the above publication, disclose a hydrogen producing apparatus on the scale of a laboratory, with its schematic chart shown in FIG. 9. In the conventional hydrogen producing apparatus shown in FIG. 9, reference numeral 90 indicates the reaction tube, 92 the reforming catalyst layer, and 94 the hydrogen permeation tube. The mixture of steam and hydrocarbon gas is introduced from below in the direction indicated by arrow X, reformed in the reforming catalyst layer 92, and hydrogen gas is generated. This hydrogen gas permeates the hydrogen-permeable tube 94 and flows out from the section marked with arrow Y. The reformed gas from which hydrogen has been removed flows out from the section indicated by arrow Z.

These published documents disclose hardly any method or means to boost the scale of laboratory apparatuses to an industrial level. It has not yet been determined how industrial scale production can be achieved using these laboratory-level technologies.

Many technical problems must be overcome to establish an economical hydrogen producing apparatus to boost the laboratory technologies for industrial-scale application.

One conceivable method to create a larger apparatus would involve arranging many parallel reaction tubes equipped with hydrogen permeation tubes in the reforming catalyst layer, such as the one shown in FIG. 9, and linking each inlet and outlet of these tubes with headers, so as to form a multi-tube reaction apparatus. This apparatus would have a large and complex structure, with low efficiency, low controllability and low heat efficiency. Constructing such a system would also require a large quantity of materials and would be difficult, and the equipment would thus be costly and uncompetitive.

The engineering issues, such as how separation means using hydrogen-permeable membranes could be structured or how the sections for reactions could be heated, are extremely important in increasing the scale of the apparatus. However, no specific examples or solutions for these problems have been indicated.

In order to make practical use of fuel cells a reality, it is also extremely important to supply low cost, high purity hydrogen. Creating hydrogen production techniques which are capable of producing high purity hydrogen on an industrial scale at low cost has been considered as a crucial, unresolved issue.

SUMMARY OF THE INVENTION

Given this background, the objective of the invention is to provide an industrial hydrogen producing apparatus having a novel structure, based on a laboratory-scale facility designed to separate and recover hydrogen generated through steam reforming reactions, by passing hydrogen through a selective hydrogen-permeable partitioning wall.

In order to achieve this goal this invention generally provides a hydrogen producing apparatus which comprises: an outer cylinder; an intermediate cylinder; an inner cylinder, the intermediate and inner cylinders being positioned within the outer cylinder and arranged in coaxial spaced relationship with respect to one another; a combustion burner disposed toward the inside of the inner cylinder; wherein the intermediate and inner cylinders are joined together at one end to form a closed circular portion, and a first annular space defined by the outer and intermediate cylinders is in communication with an inner cylinder inside space formed inside the inner cylinder; a catalyst layer formed by filling a reforming catalyst in a second annular space defined by the intermediate and inner cylinders; a hydrogen-permeable tube having hydrogen permeability and disposed in the catalyst layer in the second annular space; and a sweep gas tube having an open end and disposed within the hydrogen-permeable tube; whereby a raw material gas is introduced into the reforming catalyst layer in the second annular space so as to convert the raw material gas into hydrogen at a high temperature, the produced hydrogen permeates the hydrogen-permeable tube so as to be selectively separated and collected, and the hydrogen having permeated the tube is accompanied by sweep gas to be conducted out of the apparatus.

According to a first aspect of this invention, a hydrogen producing apparatus is provided in which hydrogen produced from a steam reforming reaction is separated and collected by passing through a partitioning wall having selective permeability to hydrogen, the apparatus comprising:

an upright outer cylinder having a closed bottom;

an intermediate cylinder and an inner cylinder disposed inside the outer cylinder in an upright manner and in coaxial spaced relationship, the inner cylinder being inside the intermediate cylinder;

a drooping combustion burner located on the ceiling wall of the inner cylinder; wherein the inner and intermediate cylinders define an inner annular space and an annular bottom with lower ends of the inner and intermediate cylinders being joined together, and the outer and intermediate cylinders define an outer annular space which is in communication with an inner cylinder inside space formed inside the inner cylinder at bottom portions of the cylinders;

a catalyst layer formed by filling a reforming catalyst in the inner annular space;

a plurality of hydrogen-permeable tubes having a hydrogen-permeable metal membrane on an inorganic porous layer, and the hydrogen-permeable cylinders being disposed in the inner annular space in an upright manner arranged along a circumference of the inner annular space; and a sweep gas tube having an open lower end and disposed within each of the hydrogen-permeable tubes;

whereby a raw material gas is introduced from a bottom of the inner annular space and flows upward in the reforming catalyst layer, so that the gas is converted into hydrogen at a high temperature, the produced hydrogen permeates the hydrogen-permeable tube and is selectively separated and collected, and the hydrogen having permeated is accompanied by sweep gas introduced from an upper portion of an annular space defined between the hydrogen-permeable tube and a sweep gas tube to be conducted through the sweep gas tube out of the apparatus from a top portion of the sweep gas tube.

According to a second aspect of this invention, a hydrogen producing apparatus is provided in which hydrogen produced from a steam reforming reaction is separated and collected by passing through a partitioning wall having selective permeability to hydrogen, the apparatus comprising:

an upright outer cylinder having a closed bottom;

an intermediate cylinder and an inner cylinder disposed inside the outer cylinder in an upright manner in coaxial spaced relationship, the inner cylinder being inside the intermediate cylinder;

a drooping combustion burner located on the ceiling wall of the inner cylinder;

a first annular space defined by the outer and intermediate cylinders being in communication with an inner cylinder inside space formed inside the inner cylinder at bottom portions thereof, and the intermediate cylinder and the inner cylinder defining a second annular space having a closed annular bottom formed by joining lower ends of the intermediate and inner cylinders;

a catalyst layer formed by filling a reforming catalyst in the second annular space; wherein a double-walled hydrogen-permeable cylinder has a hydrogen-permeable metal membrane on an inorganic porous layer and has outer, inner, and annular-bottom walls so as to form a third annular space, and the double-walled hydrogen-permeable tubes is disposed in the catalyst layer in an annular manner within the second annular space and in a substantially upright manner;

a sweep gas tube having an open lower end and disposed in the third annular space;

whereby a raw material gas is introduced from a top of the second annular space and flows downward in the reforming catalyst layer, so that the gas is converted into hydrogen at a high temperature, the produced hydrogen permeates the double-walled hydrogen-permeable tube and is selectively separated and collected, and the hydrogen having permeated is accompanied by sweep gas introduced from an upper portion of an annular space defined between the hydrogen-permeable tube and a sweep gas tube to be conducted through the sweep gas tube out of the apparatus from a top portion of the sweep gas tube.

According to a third aspect of this invention, a hydrogen producing apparatus is provided in which hydrogen produced from a steam reforming reaction is separated and collected by passing through a partitioning wall having selective permeability to hydrogen, the apparatus comprising:

an upright outermost cylinder having a closed bottom;

an outer cylinder, an intermediate cylinder and an inner cylinder disposed inside the outermost cylinder in an upright manner in coaxial spaced relationship, the inner cylinder being located inside the intermediate cylinder, the intermediate cylinder being located inside the outer cylinder, and the inner cylinder and the outer cylinder being joined together at their bottom ends so as to form a closed annular bottom;

a drooping combustion burner located on the ceiling wall of the inner cylinder;

a first annular space defined by the outermost and outer cylinders being in communication with an inner cylinder inside space formed inside the inner cylinder at bottom portions thereof, and a second annular space defined by the outer and intermediate cylinders being in communication with a third annular space defined by the intermediate and inner cylinders at bottom portions thereof;

a catalyst layer formed by filling a reforming catalyst in the third annular space; wherein a plurality of hydrogen-permeable cylinders each has a hydrogen-permeable metal membrane on an inorganic porous layer, and the hydrogen-permeable cylinders are disposed in the third annular space in an upright manner arranged along a circumference of the third annular space; and a sweep gas tube having an open lower end and disposed in each hydrogen-permeable tube;

whereby a raw material gas is introduced from a top of the second annular space and conducted into the reforming catalyst layer in the third annular space from a bottom thereof, so that the gas is converted into hydrogen at a high temperature, the produced hydrogen permeates the hydrogen-permeable tube and is selectively separated and collected, and the hydrogen having permeated is accompanied by sweep gas introduced from an upper portion of an annular space defined between the hydrogen-permeable tube and a sweep gas tube to be conducted through the sweep gas tube out of the apparatus from a top portion of the sweep gas tube.

According to a fourth aspect of this invention, a hydrogen producing apparatus is provided in which hydrogen produced from a steam reforming reaction is separated and collected by passing through a partitioning wall having selective permeability to hydrogen, the apparatus comprising:

an upright outermost cylinder having a closed bottom;

an outer cylinder, an intermediate cylinder and an inner cylinder disposed inside the outermost cylinder in an upright manner in coaxial spaced relationship, the inner cylinder being located inside the intermediate cylinder, the intermediate cylinder being located inside the outer cylinder, and the inner cylinder and the outer cylinder being joined together at their bottom ends so as to form a closed annular bottom;

a drooping combustion burner located on the ceiling wall of the inner cylinder; wherein a first annular space defined by the outermost and outer cylinders is in communication with an inner cylinder inside space formed inside the inner cylinder at bottom portions thereof, and a second annular space defined by the outer and intermediate cylinders is in communication with a third annular space defined by the intermediate and inner cylinders at bottom portions thereof;

first and second catalyst layers formed by filling a reforming catalyst in the second and third annular spaces, respectively;

a plurality of hydrogen-permeable cylinders each having a hydrogen-permeable metal membrane on an inorganic porous layer, the hydrogen-permeable cylinders being disposed in the third annular space in an upright manner arranged along a circumference of the third annular space; and a sweep gas tube having an open lower end and disposed in each hydrogen-permeable tube;

whereby a raw material gas is introduced from a top of the third annular space and flows downward in the second catalyst layer, so that the gas is converted into hydrogen at a high temperature, and subsequently the raw material gas is conducted into the first catalyst layer so that an unreacted portion of the gas is converted into hydrogen, the produced hydrogen permeates the hydrogen-permeable tube and is selectively separated and collected, and the hydrogen having permeated is accompanied by sweep gas introduced from an upper portion of an annular space defined between the hydrogen-permeable tube and a sweep gas tube to be conducted through the sweep gas tube out of the apparatus from a top portion of the sweep gas tube.

According to a fifth aspect of this invention, provided is a hydrogen producing apparatus, in which hydrogen produced from a steam reforming reaction is separated and collected by passing through a partitioning wall having selective permeability to hydrogen, the apparatus comprising:

an upright outer cylinder closed at a top thereof with a ceiling wall;

an intermediate cylinder and an inner cylinder disposed inside the outer cylinder in an upright manner in coaxial spaced relationship the inner cylinder being located inside the intermediate cylinder;

an upright combustion burner located on the bottom wall of the inner cylinder, the burner producing upwardly directed flame; wherein the intermediate and inner cylinders define an inner annular space and form a close annular connecting top portion with top ends of the intermediate and inner cylinder being joined together, and an outer annular cylinder defined by the outer and intermediate cylinders is in communication with an inner cylinder inside space formed inside the inner cylinder at top portions thereof;

a catalyst layer formed by filling a reforming catalyst in the inner annular spaces;

a plurality of hydrogen-permeable cylinders each having a hydrogen-permeable metal membrane on an inorganic porous layer, the hydrogen-permeable cylinders being disposed in the catalyst layer in a substantially upright manner arranged along a circumference of the inner annular space; and a sweep gas tube having an open upper end and disposed in each hydrogen-permeable tube;

whereby a raw material gas is introduced from a top of the inner annular space and flows downward in the catalyst layer, so that the gas is converted into hydrogen at a high temperature, the produced hydrogen permeates the hydrogen-permeable tube and is selectively separated and collected, and the hydrogen having permeated is accompanied by sweep gas introduced from a lower portion of an annular space defined between the hydrogen-permeable tube and a sweep gas tube to be conducted through the sweep gas tube out of the apparatus from a bottom portion of the sweep gas tube.

According to a sixth aspect of this invention, a hydrogen producing apparatus is provided in which hydrogen produced from a steam reforming reaction is separated and collected by passing through a partitioning wall having selective permeability to hydrogen, the apparatus comprising:

an upright outer cylinder closed at a top thereof with a ceiling wall;

an intermediate cylinder and an inner cylinder disposed inside the outer cylinder in an upright manner in coaxial spaced relationship, the inner cylinder being inside the intermediate cylinder;

an upright combustion burner located on the bottom wall of the inner cylinder, the burner producing upwardly directed flame; wherein a first annular space defined by the outer and intermediate cylinders is in communication with an inner cylinder inside space formed inside the inner cylinder at top portions thereof, and the intermediate and inner cylinders define a second annular space having a closed annular top formed by joining upper ends of the intermediate and inner cylinders;

a catalyst layer formed by filling a reforming catalyst in the second annular space;

a double-walled hydrogen-permeable cylinder having a hydrogen-permeable metal membrane on an inorganic porous layer and having outer, inner, and annular-top walls so as to form a third annular space, the double-walled hydrogen-permeable tubes being disposed in the catalyst layer in an annular manner within the second annular space and in a substantially upright manner; and a sweep gas tube having an open upper end and disposed in the third annular space;

whereby a raw material gas is introduced from a lower portion of the second annular space and flows upward in the reforming catalyst layer, so that the gas is converted into hydrogen at a high temperature, the produced hydrogen permeates the double-walled hydrogen-permeable tube and is selectively separated and collected, and the hydrogen having permeated is accompanied by sweep gas introduced from a lower portion of an annular space defined between the hydrogen-permeable tube and a sweep gas tube to be conducted through the sweep gas tube out of the apparatus from a bottom portion of the sweep gas tube.

According to a seventh aspect of this invention, a hydrogen producing apparatus is provided, in which hydrogen produced from a steam reforming reaction is separated and collected by passing through a partitioning wall having selective permeability to hydrogen, the apparatus comprising:

an upright outer cylinder closed at a top thereof with a ceiling wall;

an outer cylinder, an intermediate cylinder and an inner cylinder disposed inside the outermost cylinder in an upright manner in coaxial spaced relationship, the inner cylinder being located inside the intermediate cylinder, the intermediate cylinder being located inside the outer cylinder, and the inner cylinder and the outer cylinder being joined together at their bottom ends so as to form a closed annular bottom;

an upright combustion burner located on the ceiling wall of the inner cylinder, the burner producing upwardly directed flame; wherein a first annular space defined by the outermost and outer cylinders is in communication with an inner cylinder inside space formed inside the inner cylinder at top portions thereof, and a second annular space defined by the outer and intermediate cylinders is in communication with a third annular space defined by the intermediate and inner cylinders at top portions thereof;

first and second catalyst layers formed by filling a reforming catalyst in the second and third annular spaces, respectively;

a plurality of hydrogen-permeable cylinders each having a hydrogen-permeable metal membrane on an inorganic porous layer, the hydrogen-permeable cylinders being disposed in the third annular space in an upright manner arranged along a circumference of the third annular space; and a sweep gas tube having an open upper end and disposed in each hydrogen-permeable tube;

whereby a raw material gas is introduced from a lower portion of the third annular space and flows upward in the second catalyst layer, so that the gas is converted into hydrogen at a high temperature, and subsequently the raw material gas is conducted into the first catalyst layer so that an unreacted portion of the gas is converted into hydrogen, the produced hydrogen permeates the hydrogen-permeable tube and is selectively separated and collected, and the hydrogen having permeated is accompanied by sweep gas introduced from a lower portion of an annular space defined between the hydrogen-permeable tube and a sweep gas tube to be conducted through the sweep gas tube out of the apparatus from a bottom portion of the sweep gas tube.

The raw material gas to be introduced into the hydrogen producing apparatus according to this invention is a mixture of steam, an alcohol such as methanol, and light hydrocarbons such as natural gas, naphtha and town gas. The reforming catalyst used in this invention can be any convention catalyst for the steam reforming manufacture of hydrogen from the above mentioned raw material gas.

The hydrogen producing apparatus according to this invention has a vertical furnace formed with the inner cylinder. The structure includes layered cylinders incorporating upright intermediate and outer cylinders disposed outside the inner cylinder. The apparatus sometimes has an outermost cylinder disposed outside outer, intermediate and inner cylinders. The inner annulus (including the second and third annuluses in certain cases) contains a catalyst layer filled with reforming catalyst. Installing hydrogen-permeable tubes (or double-walled hydrogen-permeable tubes in some cases) in the catalyst layer creates a reaction/separation process region. Cylindrical structures are preferable, because they ensure uniform thermal flux distribution in the radius direction within the structure of concentric, layered cylinders, with the furnace located in the center. This prevents the generation of hot spots at which temperature may exceed the limit the hydrogen permeation tubes can withstand.

The raw material gas (process feed gas) is introduced into the inner annular space by means of conventional methods. The gas is modified into hydrogen when passing through the reforming catalyst layer. The hydrogen thus generated permeates the hydrogen-permeable tubes and is swept along with sweep gas, introduced from the annulus formed between the hydrogen-permeable tube and the sweep gas tube.

A typical method to introduce and dissipate the process feed gas would include arranging circular pipe headers with multiple spray nozzles around the circumference of the lower section of the inner annulus.

The endothermic steam reforming reaction absorbs heat, necessitating a drooping combustion burner installed in the ceiling of the internal cylinder or an upright combustion burner install on the bottom thereof. The drooping combustion burner is designed with its flames directed downward, and conventional burners can be used for this purpose. The upright combustion burner produces upwardly directed flames, and conventional burners can also be used as this type of burner.

Installing a drooping combustion burner in the top section of the furnace lessens burner stains, reduces burner cleaning requirements, and simplifies inspection and maintenance. As no space needs to be provided below the burner's floor for burner inspection and maintenance, the total height of the furnace can be reduced, resulting in cost savings for the manufacture of the whole hydrogen producing apparatus.

The combustion gas descends inside the inner cylinder and enters an annulus from the base of the inner cylinder. While ascending, the combustion gas heats the reforming catalyst layer in the internal annulus, and exits from the upper section of the external annulus. Heating the reforming catalyst layer from both sides ensures more uniform heating.

An upright combustion burner installed in the base of the furnace will have upwardly directed flames, complying with the flame buoyancy direction and with the combustion gas flow direction, thereby improving flame stability. The combustion gas rises in the space inside the inner cylinder, then enters the top of the external annulus. As it descends, the combustion gas heats the catalyst layer in the internal annulus, and exits from the lower section of the external annulus. The internal annulus catalyst layer is also heated uniformly as heat is applied from both sides.

The hydrogen-permeable tube is equipped with a hydrogen-permeable metal membrane on a porous inorganic layer. The tube selectively allows hydrogen to permeate. The reaction apparatus, incorporating the hydrogen-permeable tube, is called a membrane reactor, and this technology is already known.

The double-walled hydrogen-permeable cylinders used in this invention have inner and outer walls, and are designed to make the membrane reactor more economical.

Methane is employed as a typical hydrocarbon to explain the operation of the hydrogen-permeable tube. The methane reforming reaction progresses at a reaction temperature of 500°–1000° C. until chemical equilibrium is reached. The reaction equation is:

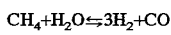

$$CH_4 + H_2O \rightleftharpoons 3H_2 + CO$$

The conversion is encouraged at the same temperature by separating the generated hydrogen from generated products via the hydrogen-permeable tube, or by reducing the hydrogen partial pressure in the generated products, because according to the above equation, the chemical reaction proceeds further to the right hand side. In other words, the conversion efficiency can therefore be increased without a rise in reaction temperature. Although conventional methane reforming methods require a reaction temperature of about 800° C., the hydrogen producing apparatus according to this invention makes it possible to obtain the same conversion ratio at 500°–600° C., utilizing hydrogen-permeable tubes or cylinders.

The amount ($Q_H$) of hydrogen permeating per square centimeter of the hydrogen-permeable metal membrane on the hydrogen-permeable tube is proportional to the difference between the square roots of the partial pressures of hydrogen before and after passing the membrane: $(Ph)^{1/2}-(Pl)^{1/2}$. This means: $Q_H k\{(Ph)^{1/2}-(Pl)^{1/2}\}$, where K is a constant.

As mentioned, it is possible to shift the chemical reaction to the right hand side of the equation by collecting hydrogen using hydrogen-permeable tubes (or a hydrogen-permeable cylinder). The reforming temperature consequently can be dropped by 150°–200° C., significantly improving the thermal efficiency. Also, because the reaction temperature is low, the equipment can be constructed of inexpensive materials with relatively lower thermal resistance, thereby reducing costs.

Also, it should be noted that while the raw material gas flows into the catalyst layer, the sweep gas flows in the opposite direction. The hydrogen partial pressure is therefore significantly lowered because the generated hydrogen is almost completely swept in the area close to the catalyst layer outlet. Introducing the sweep gas improves the conversion efficiency of the entire reforming catalyst layer. The generated hydrogen collection efficiency is improved by the counter-current material transfer caused by the sweep gas in the hydrogen-permeable tube and reforming gas in the catalyst layer. Steam and inert gases such as nitrogen and helium can be used as the sweep gas in this hydrogen producing apparatus.

The amount of hydrogen which permeates the hydrogen-permeable tube can be increased by raising the difference between the partial pressures of hydrogen on the prepermeation and after-permeation sides. This is done by circulating sweep gas on the after-permeation side to reduce the partial pressure of hydrogen. Other means to reduce the partial pressure of hydrogen on the after-permeation side include the use of a suction pump.

The hydrogen-permeable metal membrane on the hydrogen-permeable tube (or double-walled hydrogen-permeable cylinders in some cases) selectively allows only hydrogen to permeate. As the hydrogen separated through the hydrogen-permeable tube is extremely pure, it is suitable for use in the solid fuel molecular cells.

The 5–50 μm thick hydrogen-permeable metal membrane is formed on the inorganic porous layer, and is able to selectively permeate hydrogen. The inorganic porous layer functions as carrier to support the hydrogen-permeable metal membrane. The 0.1–1 mm thick inorganic porous layer is created from materials such as ceramic, glass, or porous stainless steel, non-woven fabric. Single or multi-layer metal mesh is incorporated in the porous layer to boost its structural strength. Although there are no restrictions on the hydrogen-permeable tube's dimensions, the most economical configuration is a 20 mm diameter cylinder.

According to the fourth and seventh aspects of this invention described above, intermediate, outer and outermost upright cylinders can be nested outside the inner cylinder which forms a vertical furnace. In such an arrangement, the first and second catalyst layers are created by filling the second and third annuluses, respectively, with reforming catalyst. A reaction/separation region is created by installing a hydrogen-permeable tube in the first catalyst layer. Preferably, cylindrical vessels should be used because the structure of concentric cylinders with the furnace arranged in the center assists a uniform distribution of thermal flux in radial directions and also prevents the development of hot spots where the temperature may exceed the temperature limit of the hydrogen-permeable tube.

As the raw material gas is heated, the reformation of hydrocarbons progresses in the second catalyst layer. The gas flows into the first catalyst after the temperature and the partial pressure of hydrogen reach maximum values near the catalyst layer outlet. The reforming reaction progresses further as hydrogen is extracted through the hydrogen-permeable tube. The partial pressure of hydrogen in the raw material gas significantly drops as it moves toward the outlet of the first catalyst layer. Therefore, the partial pressure of hydrogen is generally lower in the first catalyst layer. The temperature of the second catalyst layer is somewhat higher around the inner cylinder than in the first catalyst layer because the inner cylinder forms the furnace wall in the center and is heated. Thus the distribution of temperature, hydrogen partial pressure, and gas composition varies in each catalyst layer. It is therefore preferable to select catalysts which are active and durable under the conditions found in each catalyst layers. However, since a catalyst suitable for both the first and second catalyst layers is actually available, a single catalyst may be used in both catalyst layers.

The raw material gas (process feed gas) is introduced through the upper section of the third annulus and converted into hydrogen at high temperatures, as it flows through the second catalyst layer. This gas then flows into the bottom section of the first catalyst layer, where any gas which has not reacted is converted into hydrogen. The generated hydrogen passes through the hydrogen-permeable tube for selective separation and collection. The sweep gas enters the upper part of the annulus created between the hydrogen-permeable tube and the sweep gas tube. The sweep gas and hydrogen flow through the sweep gas tube and out of the hydrogen outlet.

The process feed gas is reformed into hydrogen at a high conversion efficiency as it passes through the high temperature second catalyst layer, which is located in the third annulus immediately inside the inner furnace cylinder composing a furnace. The reformed hydrogen is separated and collected through a hydrogen-permeable tube in the second annulus. Any portion of process feed gas which has not reacted is reformed in the first catalyst layer. Thus, the overall conversion efficiency is significantly improved.

Furthermore, according to the fourth and seventh aspects of this invention, hydrogen is generated in the second catalyst layer, but is not separated or collected through the hydrogen-permeable tubes there. Therefore, the partial pressure of hydrogen in the product gas rises at the outlet of the second catalyst layer; that is, at the inlet of the first catalyst layer. This increases forces to transfer substances to improve the efficiency of separation and collection of hydrogen through the hydrogen-permeable tube in the first catalyst layer. It is therefore possible to reduce the area allotted for gas permeation.

Also, when a taller and larger design is adopted for a hydrogen producing apparatus the reforming catalyst layer and the hydrogen-permeable tube also have to be taller. As a result, the difference in thermal expansion between the reforming catalyst layer and the hydrogen-permeable tube becomes significant. The consequent friction between the reforming catalyst layer and the hydrogen-permeable tube may cause the reforming catalyst to become powder due to the friction. In conventional hydrogen producing apparatuses, the upper part of the hydrogen-permeable tube is fixed while the lower end is left free, permitting movement at the lower end. This causes notable powdering of the reforming catalyst as it is pressed and destroyed.

However, the upper end of the hydrogen-permeable tube in the hydrogen producing apparatus, according to the fifth and seventh aspects of this invention, is free while its lower section is fixed. This eliminates pressure on or destruction of the reforming catalyst for taller hydrogen producing apparatuses, thereby reducing the likelihood of the reforming catalyst powdering as a result of friction. The reforming catalyst layer can therefore be taller than in conventional apparatuses, enabling use of a comparatively low strength reforming catalyst in a large hydrogen producing apparatus.

The hydrogen-permeable metallic membrane should preferably be made of a non-porous layer of an alloy containing Pd, V or N, such as: Pd-containing alloys including Pd—Ag alloys, Pd—Y alloys, Pd—Ag—Au alloys; V-containing alloys including V—Ni alloys and V—Ni—Co alloys; and Ni-containing alloys including LaNi$_5$ alloys. A suitable manufacturing method for the non-porous Pd layer is disclosed in U.S. Pat. Nos. 3,155,467 and 2,773,561.

In preferable embodiments, a cylindrical radiating body should be placed to surround the frame formed by the combustion burner flame within the inner cylinder. The radiating body radiates heat to raise the temperature of the reforming catalyst layer, and this ensures the required heat flux is available and undesirable partial or uneven heating of the hydrogen-permeable tube is avoided. This also makes it possible to maintain a uniform temperature distribution of the reforming catalyst layer. The temperature of the hydrogen-permeable tube should not be raised above 800° C. because of its heat resistance characteristics.

The radiating body should preferably have a porous wall so that the combustion gas can flow through the porous wall to efficiently heat the radiating body.

A dual arrangement comprising an inner cylindrical radiating body and an outer cylindrical radiating body is preferred as another example of the radiating body arrangement. In the first to fourth aspects of this invention, the combustion gas flows down inside the inner cylindrical radiating body, and then up the annulus created by the inner and outer radiating bodies, and down again in a space between the outer cylindrical radiating body and the inner cylinder mentioned above, so as to efficiently heat the radiating bodies. In the fifth to seventh aspects of this invention, the vertical flow of the combustion gas is turned up side down as compared with the first to fourth aspects of the invention because the general arrangement of the whole apparatus including the burner is turned that way.

In another preferable embodiment for the first to fourth aspects of the invention, the radiating body is preferably cylindrical and has an opening in its lower part, and the top of the radiating body is spaced apart from the ceiling of the inner cylinder. In this arrangement, the combustion gas can flow downward inside the radiating body, and a part of the gas flows upward in an annular space defined by the inner cylinder and the radiating body via the opening, and the gas flows down again inside the radiating body via the gap formed between the top of the radiating body and the ceiling of the inner cylinder, so as to circulate the inside and outside of the radiating body.

On the other hand, for the fifth to seventh aspects of the invention, the radiating body is preferably cylindrical and has an opening in its upper part, and the bottom of the radiating body is spaced apart from the bottom of the inner cylinder. In such arrangement, the combustion gas can flow upward inside the radiating body, and a part of the gas flows downward in an annular space defined by the inner cylinder and the radiating body via the opening, and the gas flows up again inside the radiating body via the gap formed between the bottom of the radiating body and the bottom of the inner cylinder, so as to circulate the inside and outside of the radiating body.

An alternative embodiment of the invention is a column-shaped catalytic combustion apparatus in the inner cylinder in place of the combustion burner. In this case, the catalytic combustion apparatus serves as a combustion burner as well as a radiating body, and can heat the reforming catalyst layer uniformly.

BRIEF DESCRIPTION OF THE DRAWINGS

The invention will now be described in detail with reference to the accompanying drawings wherein:

FIG. 35 is a longitudinal sectional view of embodiment 15 of the invention;

DETAILED DESCRIPTION OF THE PREFERRED EMBODIMENTS

The following detailed description of this invention is based on the embodiments and in the accompanying drawings.

Figure 1:
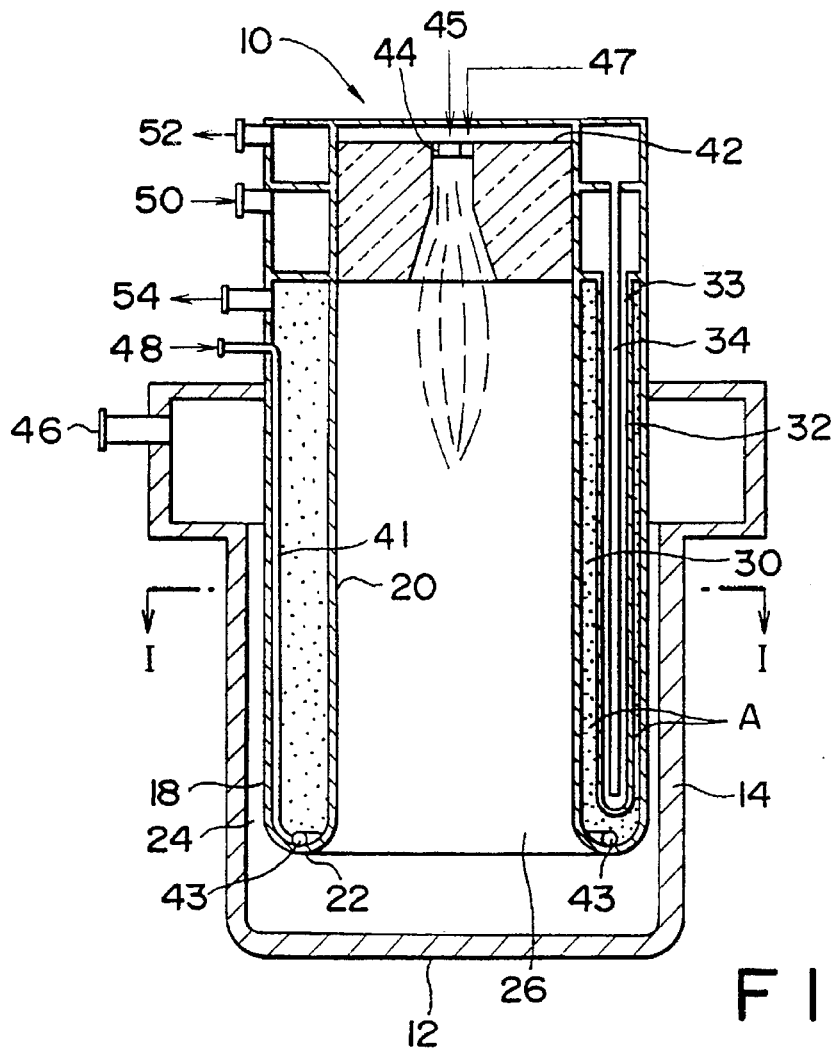
FIG. 1 schematically illustrates a cross-sectional view of a first embodiment of the hydrogen producing apparatus according to the first aspect of the invention.
Figure 2:
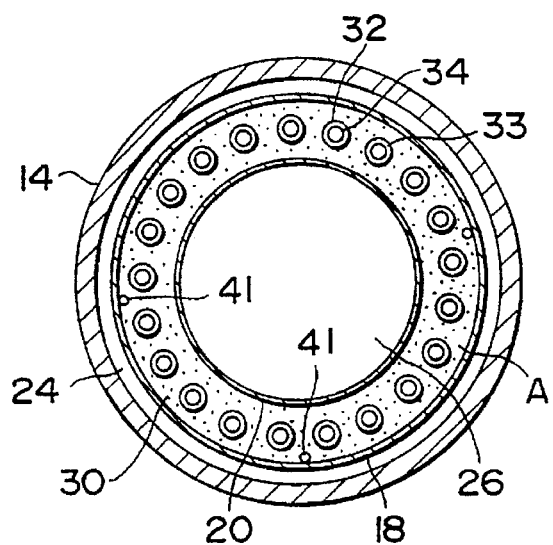
FIG. 2 is a typical cross-sectional view taken along the line I—I of the hydrogen producing apparatus in FIG. 1.

FIG. 1 is an schematically illustrated sectional view of one embodiment of the hydrogen producing apparatus according to the first aspect of the invention. FIG. 2 is an outlined transverse sectional view along the line I—I on the apparatus shown in FIG. 1.

FIGS. 1 and 2 show the hydrogen producing apparatus 10, an outer cylinder 14 with a closed base 12, and an intermediate cylinder 18 and inner cylinder 20 installed in a concentric manner within the outer cylinder. The outer cylinder 14, intermediate cylinder 18 and inner cylinder 20 form an upright, cylindrical structure.

The lower sections of the inner cylinder 20 and the intermediate cylinder 18 are connected to each other, forming a closed annular base section 22. The walls of the outer cylinder 14 and the intermediate cylinder 18 create an outer annulus 24. The outer annulus 24 and the space 26 within the inner cylinder 20 are open so that they communicate at their bottoms. The intermediate cylinder 18 and inner cylinder 20 create an inner annulus 30.

A route for the combustion gas is created by continuous paths going from the inner hollow chamber 26, through the gap between the bottom section 12 and the annular base 22 of the outer cylinder 14, and to the outer annulus 24. The side wall and the bottom wall 12 of the outer cylinder 14 are constructed of fire resistant bricks.

The catalyst layer 30 in the inner annulus 30 (for convenience, we use the same numeral for both components) is filled with reforming catalyst A. FIG. 2 shows a number of cylindrical hydrogen-permeable tubes 32 in the catalyst layer 30. The tubes are each equipped with a hydrogen-permeable metal membrane on an inorganic porous layer and are positioned vertically around the circumference of the inner annulus 30. Cylindrical, stainless steel sweep gas tubes 34 are installed in a concentric manner within the hydrogen-permeable tubes 32.

Figure 3:
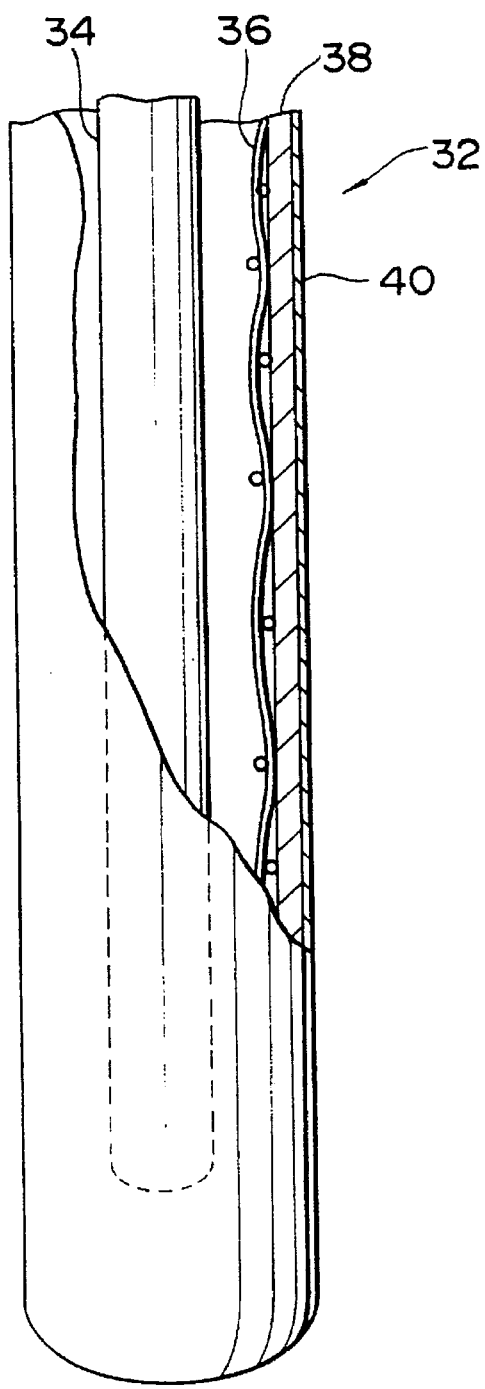
FIG. 3 is an enlarged partial cross-sectional view of the hydrogen-permeable tube shown in FIG. 1.

As shown in FIG. 3, each hydrogen-permeable tube 32 has a closed base and has an external diameter of about 20 mm. It also has an internal support material made of stainless steel mesh 36. An inorganic porous layer 38 made of stainless steel non-woven cloth is disposed around the mesh 36 and acts as a supporting frame for the hydrogen-permeable metal membrane, which is essentially a coated non-porous Pd-based alloy membrane 40. The hydrogen-permeable tubes in each embodiment which will be discussed in the following share a similar structure.

As shown in FIG. 1, the process feed gas enters the lower section of the inner annulus 30 through an introduction tube 41 running from the raw material gas inlet 48 to the reforming catalyst layer 30 of the inner annulus 30. The tube extends to the bottom of the inner annulus 30. The tube 41 is connected to an annular pipe header 43, which has many spray nozzles at its bottom.

Figure 4:
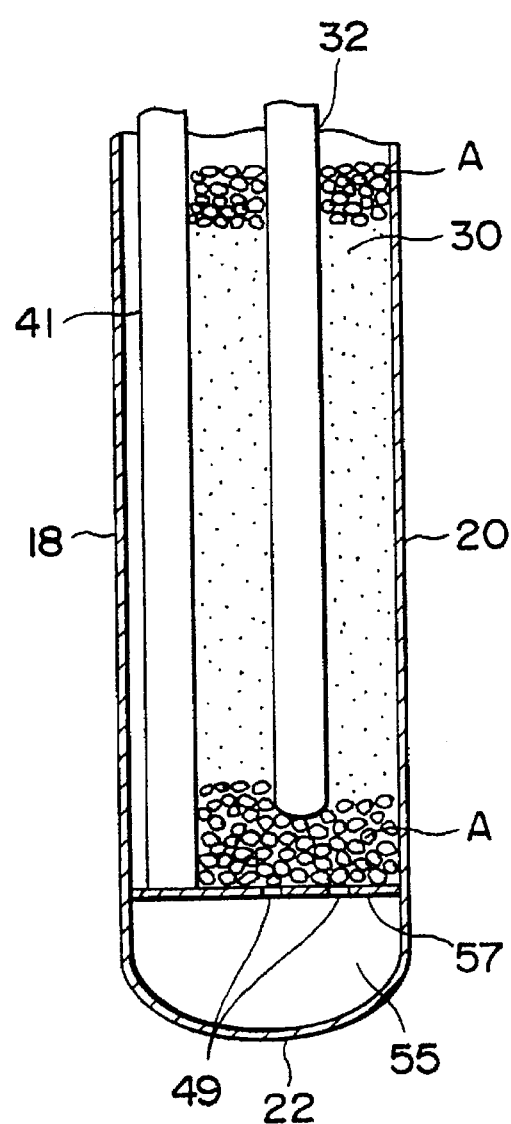
FIG. 4 is a further enlarged cross-sectional view which shows the raw material gas distribution means of the hydrogen producing apparatus shown in FIG. 1.

FIG. 4 shows an alternate distribution means in which an annular space 55 is formed by partitioning the bottom portion of the inner annulus with a partitioning plate 57, and the raw material gas introduction tube 41 is connected to the annular space 55. Many small penetration pores 49 are formed in the partitioning plate 57.

A drooping combustion burner 44 with a downward-facing burner is installed on the ceiling 42 of the top section of the inner cylinder 26. The combustion burner 44 is connected to a fuel gas tube 45 and an air intake tube 47.

Referring to FIGS. 1 and 2, the operation process of the hydrogen producing apparatus 10 will be described in the following. The drooping combustion burner 44 burns fuel gas introduced via a fuel gas tube 45, uses air taken in via an air intake tube 47, and maintains the prescribed temperatures by supplying the heat energy necessary for the steam reforming reaction in the reforming catalyst layer 30.

The combustion gas flows inside the inner chamber 26, through the space created between the base 12 of the outer cylinder 14 and its annular bottom 22, then through the outer annulus 24, and is emitted from the combustion gas outlet 46. During this process the combustion gas heats both sides of the catalyst layer of the inner annulus 30, thereby maintaining a uniform temperature distribution.

The process feed gas is a mixture of either light hydrocarbons or methanol and steam. The gas flows through the raw material gas introduction tube 41, the pipe header 43, the bottom section of the inner annulus 30, then into the reforming catalyst layer 30. The raw material gas is converted into hydrogen at a high temperature. The generated hydrogen is selectively separated and collected via the hydrogen-permeable tubes 32. The hydrogen and the sweep gas exit via the hydrogen outlet 52 in the upper part of the tubes 32.

The sweep gas is fed from the sweep gas inlet 50 located in the top part of the apparatus 10. The gas flows down through the annulus 33 between the sweep gas tube 34 and the hydrogen-permeable tube 32, and flows into the open lower end of the sweep gas tube 34, sweeping the hydrogen as it flows down. The gas and generated hydrogen rise and flow out of the hydrogen outlet 52. By removing the hydrogen with the sweep gas, the partial pressure of hydrogen on the after-permeation side of the hydrogen-permeable tube is reduced. Steam or an inert gas, for example, can be used as the sweep gas.

The generated CO and $CO_2$, plus any raw material gas which has not reacted after passing through the reforming catalyst layer 30, exit the system via the off gas outlet 54.

In this example, the reforming catalyst layer 30 is heated from both sides, thereby maintaining a more uniform temperature distribution. This also prevents local overheating in the hydrogen-permeable tube.

Figure 5:
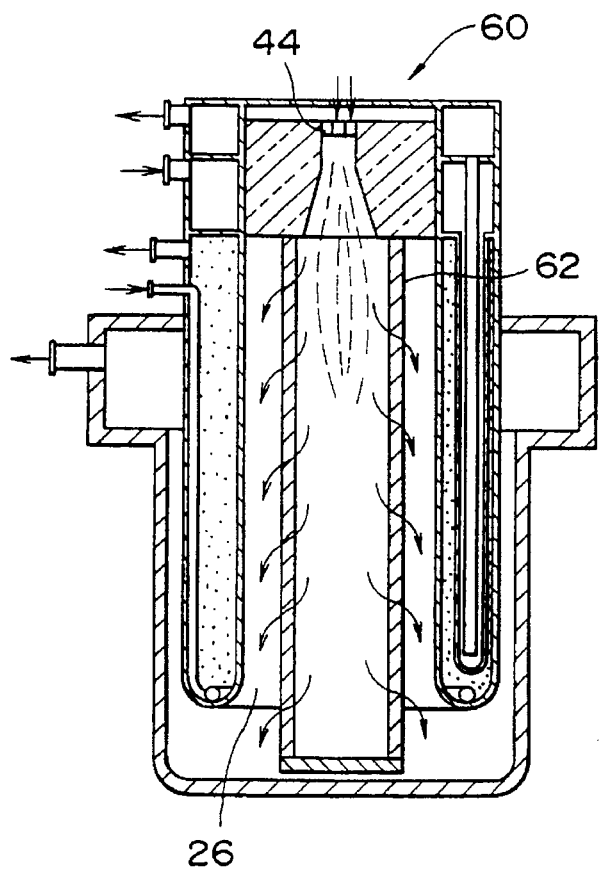
FIG. 5 is a sectional view of embodiment 2 of the invention.
Figure 6:
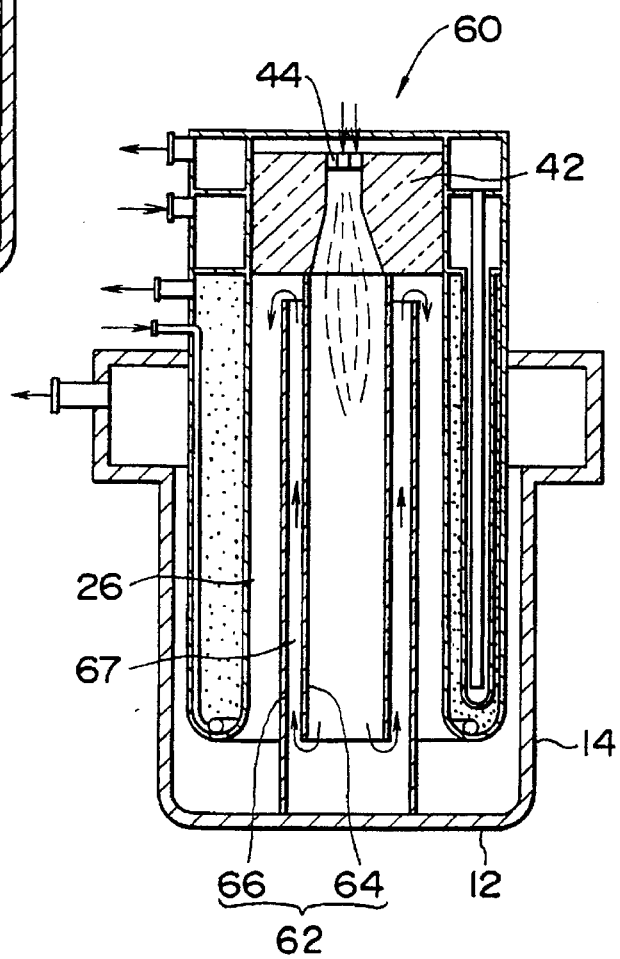
FIG. 6 is a sectional view of modified embodiment 2.
Figure 7:
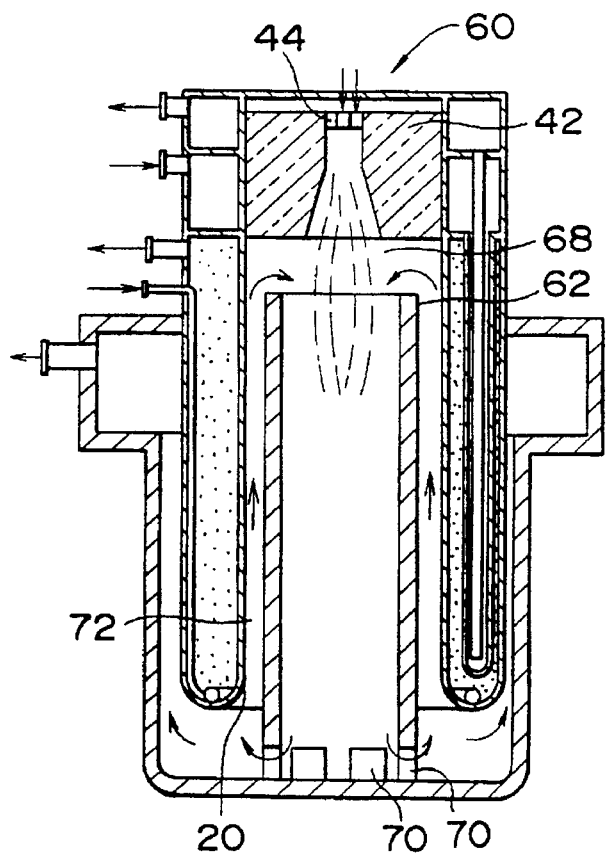
FIG. 7 is a sectional view of another modification of embodiment 2.

Referring to FIGS. 5 to 7, another embodiment (embodiment 2) according to the first aspect of the invention will be described. In the following, only details in the embodiment shown in FIGS. 5 to 7 which are different from those in FIGS. 1 and 2 will be discussed, omitting discussion of similar parts.

A cylindrical radiating body 62 is installed in the inner cylinder space 26 of the hydrogen producing apparatus 60 so as to surround the flame of the drooping combustion burner 44 as shown in FIG. 5. The radiating body 62 has a cylindrical structure with porous walls. The combustion gas from the combustion burner 44 permeates the porous walls and flows out into the inner cylinder space 26. The combustion gas heats the radiating body 62 during this process, ensuring a virtually uniform temperature distribution. The heated radiating body 62 heats the reforming catalyst layer 30 evenly, with an almost uniform heat flux.

The hydrogen producing apparatus 60 in FIG. 6 has another radiating body 62 which is a modification of what is shown in FIG. 5. The radiating body assembly 62 in FIG. 6 forms a dual cylindrical structure composed of inner and outer cylinder radiating bodies 64 and 66. Although the inner cylinder radiating body 64 is in contact with the ceiling 42 of the inner cylinder 20, there is a gap between it and the bottom 12 of the outer cylinder 14. The outer cylinder radiating body 66 is in contact with the bottom 12, but is spaced apart from the ceiling 42.

The combustion gas flows down from the drooping combustion burner 44, through the inner cylinder radiating body 64, then moves up through the annulus 67 between the inner cylinder radiating body 64 and the outer cylinder radiating body 66. The gas then flows into the inner cylinder space 26 from the top section of the outer cylinder radiating body 66. The combustion gas heats the inner cylinder radiating body 64 and the outer cylinder radiating body 66 during this process, creating a substantially uniform overall temperature distribution. The heated inner cylinder radiating body 64 and outer cylinder radiating body 66 heat the reforming catalyst layer 30 in an even manner with substantially uniform heat flux.

The hydrogen producing apparatus 60 in FIG. 7 illustrates another modification of the radiating body 62 shown in FIG. 5. The radiating body 62 in FIG. 7 is cylindrical and constructed of fire resistant bricks. There is a gap 68 between the top section of the radiating body 62 and the ceiling 42 of the hydrogen producing apparatus 60. The bottom section of the radiating body 62 has openings 70.

The combustion gas flows down from the drooping combustion burner 44 to the radiating body 62, and flows through the openings 70 at the bottom. A portion of the combustion gas moves upward in the annulus 72 between the inner cylinder 20 and the radiating body 62, and circulates by flowing into the radiating body 62 via the gap 68. The temperature of the radiating body 62 is maintained at a uniform level by this process. The heated radiating body 62 heats the reforming catalyst layer 30 in an even manner, with substantially uniform heat flux.

Figure 8:
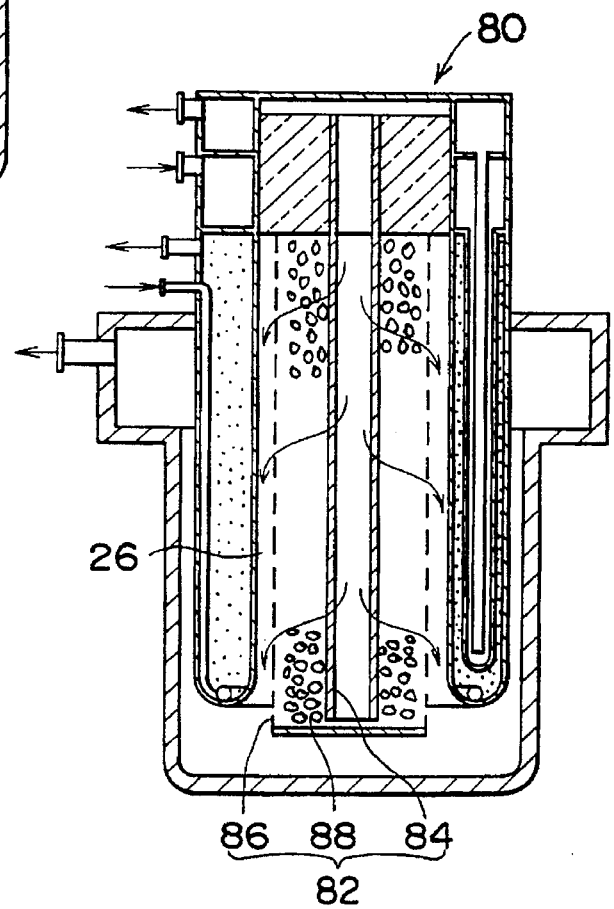
FIG. 8 is a sectional view of the apparatus of embodiment 3 of the invention.
Figure 9:
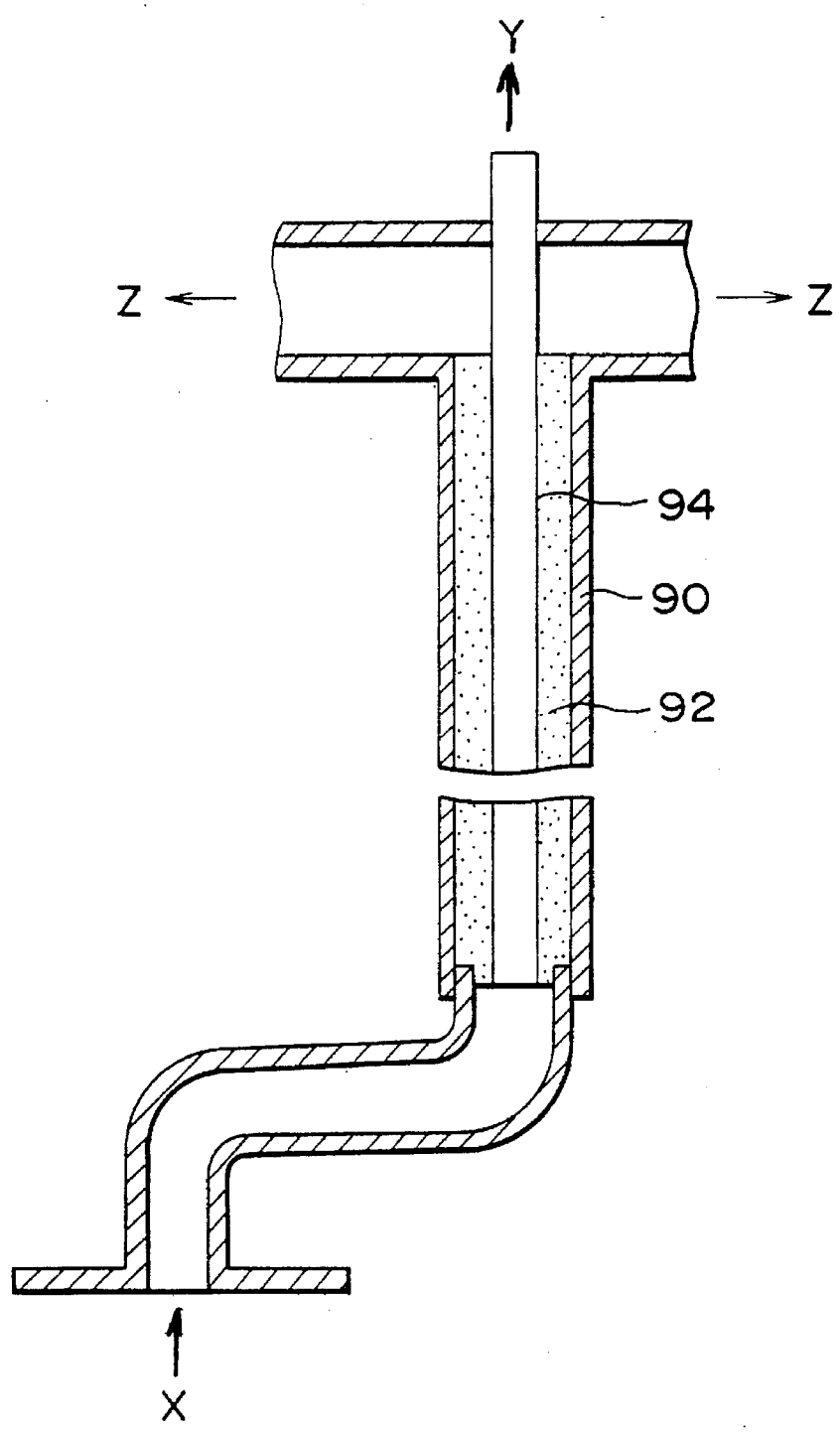
FIG. 9 is a structural cross-sectional view of a conventional laboratory scale apparatus.

The hydrogen producing apparatus 80 in FIG. 8 is a modification of the hydrogen producing apparatus 10 in FIG. 1. In this instance, instead of a drooping combustion burner, a column-shaped catalyst burner 82 is installed in the inner cylinder space 26. The catalyst burner 82 comprises an internal tube 84 to introduce fuel gas and air, an external mesh tube 86 surrounding the internal tube 84, and a combustion catalyst layer 88 between these tubes 84, 86.

Fuel gas burned in the combustion catalyst layer 88 heats the catalyst burner 82 to a uniform temperature. The heated catalyst burner 82 heats the reforming catalyst layer 30 in an even manner, with substantially uniform heat flux resulting.

A specific example for the first aspect of the invention is explained below.

(1) Apparatus Structure

FIG. 1 illustrates the hydrogen producing apparatus 10, the structure of the reaction apparatus with effective length of 600 mm, and is made up of components with the following dimensions: the internal diameter of the inner cylinder 20 is 100 mm; the internal diameter of the intermediate cylinder 18 is 173 mm; the internal diameter of the outer cylinder 14 is 188 mm; the external diameter of the hydrogen-permeable tube 32 is 20 mm; and the external diameter of the sweep gas tube 34 is 6 mm. The hydrogen-permeable tubes 32 are placed in an equidistant manner around the circumference of the catalyst layer in the inner annulus 30.

We used a nickel-based catalyst (average particle size: 2 mm diameter) as reforming catalyst A. We installed a drooping burner 44 alone in the furnace, as shown in FIG. 1. The outer cylinder 14 is protected with 200 mm thick rockwool to reduce heat loss to the external atmosphere.

(2) Operating Conditions

Supply of raw material gas (town gas 13A) on the reformer side: 39.3 mole/h

Steam supplied to the raw material gas on the reformer side: 1.69 kg/h

Steam for reformer/raw material gas on the reformer side (mole ratio): 2.0

Reformer reaction temperature: 550° C.

Reformer reaction pressure: 6.03 $kgf/cm^2$-abs.

Sweep gas (steam) supplied: 1.73 kg/h

Sweep gas pressure: 1.20 $kgf/cm^2$-abs.

(3) Hydrogen Generation Test Results

Under the above-specified conditions, 150.3 mole/h of hydrogen was obtained, extracted with sweep gas. The hydrogen's CO impurity level was less than 1 ppm. We were able to achieve a hydrocarbon conversion efficiency of about 85% from the raw material gas.

A conventional reformer which does not employ hydrogen-permeable and has the barrier of chemical equivalence based on the relationship between the operating temperature and pressure achieved a conversion efficiency of about 24% at this reaction temperature.

In this example, the raw material gas flows up from the bottom part of the inner annulus, to the reformer catalyst layer. The sweep gas is introduced from the top section of the annulus created between the hydrogen-permeable tube and the sweep gas tube. This gas passes into the sweep gas tube with the hydrogen, and is extracted from the top part of the tube. The same effect can be obtained by reversing the raw material gas and sweep gas flow directions.

The first aspect of the invention supports industrial-scale hydrogen production with economical production of high-purity hydrogen and has the following advantages:

(a) The layered cylinder concept results in a simple and compact structure. The apparatus can be constructed economically, with a small quantity of materials.

(b) In comparison with multi-tube approaches with many parallel reaction tubes, the lower weight of this apparatus results in a small heat capacity. The operation of the apparatus can be started and stopped quickly, and responds well to load changes.

(c) The catalyst layer is heated more uniformly because it is heated from both sides thereof. The multi-cylindrical structure with a central furnace ensures more uniform radial heat flux distribution. This prevents the development of hot spots where temperature may exceed the temperature limit of the hydrogen-permeable tube.

(d) The heat transferred from the combustion gas to the catalyst layer increases because the apparatus is structured to heat the catalyst layer from both sides. It is therefore possible to create a horizontally thick catalyst layer.

(e) It is possible to increase the generated hydrogen collection efficiency because of the counter-flow substance transfer between the sweep gas in the hydrogen-permeable tube and the reformed gas in the catalyst layer.

(f) The reforming temperature can be 150°–200° C. below that of conventional apparatuses because the hydrogen-permeable tube is able to separate and collect hydrogen and shift the chemical equilibrium to increase the production of products. This allows us to reduce the heat required to heat the raw material gas, and vastly improves thermal efficiency.

(g) Because the reaction temperature can be lower, it is possible to construct the apparatus from inexpensive materials with low heat resistance characteristics. This can reduce the cost of the apparatus.

(h) By installing a radiating body, it is possible to heat the catalyst layer uniformly to a prescribed temperature without any danger of local overheating.

Figure 10:
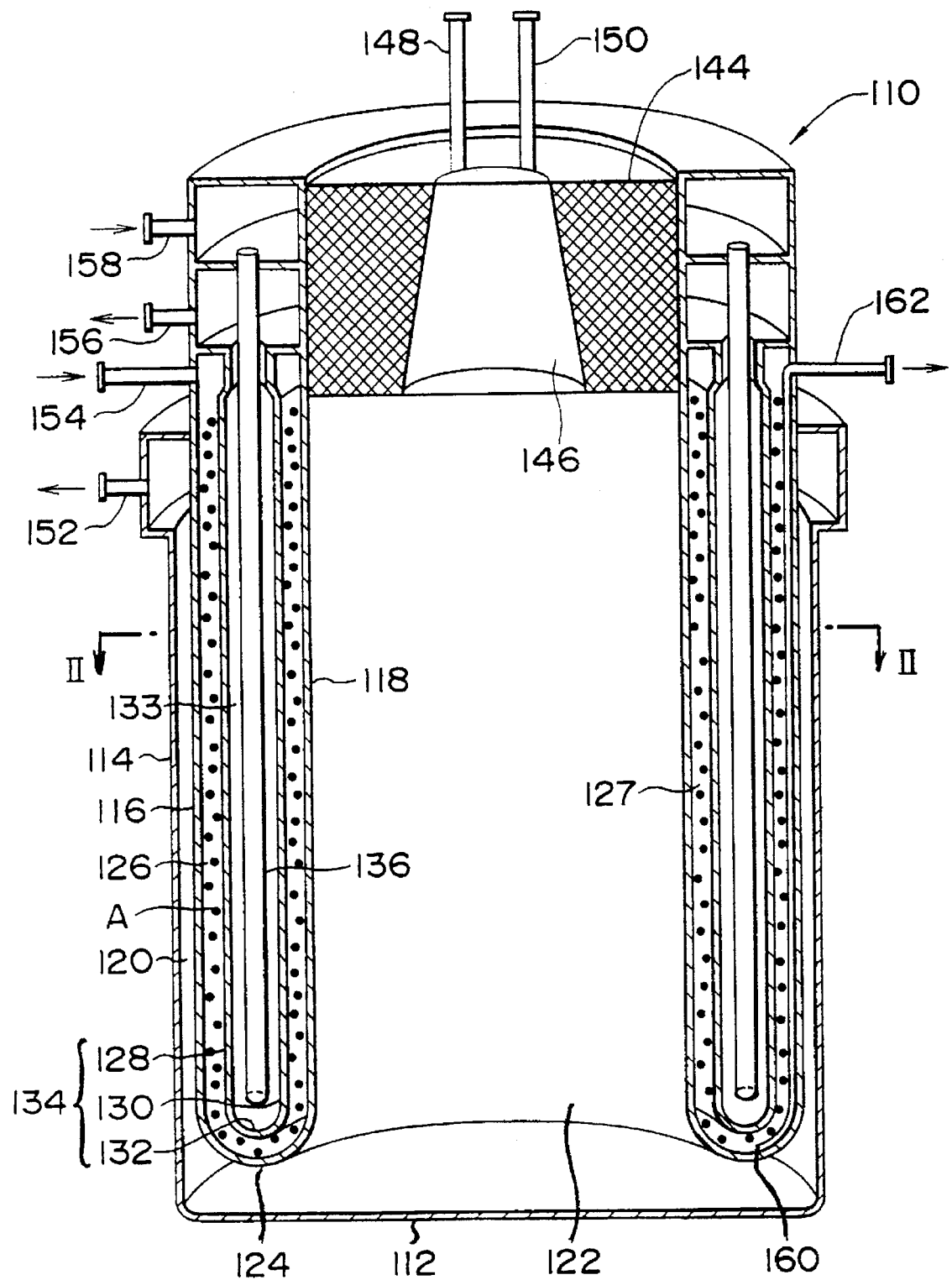
FIG. 10 is a perspective sectional view of embodiment 4 according to the second aspect of the invention.
Figure 11:
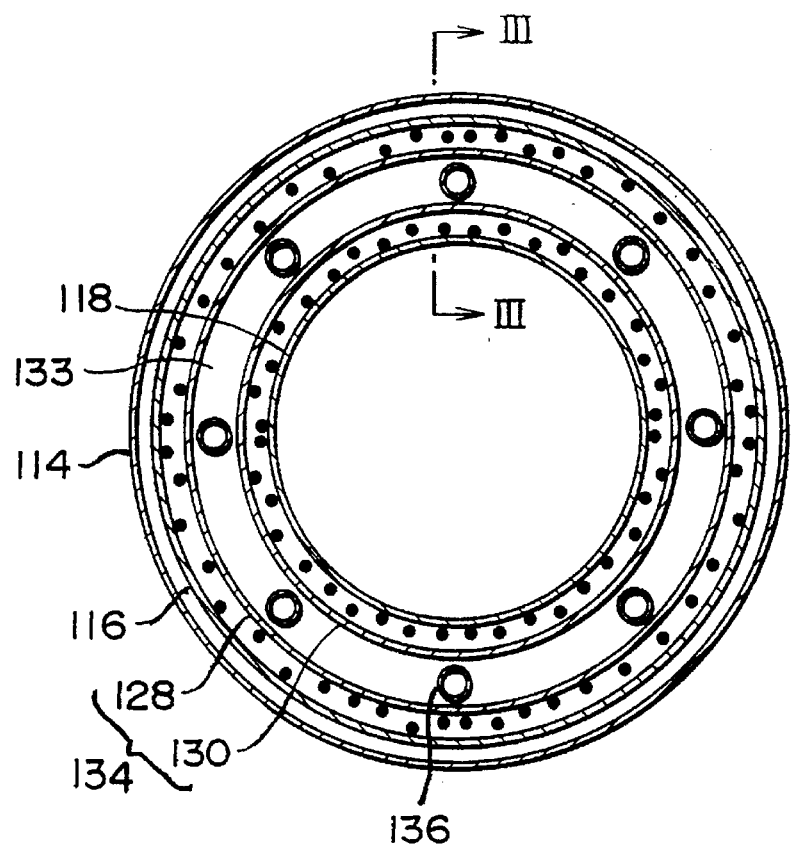
FIG. 11 is a typical transverse sectional view along the line II—II of FIG. 10.

FIG. 10 is a perspective sectional view of embodiment 4 for the hydrogen producing apparatus according to the second aspect of the invention. FIG. 11 is an typical vertical sectional view of the apparatus shown in FIG. 10. FIGS. 10 and 11 show the hydrogen producing apparatus 110 equipped with an outer cylinder 114 with a bottom section 112, and with an intermediate cylinder 116 and an inner cylinder 118, both of which are installed in a concentric manner within the outer cylinder. In this embodiment, the outer cylinder 114, intermediate cylinder 116 and inner cylinder 118 are all upright.

The outer cylinder 114 and intermediate cylinder 116 create the first annulus 120 between their walls. The first annulus 120 and the inner cylinder space 122 in the inner cylinder 118 are connected at their bottom portions. The lower sections of the intermediate cylinder 116 and inner cylinder 118 are connected, creating a closed annulus 124. These cylinders create a second annulus 126 between their walls.

A flow route for the combustion gas starts in the inner cylinder 122, passes through a space between the bottom section 112 of the outer cylinder 114 and the annular bottom 124 to the first annulus 120. The outer cylinder wall 114 and bottom wall 112 are both constructed of fire resistance bricks.

The catalyst layer 126 in the second annulus 126 (the same numeral is used here for convenience) is filled with reforming catalyst A.

A double-walled hydrogen-permeable cylinder 134 is composed of an internal wall 130, an annular bottom wall 132, and an external wall 128 which is made of an inorganic porous layer on which a hydrogen-permeable metallic membrane is disposed. The double-walled hydrogen-permeable cylinder 134 which has the third annulus 133 formed between its two walls is installed in a concentric manner in the second annulus 126.

As shown in FIG. 11, the double-walled hydrogen-permeable cylinder 134 contains many stainless steel cylindrical sweep gas tubes 136, installed in an equidistant manner around the circumference of the third annulus 133 of double-walled hydrogen-permeable cylinder 134.

Figure 12:
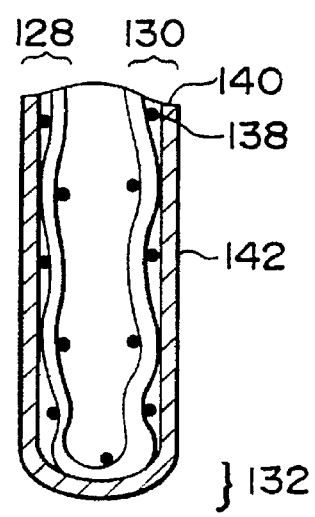
FIG. 12 is an enlarged partial cross-sectional view of double-walled hydrogen-permeable cylinders taken along the line III—III in FIG. 11.

FIG. 12 shows the external wall 128 of the double-walled hydrogen-permeable cylinder 134, its internal wall 130 and the annular bottom wall 132, all having stainless steel mesh 138 supporting material on their inside. An inorganic porous layer 140 of stainless steel non-woven fabric lies on top of the mesh, as a frame for the hydrogen-permeable metallic membrane. A non-porous Pd membrane 142 is coated on top of the fabric to form the hydrogen-permeable metallic membrane.

A downward-facing drooping combustion burner 146 is installed in the ceiling 144 of the inner cylinder 122. This combustion burner 146 is connected to a fuel gas tube 148 and an air intake tube 150.

Referring to FIGS. 10 and 11, the processes carried out in the hydrogen producing apparatus 110 according to the second aspect of the invention will be described.

The drooping combustion burner 146 uses air from the air intake tube 150 to burn fuel gas introduced via the fuel gas tube 148. The burner thereby supplies the heat energy required for the steam reforming reaction in the catalyst layer 126, and maintains the temperature of the layer at the prescribed level.

The combustion gas flows into the inner cylinder space 122, the space between the bottom section 112 and the annular section 124 of the outer cylinder 114, and the first annulus 120. It is then exhausted via the combustion gas outlet 152. The gas heats the catalyst layer 126 during this process.

The raw material gas comprises a mixture of steam and light hydrocarbons or methanol gas. It is introduced via the raw material gas inlet 154 in the top section of the second annulus 126. The gas flows into the catalyst layer 126 and is converted into hydrogen at high temperatures.

The generated hydrogen is selectively separated and collected through double-walled hydrogen-permeable cylinders 134. The sweep gas and hydrogen pass through the third annulus 133 and exhaust through the hydrogen outlet 156 in the top section of the third annulus 133.

The sweep gas enters through the sweep gas inlet 158 in the top section of the apparatus. The sweep gas flows down the sweep gas tube 136 and then into the third annulus 133 through the opening in the lower end. It then sweeps the generated hydrogen, as it rises, and exits via the hydrogen outlet 156.

Extracting the hydrogen and sweep gas facilitates maintenance of a lower partial pressure of hydrogen on the after-permeation side of the hydrogen-permeable tube. Steam or inert gas can be used as sweep gas.

Generated CO and $CO_2$ gas and any raw material gas which has not reacted after passing through the catalyst layer 126 is gathered by the off gas tube 160 which opens in the lower section of the catalyst layer 126, and is then expelled from the system via the off gas outlet 162.

Figure 13:
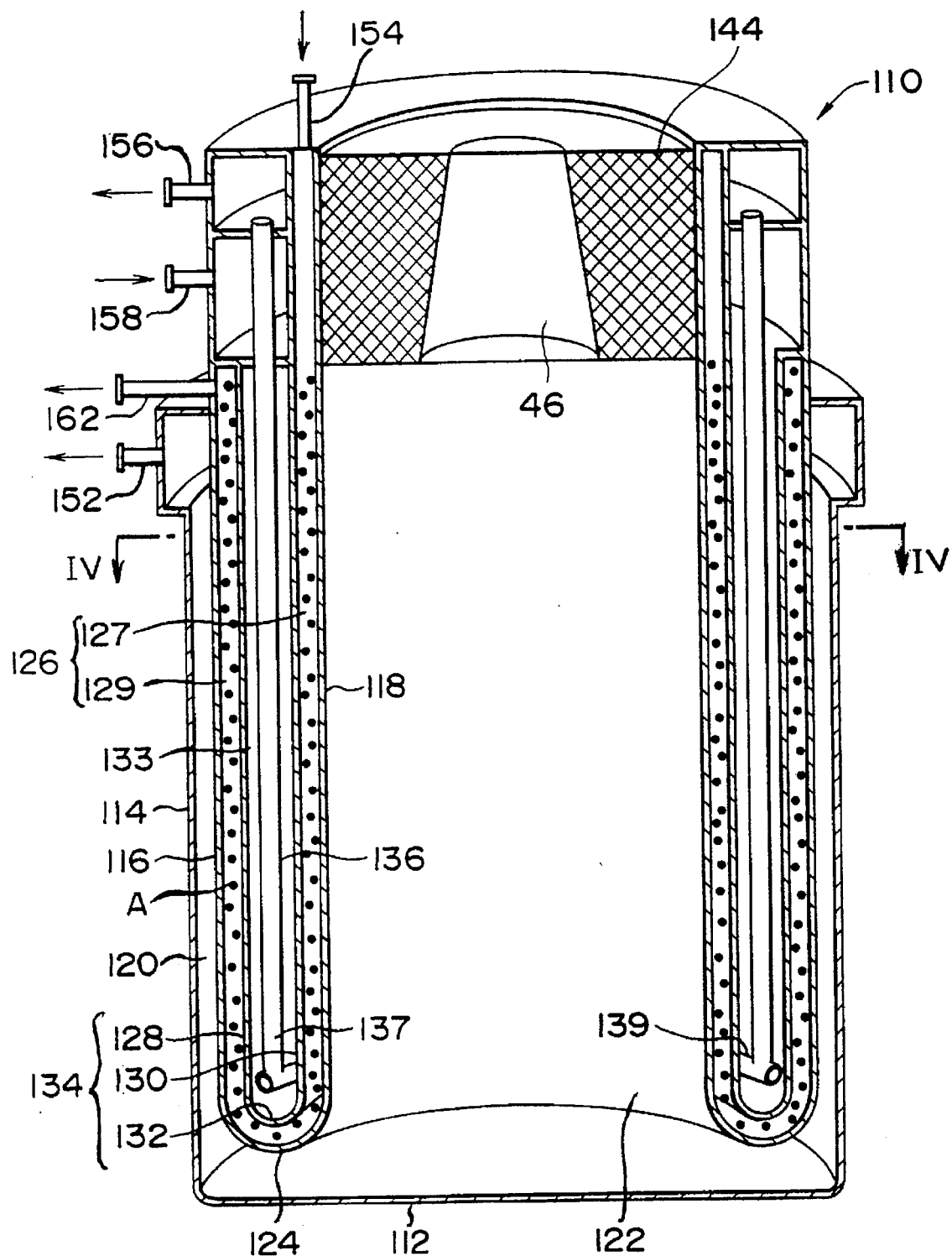
FIG. 13 is a perspective sectional view of embodiment 5 of the invention.
Figure 14:
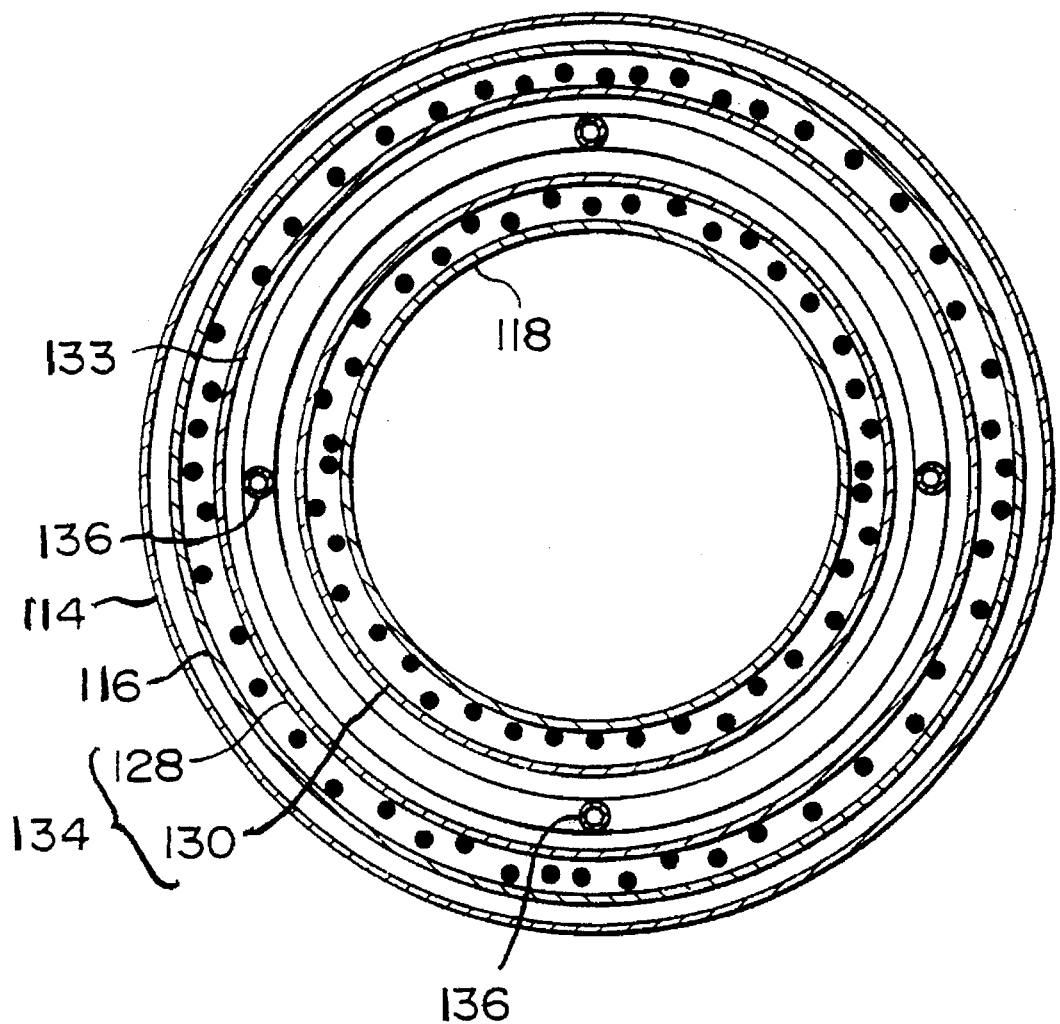
FIG. 14 is a typical transverse cross-sectional view along the line IV—IV of FIG. 13.

FIG. 13 shows an perspective sectional view of the apparatus 110 in embodiment 5 according to the second aspect of the invention. FIG. 14 is a transverse cross sectional view of the apparatus 110 shown in FIG. 13.

The apparatus 110 differs from embodiment 1 in the following points. The sweep gas tube structure is different in that only four sweep gas tubes 136, a relatively small number of the tubes, are installed in the third annulus 133 of the double-walled hydrogen-permeable cylinder 134. These tubes are connected to the annular pipe header 139 in the lower section 137 of the annular bottom wall 132 of the double-walled hydrogen-permeable cylinder 134. The annular pipe header 139 has many penetration pores (not illustrated) which perforate the header wall.

Second, the catalyst layer 126 comprises an inner catalyst layer 127 in the annulus created by the inner cylinder 118 and the inside wall 130 of the double-walled hydrogen-permeable cylinder 134, and an outer catalyst layer 129 in the annulus created by the intermediate cylinder 116 and the outside wall 128 of the double-walled hydrogen-permeable cylinder 134.

Third, raw material gas process feed gas enters through the raw material gas inlet 154 in the top section of the inner catalyst layer 127, and flows down through the inner catalyst layer 127. As it moves up through the outer catalyst layer 129, the gas is converted into hydrogen at high temperatures. The generated hydrogen gas is selectively separated by the double-walled hydrogen-permeable cylinders 134. Sweep gas collects the hydrogen, and passes through the penetration pores of the annular pipe header 139 and the sweep gas tube 136. The combined gases are expelled via the hydrogen outlet 156 in the top section of the sweep gas tube 136.

Fourth, sweep gas is fed from the sweep gas inlet 158 in the top part of the apparatus. The sweep gas and hydrogen flow down the annulus 133, through the penetration pores of the annular pipe header 139 and the sweep gas tube 136, and are expelled via the hydrogen outlet 156 in the top part of the sweep gas tube 136.

Fifth, generated CO and $CO_2$ gases, and any raw material gas which has not reacted after passing through the outer catalyst layer 129, are expelled via the off gas outlet 162 in the top section of the outer catalyst layer 129.

Apart from these differences, the hydrogen producing-apparatus 110 in embodiment 5 has the same structure as the apparatus in embodiment 4. The catalyst layer in embodiment 5 is twice as long as that of embodiment 4, and the apparatus in embodiment 5 provides more advantages to the reforming reaction.

Figure 15:
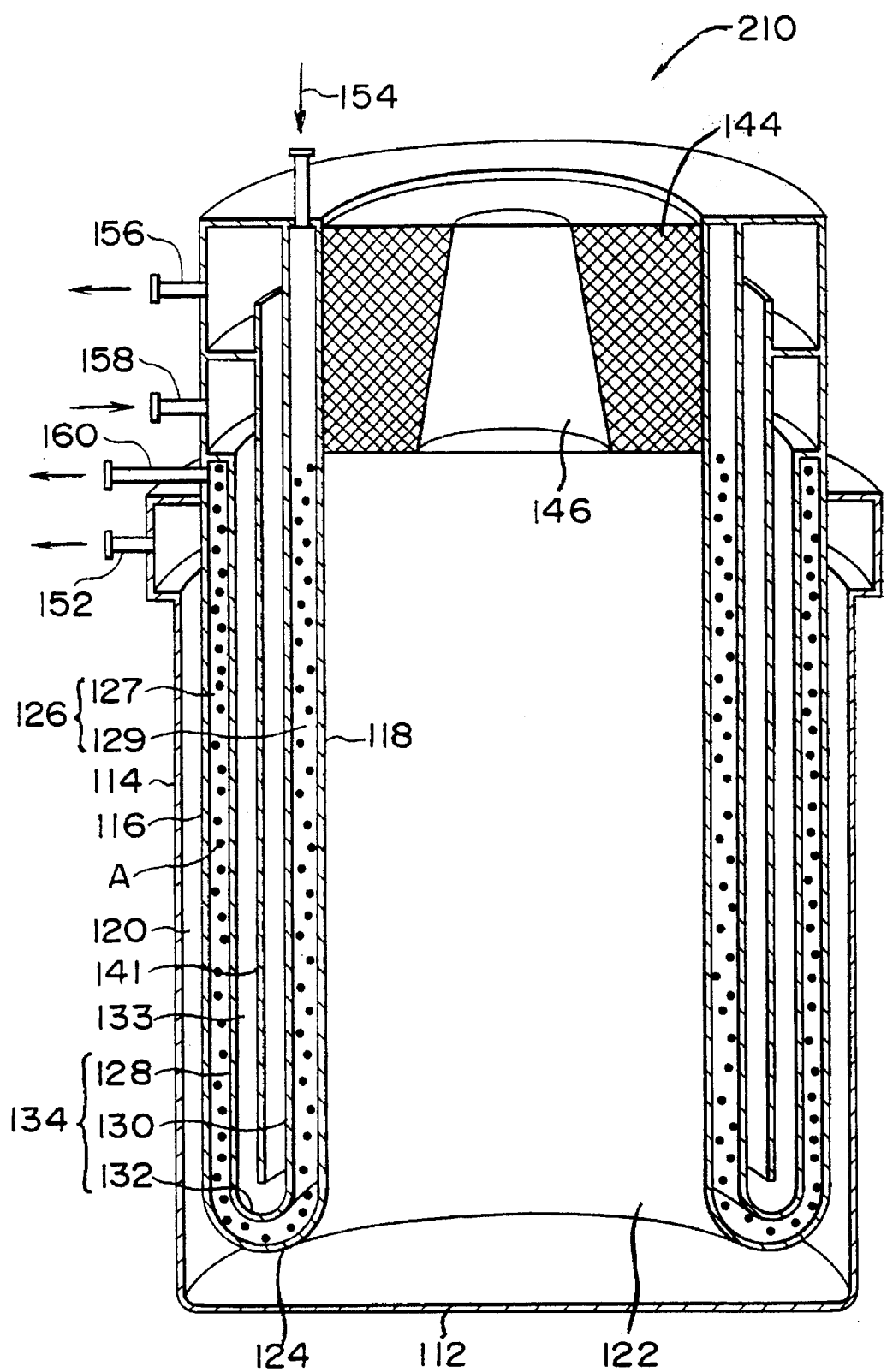
FIG. 15 is a perspective longitudinal sectional view of embodiment 6 of the invention.

FIG. 15 is a perspective sectional view of embodiment 6 for the hydrogen producing apparatus 210 according to the second aspect of the invention. The point of variance from embodiment 5 is that, instead of inserting the sweep gas tubes as indicated in FIG. 15, a cylindrical partitioning wall 141 is installed in a concentric manner in the third annulus 133 of the double-walled hydrogen-permeable cylinder 134.

The sweep gas is fed from the sweep gas inlet 158 in the upper section of the apparatus, flows down the annulus between the partitioning wall 141 and the outside wall 128 of the double-walled hydrogen-permeable cylinder 134, mixing with and sweeping the hydrogen. The gas then flows from the lower section of the annulus into the annulus between the partitioning wall 141 and the inside wall 130 of the double-walled hydrogen-permeable cylinder 134, moves up the annulus and passes out through the hydrogen outlet 156 in the upper section.

Apart from these differences, the structure of the hydrogen producing apparatus 210 in embodiment 6 is the same as the hydrogen producing apparatus 110 in embodiment 5. As embodiment 6 has a cylindrical partitioning wall 141 instead of the sweep gas tube found in embodiments 4 and 5, the structure of the apparatus is simpler.

A specific example is explained below for the second aspect of the invention.

(1) Apparatus Structure

FIG. 10 shows a hydrogen producing apparatus 110. The reaction apparatus in FIG. 10 has an effective length of 600 mm and is structured as: inner cylinder 118 (internal diameter 100 mm); intermediate cylinder 116 (internal diameter 173 mm); outer cylinder 114 (internal diameter 188 mm); double-walled hydrogen-permeable cylinder 134 (internal diameter 125 mm, external diameter 165 mm); and sweep gas tube 136 (external diameter 6 mm). Fifteen upright double-walled hydrogen-permeable cylinders 134 are installed in the catalyst layer of the second annulus 26, equidistant around the circumference.

Reforming catalyst A is a nickel based catalyst (average particle size: 2 mm in diameter). The furnace comprises a drooping burner 146 as shown in FIG. 10. The outer cylinder 114 is insulated with 200 mm thick rockwool to reduce heat discharge to the external atmosphere.

(2) Operating Conditions

Supply of raw material gas on the reformer side (town gas 13A) supply: 42.8 mole/h Steam supplied in raw material gas on the reformer side: 1.54 kg/h Steam for reforming/raw material gas on the reformer side (mole ratio): 2.0

Reforming reaction temperature: 560° C.

Reaction pressure: 6.05 $kgf/cm^2$-abs.

Quantity of sweep gas (steam) supplied: 1.88 kg/h

Sweep gas pressure: 1.25 $kgf/cm^2$-abs.

(3) Hydrogen Generation Test Results

A reaction under these above conditions produces 164.0 mole/h of hydrogen, accompanied by sweep gas. CO impurity in the hydrogen is less than 1 ppm. The conversion efficiency of hydrocarbons in the raw material gas is about 86%.

In contrast, a conventional reformer which does not use a hydrogen-permeable tube is hampered by chemical equilibrium, based on the relationship between operating temperature and pressure, resulting in a conversion efficiency of 25% at this reaction temperature and pressure.

In embodiment 4, the raw material gas flows down the catalyst layer from the top section of the second annulus.

The sweep gas enters from the upper section of the sweep gas tube then flows upward through the third annulus. The gas and hydrogen are extracted from the top part of the annulus.

In embodiment 5, the raw material gas enters from the top section of the inner catalyst layer, flows downward through the inner catalyst layer, and moves upward through the outer catalyst layer. The sweep gas enters from the top section of the third annulus then flows downward through it. The gas and hydrogen are extracted from the upper section of the sweep gas tube. In embodiment 6, the raw material gas enters from the top section of the inner catalyst layer. The sweep gas enters from the top part of the annulus between the partitioning wall and the outside wall of the double-walled hydrogen-permeable tube then flows down the annulus. The gas and hydrogen are extracted from the top section of the annulus between the partitioning wall and the internal wall of the double-walled hydrogen-permeable tube. The same effect can be obtained by reversing the flow direction of raw material gas and sweep gas in embodiments 4 and 6, or by reversing the flow direction of raw material gas and sweep gas or either of these gases in embodiment 5.

The second aspect of the invention facilitates industrial-scale hydrogen production to economically produce high purity hydrogen, and has the following advantages:

(a) The structure is simple and compact as the apparatus is composed of multiple layers of cylinders, including a double-walled hydrogen-permeable cylinder. It is therefore possible to build the apparatus economically and with a smaller quantity of materials.

(b) The heat capacity of this apparatus is small as it is far lighter in weight than conventional multiple-tube systems with many parallel reaction tubes. The operation of the apparatus can be started and stopped quickly, and its response to load changes is excellent.

(c) The catalyst layer can be heated more uniformly because heat is applied from both sides of the catalyst layer. Radial thermal flux distribution is also more uniform because of the structure of layered cylinders with the furnace in the center. This also prevents hot spots from developing and temperature from exceeding the temperature limit of the double-walled hydrogen-permeable cylinder.

(d) The counter-flow substance transfer between the sweep gas in the double-walled hydrogen-permeable cylinder and the reformed gas in the catalyst layer improves the generated hydrogen collection efficiency.

(e) Separating and collecting the hydrogen via the double-walled hydrogen-permeable cylinder shifts the chemical equilibrium to the advantage of hydrogen production. It is therefore possible to reduce the reforming temperature by 150°–200° C. below that of conventional apparatuses. This reduces the energy required to heat the raw material gas and vastly improves thermal efficiency.

(f) The lower reaction temperature supports the use of inexpensive construction materials with lower heat resistance characteristics. This reduces costs.

Figure 16:
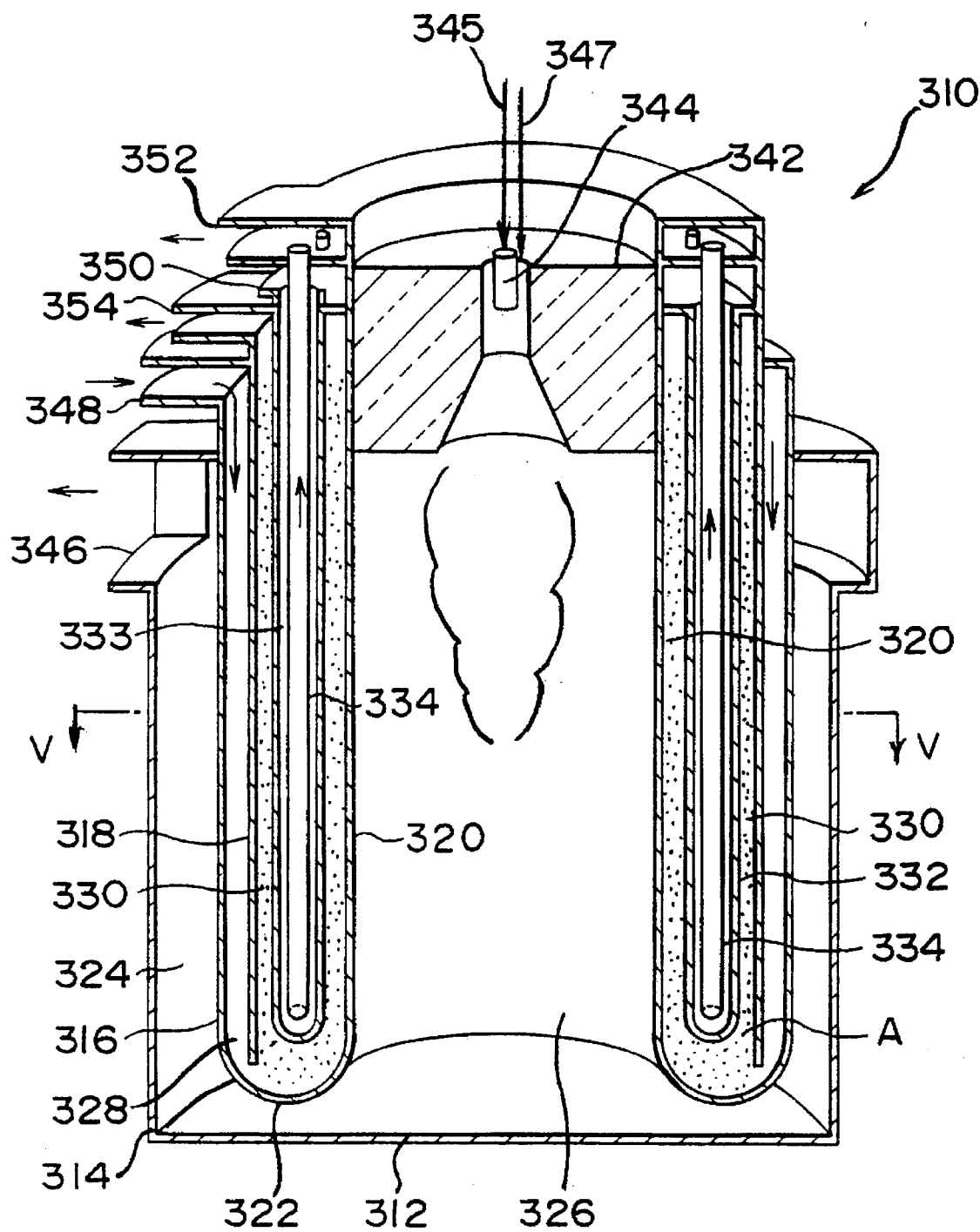
FIG. 16 is a perspective longitudinal sectional view of embodiment 7 according to the third aspect of the invention.

FIG. 16 is the perspective sectional view of embodiment 7 according to the third aspect of the invention.

Figure 17:
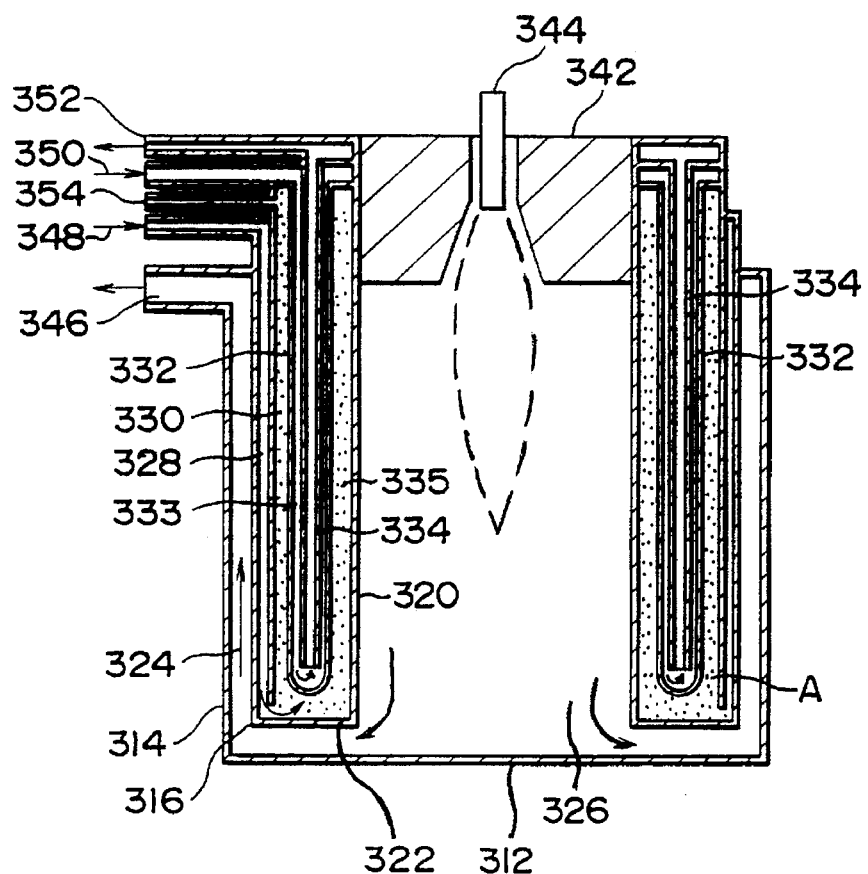
FIG. 17 is a typical longitudinal sectional view of the apparatus in FIG. 16.
Figure 18:
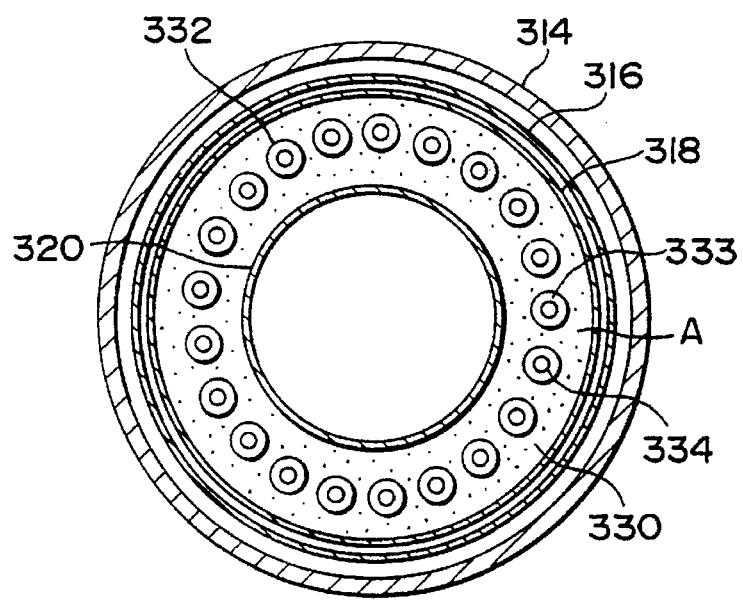
FIG. 18 is a typical transverse sectional view along the line V—V of FIG. 16.

As shown in FIGS. 16–18, the hydrogen producing apparatus 310 is equipped with an outermost outer cylinder 314 with a closed bottom 312. An outer cylinder 316, intermediate cylinder 318 and inner cylinder 320 are placed concentrically within the outermost outer cylinder. All four vessels are upright cylinders.

The lower sections of the inner cylinder 320 and the outer cylinder 316 are connected, forming a closed annular bottom section 322. The outermost outer cylinder 314 and the outer cylinder 316 create the first annulus 324 between their cylinder walls. The first annulus 324 and the inner cylinder space 326 in the inner cylinder 320 are connected at their bottoms.

A flow route for the combustion gas starts in the inner cylinder space 326, and passes through a space between the bottom section 312 of the outermost outer cylinder 314 and the annular bottom section 322 to the first annulus 324. The outer cylinder 316 and the intermediate cylinder 318 create a second annulus 328 between their cylinder walls. The intermediate cylinder 318 and the inner cylinder 320 create a third annulus 330 between them. The second annulus 328 and the third annulus 330 are connected at their bottoms. The side wall and the bottom of the outermost outer cylinder 314 are constructed of fire resistant bricks.

The catalyst layer 330 is formed in the third annulus 330 (the same numeral is used for convenience), and filled with reforming catalyst A. FIG. 18 shows a large number of cylindrical hydrogen-permeable tubes 332 with a hydrogen-permeable metal membrane on an inorganic porous layer. These tubes 332 are installed vertically around the circumference of the third annulus 330 in the catalyst layer. The cylindrical stainless steel sweep gas tubes 334 are installed in a concentric manner in the hydrogen-permeable tube 332.

As shown in FIG. 3, the tubular hydrogen-permeable tube 332 (or 32) has a closed bottom and an external diameter of about 20 mm as shown. The tube contains a supporting material of stainless steel mesh 36. On top of the mesh 36 is an inorganic porous layer 38 of non-woven stainless steel fabric, which carries the hydrogen-permeable metal membrane. A non-porous Pd-based alloy hydrogen-permeable metal membrane 40 is disposed on top of the fabric.

FIG. 16 shows that the drooping combustion burner 344 faces downward from the ceiling 342 of the inner cylinder space 326. The combustion burner 344 is connected to a fuel gas tube 345 and air intake tube 347.

FIGS. 16 to 18 support the following discussion of the processes of the hydrogen producing apparatus 310. The fuel gas enters the combustion burner 344 via the fuel gas tube 345 and is burnt with air supplied from the air intake tube 347. The prescribed temperature is maintained by supplying the reforming catalyst layer 330 with the heat energy necessary for the steam reforming reaction.

The combustion gas flows through the space in the inner cylinder 326, then through the space created by the bottom section 312 of the outermost outer cylinder 314 and the annular bottom 322. The gas then passes through the first annulus 324 and exhausts via the combustion gas outlet 346. During this process, the gas preheats the process feed gas which flows in the opposite direction through the second annulus 328.

The process feed gas is comprised of either light hydrocarbons or a mixture of methanol gas and steam. The gas enters via the raw material gas inlet 348 in the top section of the second annulus 328. It flows into the second annulus 328, from the bottom of the annulus into the reforming catalyst layer 330, and is converted into hydrogen at a high temperature. The generated hydrogen is selectively collected through the hydrogen-permeable tube 332 and flows, with the sweep gas, through the hydrogen outlet 352 in the top section of the tube.

The sweep gas enters via the sweep gas inlet 350 in the top section of the apparatus. The gas flows down the annulus 333 between the sweep gas tube 334 and the hydrogen-permeable tube 332, sweeps the hydrogen, and enters the lower end opening of the sweep gas tube 334. The gas and hydrogen move upward through the sweep gas tube and flow out of the hydrogen outlet 352. This process suppresses the partial pressure of hydrogen on the after-permeation side of the hydrogen-permeable tube 332.

Generated CO and $CO_2$ gas, plus any raw material gas which has not reacted after passing through the reforming catalyst layer 330, flow out of the system via the off gas outlet 354.

In this embodiment, raw material gas flows into the reforming catalyst layer after being preheated by combustion gas. The raw material gas reforms into hydrogen at a high conversion efficiency and the thermal efficiency of the combustion gas improves.

Figure 19:
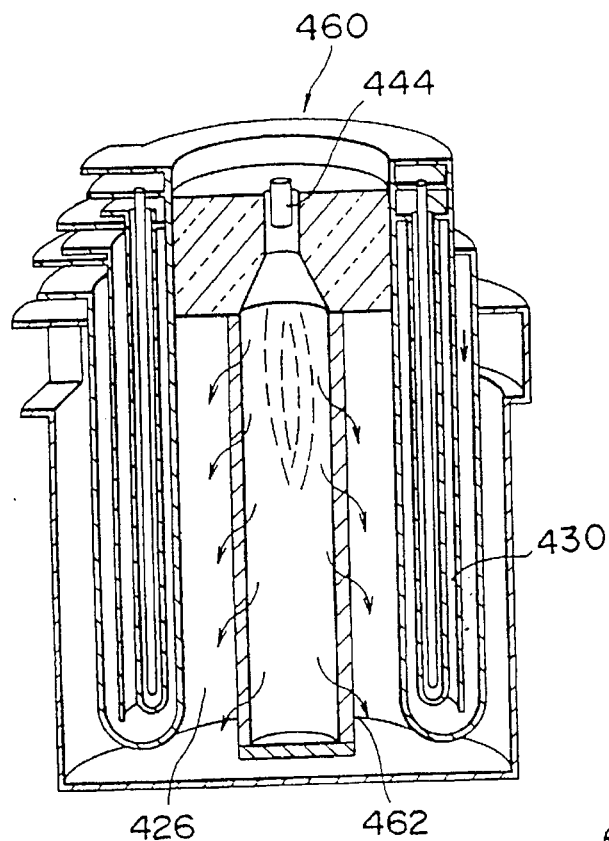
FIG. 19 is a perspective sectional view of embodiment 8 of the invention.
Figure 20:
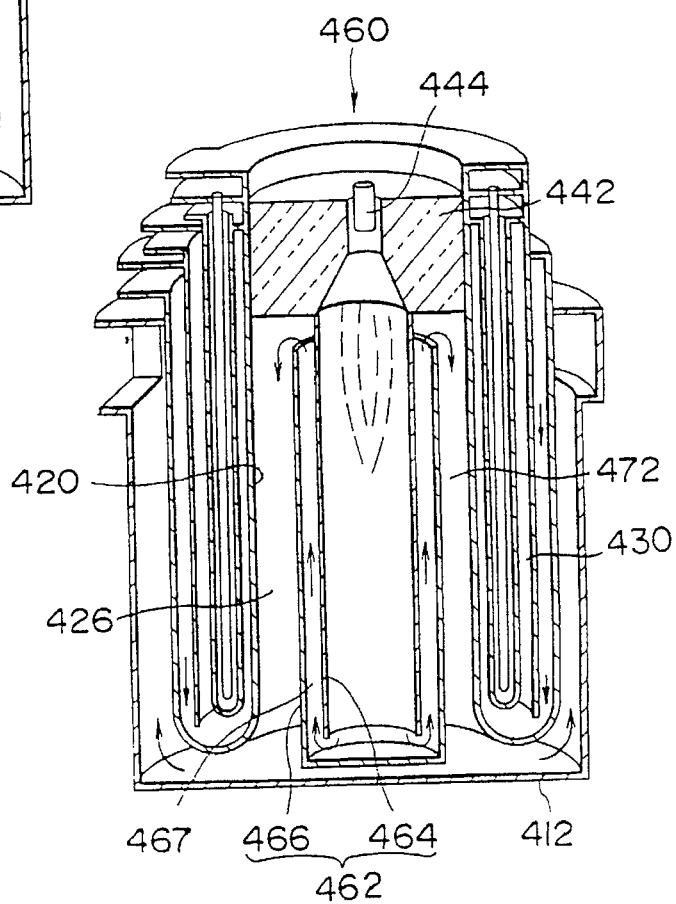
FIG. 20 is a perspective sectional view of a modification of embodiment 8 of the invention.
Figure 21:
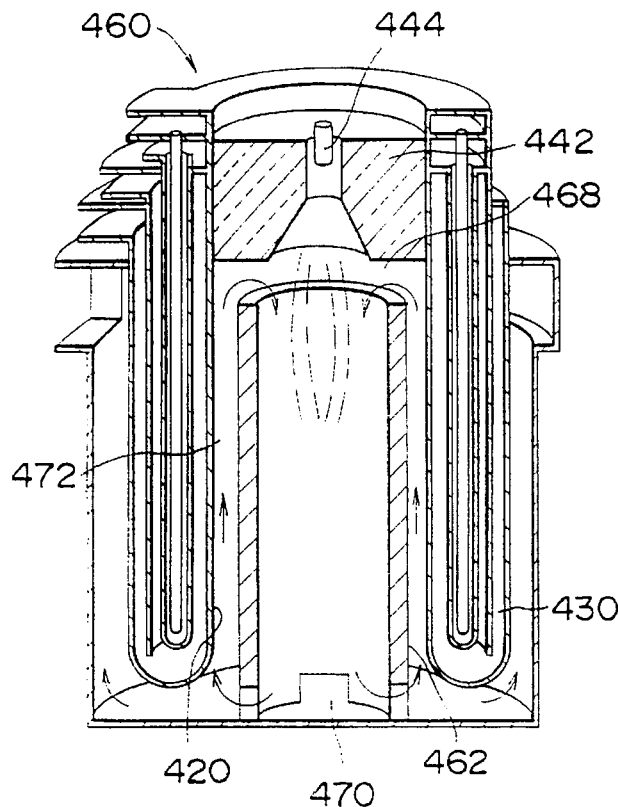
FIG. 21 is a perspective sectional view of another modification of embodiment 8 of the invention.

FIGS. 19-21 relate to the following discussion of embodiment 8 according to the third aspect of the invention. Only those parts in these figures which are different from the hydrogen producing apparatus illustrated in FIGS. 16-18 will be explained.

The inner cylinder space 426 of the hydrogen producing-apparatus 460 as shown in FIG. 19 contains a cylindrical radiating body 462 surrounding the frame from the combustion burner 444. This cylindrical radiating body 462 has porous walls. The combustion gas of the burner 444 permeates the porous wall and flows into the inner cylinder space 426. The combustion gas heats the radiating body 462 during this process, resulting in a uniform overall temperature. The heated radiating bodies 462 evenly heats the reforming catalyst layer 430, with almost uniform heat flux.

The hydrogen producing apparatus 410 in FIG. 20 is a modification of the radiating bodies 462 as shown in FIG. 19. The radiating body assembly 462 shown in FIG. 20 has a dual cylinder configuration and comprises an inner cylinder radiating body 464 and an outer cylinder radiating body 466. The inner cylinder radiating body 464 is in contact with the ceiling 42 of the inner cylinder 420, but has gaps between it's bottom and the bottom section 412 of the outermost outer cylinder 414. The outer cylinder radiating body 466 is in contact with the lower part of the bottom section 412, and its upper section is isolated from the ceiling 442.

The combustion burner 444 gas flows down through the internal radiating body 464, then moves upward through the annulus 467 between the internal radiating body 464 and the external radiating body 466. The gas flows from the upper part of the radiating body 466 into the inner cylinder space 426. The combustion gas heats up the inner cylinder radiating body 464 and the outer cylinder radiating body 466 during this process, achieving a uniform overall temperature. The heated internal radiating body 464 and external radiating body 466 heat the reforming catalyst layer 430 with an almost uniform heat flux.

The hydrogen producing apparatus 460 shown in FIG. 21 is another modification of the radiating bodies 462 in FIG. 19. The cylindrical radiating bodies 462 as shown in FIG. 21 are constructed of fire resistant brick. There is a gap 468 between the top section of the radiating bodies 462 and the ceiling 442 of the hydrogen producing apparatus 460, and an opening 470 in the lower section of the radiating bodies 462.

The combustion burner 444 gas flows down through the radiating bodies 462, and out through an opening 470 in the lower section of the radiating body. A portion of the combustion gas moves up through the annulus 472 between the inner cylinder 420 and the radiating bodies 462, and returns to the radiating bodies 462 via the gap 468. The combustion gas thoroughly heats the radiating bodies 462 during this process, resulting in an almost uniform overall temperature. The heated radiating bodies 462 evenly heat the catalyst layer 430 with almost uniform heat flux.

Figure 22:
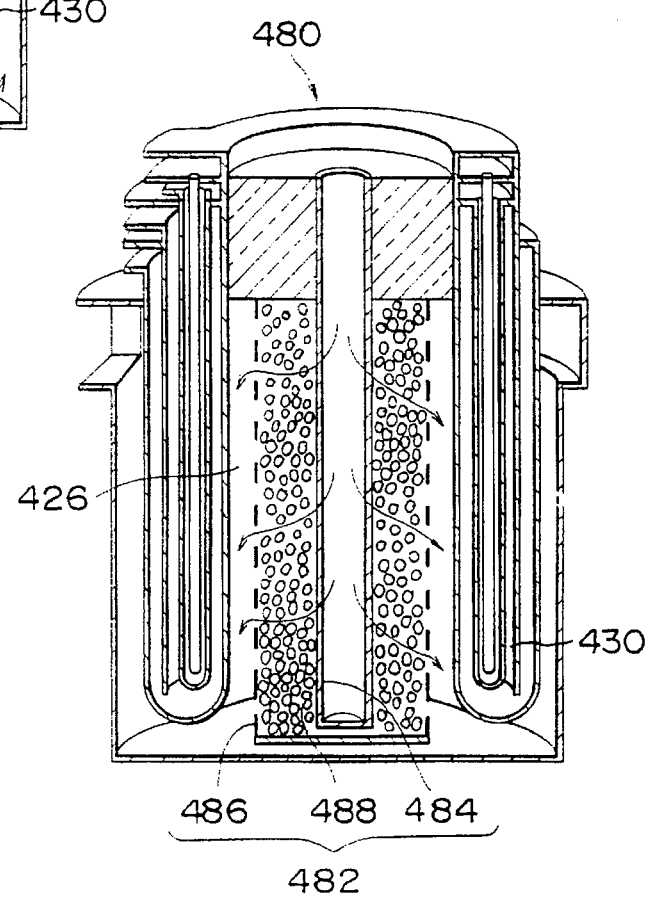
FIG. 22 is a perspective sectional view of embodiment 9 of the invention.

The hydrogen producing apparatus 480 in FIG. 22 is a modification of the apparatus 310 in FIG. 16 (embodiment 9). The apparatus 480 contains a column shaped catalyst burner portion 482 in the inner cylinder space 426 instead of a combustion burner. The catalyst burner portion 482 comprises an internal tube 484 which delivers the fuel gas and air and a mesh external tube 486 to surround the internal tube. A combustion catalyst layer 488 fills the space between the two tubes.

The fuel gas is burnt in the combustion catalyst layer 488 and heats the overall catalyst burner portion 482 to a uniform temperature. The heated catalyst burner portion 482 evenly heats the reforming catalyst layer 430, with almost uniform heat flux.

The following section describes a specific example for the third aspect of the invention.

(1) Apparatus Structure

FIG. 16 shows the hydrogen producing apparatus 310 which is a reaction apparatus with an effective length of 600 mm. Its dimensions are as follows: the internal diameter of the inner cylinder 20 is 100 mm; the internal diameter of the intermediate cylinder 18 is 174 mm; the internal diameter of the outer cylinder 16 is 183 mm; the internal diameter of the outermost outer cylinder 14 is 200 mm; the external diameter of the hydrogen-permeable tube 32 is 20 mm; and the external diameter of the sweep gas tube 34 is 6 mm. Fifteen upright hydrogen-permeable tubes 432 are located in the catalyst layer of the third annulus 430, installed equidistant around the circumference.

Reforming catalyst A is a nickel based catalyst (average particle size: 2 mm in diameter). The furnace comprises a drooping burner 444 as shown in FIG. 16. The outermost outer cylinder 414 is insulated by 200 mm thick rockwool to reduce head loss to the external atmosphere.

(2) Operating Conditions

Supply of raw material gas on the reformer side (town gas 13A): 35.7 mole/h

Steam for reforming/raw material gas on the reformer side (mole ratio): 2.0

Reforming reaction temperature: 550° C.

Reforming reaction pressure: 6.03 kgf/cm²-abs.

Quantity of sweep gas (steam) supplied: 5.7 kg/h

Sweep gas pressure: 1.21 kgf/cm²-abs (3) Hydrogen Generation Test Results

A reaction under these conditions produces 136.6 mole/h (=3.06 Nm³/h) of hydrogen, accompanied by sweep gas. The CO impurity in the hydrogen is less than 1 ppm. The conversion efficiency of hydrocarbons in raw material gas is about 87%.

In contrast, as a conventional reformer which does not use a hydrogen-permeable tube is hampered by the chemical equilibrium caused by the relationship between operating temperature and pressure, its conversion efficiency at this reaction temperature and pressure was only about 24%.

In this embodiment, the raw material gas flows downward from the top section of the second annulus. The gas then flows upward through the catalyst layer in the third annulus. The sweep gas enters from the top section of the annulus created between the hydrogen-permeable tube and the sweep gas tube. The sweep gas and hydrogen pass through the sweep gas tube and are extracted from its top section. The same effects can be obtained when the raw material gas and sweep gas flow in opposite directions.

The third aspect of the invention facilitates industrial-scale hydrogen production, economically producing high purity hydrogen, and has the following advantages:

(a) The structure is simple and compact, comprising multiple layered cylinders. The apparatus can be constructed with a small quantity of materials.

(b) The heat capacity of the apparatus is small, as it is far lighter in weight than conventional multiple parallel reaction tube systems. The operation of the apparatus can be started and stopped quickly, and it has an excellent response to load changes.

(c) The catalyst layer can be more uniformly heated, as heat is applied from both sides of the layer. Radial thermal flux distribution is more uniform because of the structure of layered cylinders with a central furnace. This prevent the development of hot spots where temperature may exceed the upper temperature limit of the hydrogen-permeable tube.

(d) The heat collection efficiency improves because the combustion gas and the process feed gas exchange heat while flowing in opposite directions.

(e) The generated hydrogen collection efficiency is improved by the counter-flow substance transfer between sweep gas in the hydrogen-permeable tube and the reforming gas in the catalyst layer.

(f) Separating and collecting the hydrogen through the hydrogen-permeable tube shifts the chemical equilibrium to the advantage of hydrogen production. The reforming temperature can therefore be reduced 150°–200° C. below that of conventional apparatuses. This vastly improves thermal efficiency while reducing the thermal energy required to heat raw material gas.

(g) The lower reaction temperature enables the use of inexpensive materials with lower heat resistance characteristics, thereby reducing construction costs.

(h) Radiating bodies ensure the catalyst layer to be heated with a uniform temperature distribution without any risk of overheating.

Figure 23:
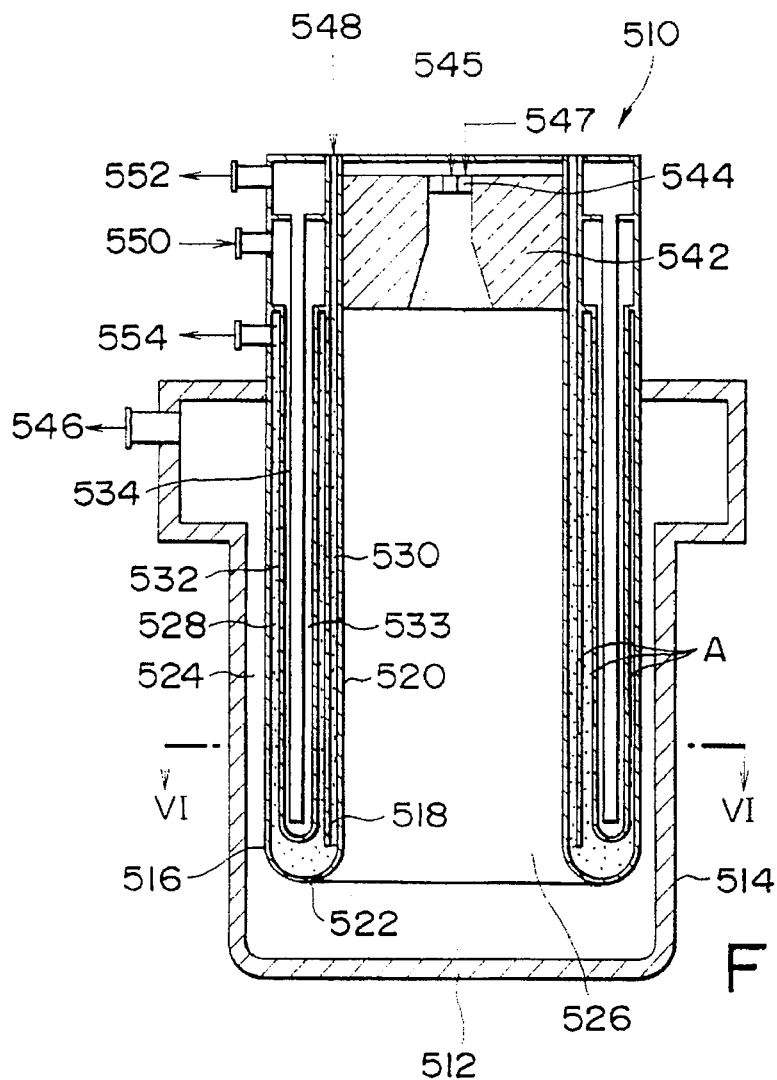
FIG. 23 is a longitudinal sectional view of embodiment 10 according to the fourth aspect of the invention.
Figure 24:
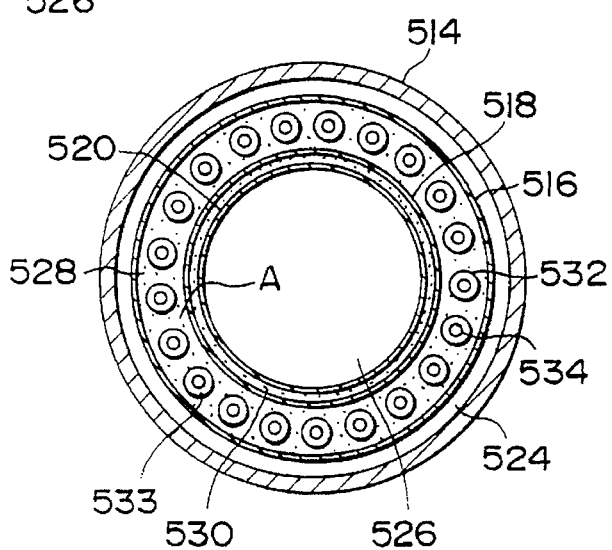
FIG. 24 is a typical transverse sectional view along the line VI—VI of FIG. 23.

FIG. 23 is an illustrated sectional view of embodiment 10 for the fourth aspect of the present invention. FIG. 24 is a transverse sectional view at the line VI—VI in FIG. 23.

The hydrogen producing apparatus 510 is equipped with a closed bottom 512 outermost outer cylinder 514. Within this cylinder is a concentric arrangement consisting of an outer cylinder 516, intermediate cylinder 518 and inner cylinder 520. All four vessels are upright cylinders.

The lower sections of the inner cylinder 520 and the outer cylinder 516 are connected, forming a closed annular bottom 522. The outermost outer cylinder 514 and the outer cylinder 516 create the first annulus 524 between their cylinder walls. The bottoms of the first annulus 524 and the inner cylinder space 526 within the inner cylinder 520 are connected.

A flow route of the combustion gas starts in the inner cylinder space 526 and passes through a space between the bottom section 512 of the outermost outer cylinder 514 and the annular bottom section 522 into the first annulus 524. The outer cylinder 516 and the intermediate cylinder 518 create a second annulus 528 between their cylinder walls. The intermediate cylinder 518 and the inner cylinder 520 create a third annulus 530 between them. The bottoms of the second annulus 528 and the third annulus 530 are connected.

The wall of the outermost outer cylinder 514 and the wall of the bottom section 512 of the outermost external wall 514 are constructed of fire resistant brick.

The first and second catalyst layer 528 and 530 (for the sake of convenience the same numerals as the second and third annuluses are used) which are filled with reforming catalyst A in the second annulus 528 and the third annulus 530 are created. FIG. 24 shows a large number of cylindrical hydrogen-permeable tubes 532 with hydrogen-permeable metal membranes on an inorganic porous layer, installed vertically around the circumference of the second annulus 528 in the first catalyst layer 528. The cylindrical, stainless steel sweep gas tubes 534 are installed in a concentric manner in the hydrogen-permeable tube 532.

As shown in FIG. 3, the tubular hydrogen-permeable tube 532 (or 32) has a closed bottom and an external diameter of about 20 mm. The tube contains a supporting material of stainless steel mesh 36. On top of the mesh is an inorganic porous layer 38 of woven stainless steel fabric, which carries the hydrogen-permeable metal membrane. A non-porous, Pd based alloy, hydrogen-permeable metal membrane 40 is coated on top of the fabric.

FIG. 23 shows that the drooping combustion burner 544 faces downward from the ceiling 542 of the inner cylinder space 526. The combustion burner 544 is connected to a fuel gas tube 544 and air intake tube 547.

FIGS. 23 and 24 support the following discussion of the processes of hydrogen producing apparatus 510. Fuel gas enters the combustion burner 544 via the fuel gas tube 545, and is burnt in air supplied by the air intake tube 547. The prescribed temperature is maintained by supplying to the first and second catalyst 528 and 530 with the heat energy necessary for the steam reforming reaction. Combustion gas passes through the inner cylinder space 526 and the space created by the bottom section 512 of the outermost outer cylinder 514 and the annular connection part 522 of the bottom section 512. It then travels through the first annulus 524 and exhausts via the combustion gas outlet 546.

The process feed gas comprises either light hydrocarbons or a mixture of methanol gas and steam. The gas enters via the raw material gas inlet 548 in the top section of the third annulus 530. It flows into the second catalyst layer 530 of the third annulus 530, during which it is converted into hydrogen at a high temperature. The gas then flows into the bottom of the first catalyst layer 528 of the second annulus 528, where any process feed gas which has not reacted is converted into hydrogen.

The generated hydrogen is selectively collected through the hydrogen-permeable tube 532 installed in the first catalyst layer 528 and flows out, with the sweep gas, through the hydrogen outlet 552 in the top section of the tube.

The sweep gas enters via the sweep gas inlet 550 in the top section of the apparatus. The gas flows down the annulus 533 between the sweep gas tube 534 and the hydrogen-permeable tube 532, sweeps the hydrogen, and enters the lower end opening of the sweep gas tube 534. The gas and hydrogen move upward through the sweep gas tube and flow out of the hydrogen outlet 552. This process suppresses the partial pressure of hydrogen on the after-permeation side of the hydrogen-permeable tube 532.

Generated CO and $CO_2$ gas, plus any raw material gas which has not reacted after passing through the first catalyst layer 528, flow out of the system via the off gas outlet 554.

In this embodiment, the process feed gas passes through the high temperature heated catalyst layer 530 immediately inside the inner cylinder 520 which forms the furnace. After the gas is reformed into hydrogen at a high conversion rate, the hydrogen is selectively collected through the hydrogen-permeable tube in the second annulus 528. Any process feed gas which has not reacted is reformed in the reforming catalyst layer 528 in the second annulus 528, significantly improving the conversion efficiency for the entire apparatus.

Figure 25:
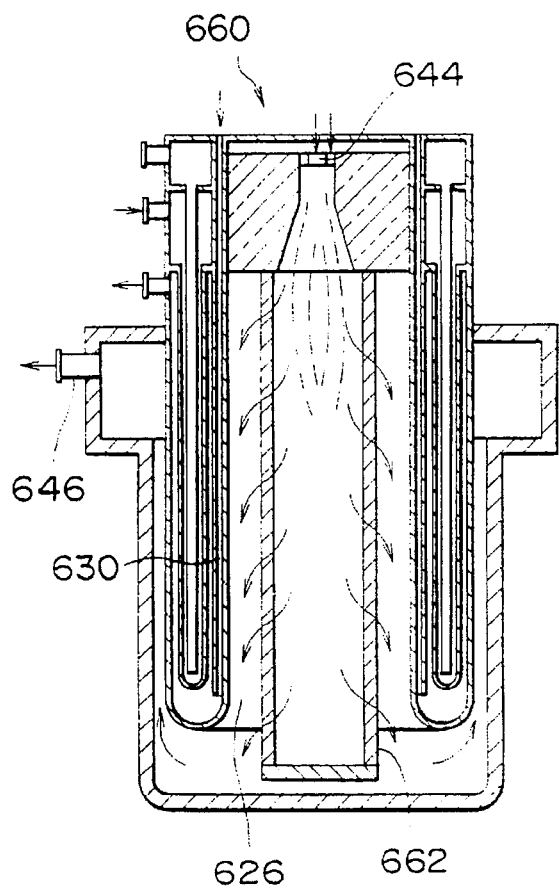
FIG. 25 is a longitudinal sectional view of embodiment 11 of the invention.
Figure 26:
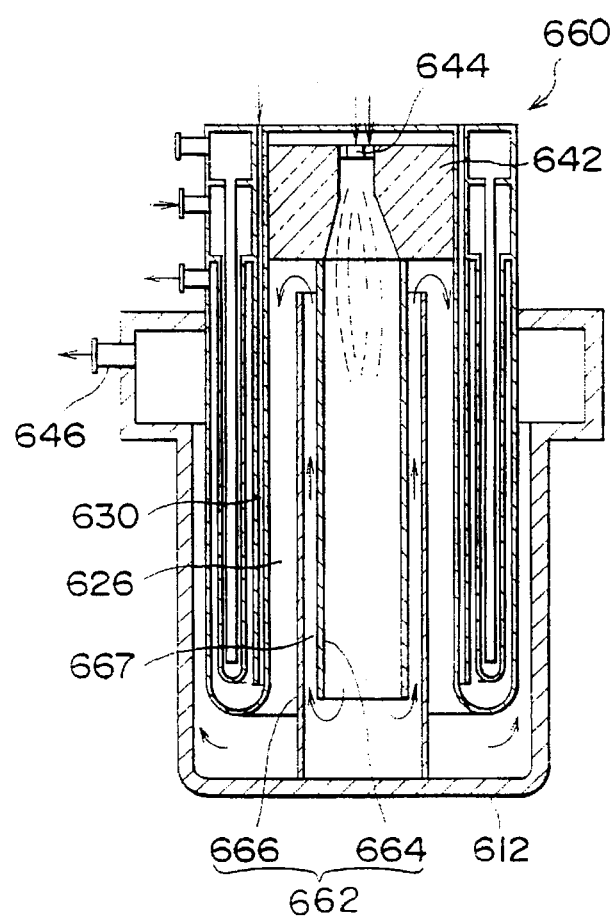
FIG. 26 is a longitudinal sectional view of a modification of embodiment 11 of the invention.

FIGS. 25 and 26 illustrate another embodiment.

FIG. 25 shows an inner cylinder space 626 of the hydrogen producing apparatus 660 which contains a cylindrical radiating body 662 surrounding the drooping combustion burner 644 flame. This cylindrical radiating body 662 has porous walls. The combustion burner 644 gas permeates the porous wall and flows into the inner cylinder space 626. The combustion gas heats the radiating body 662 during this process, resulting in a uniform overall temperature. The heated radiating bodies 662 evenly heats the reforming catalyst layer 630, with almost uniform heat flux.

The hydrogen producing apparatus 660 in FIG. 26 is a modification of the radiating bodies 662 shown in FIG. 25. The radiating body assembly 662 shown in FIG. 26 has a dual cylinder configuration and comprises an inner cylinder radiating body 664 and an outer cylinder radiating body 666. The inner cylinder radiating body 664 is in contact with the ceiling 642 of the inner cylinder 620, but has gaps between it's bottom and the bottom section 612 of the outermost outer cylinder 614. The outer cylinder radiating body 666 is in contact with the bottom section 612, and its upper section is isolated from the ceiling 642.

The combustion burner 644 gas flows down through the inner cylindrical radiating body 664, then moves upward through the annulus 667 between the inner cylindrical radiating body 664 and the external radiating body 666. The gas flows from the upper part of the outer cylindrical radiating body 666 into the inner cylinder space 626. The combustion gas heats up the inner cylinder radiating body 664 and the outer cylinder radiating body 666 during this process, achieving a uniform overall temperature. The heated internal radiating body 664 and external radiating body 666 heat the reforming catalyst layer 630 with an almost uniform heat flux.

Figure 27:
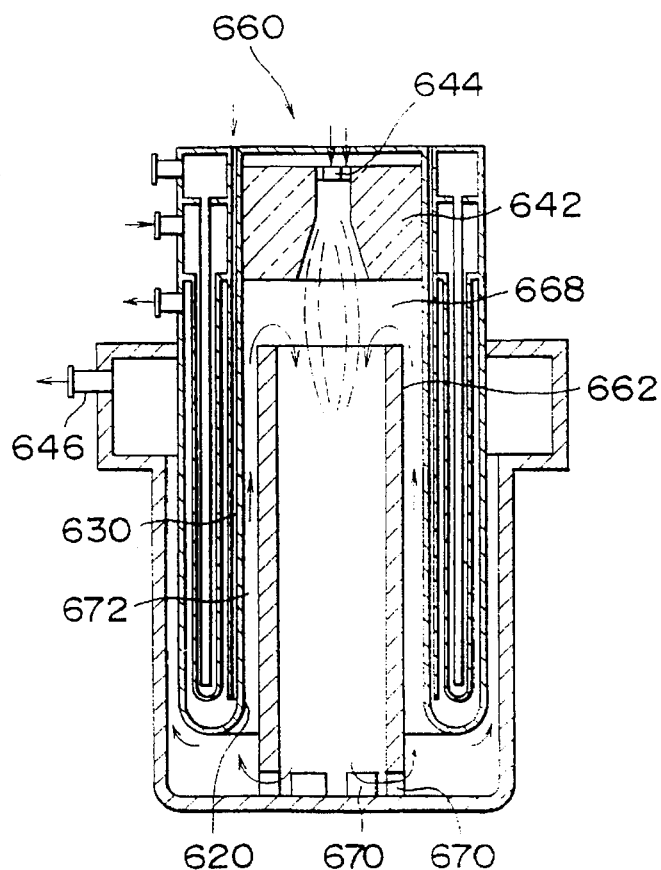
FIG. 27 is a longitudinal sectional view of another modification of embodiment 11 of the invention.

The hydrogen producing apparatus 660 shown in FIG. 27 is another modification of the radiating bodies 662 in FIG. 25. The cylindrical radiating bodies 662 shown in FIG. 27 are constructed of fire resistant bricks. There is a gap 668 between the upper section of the radiating bodies 662 and the ceiling 642 of the hydrogen producing apparatus 660, and an opening 670 in the lower section of the radiating bodies 662.

The combustion gas flows down through the radiating bodies 662 from the drooping combustion burner 644, and out through an opening 670 in the lower section. A portion of the combustion gas moves up through the annulus 672 between the inner cylinder 620 and the radiating bodies 662, and returns to the radiating body 662 via the gap 668.

The combustion gas thoroughly heats the radiating bodies 662 during this process, resulting in an almost uniform overall temperature. The heated radiating bodies 662 evenly heat the reforming catalyst layer 30, with almost uniform heat flux.

Figure 28:
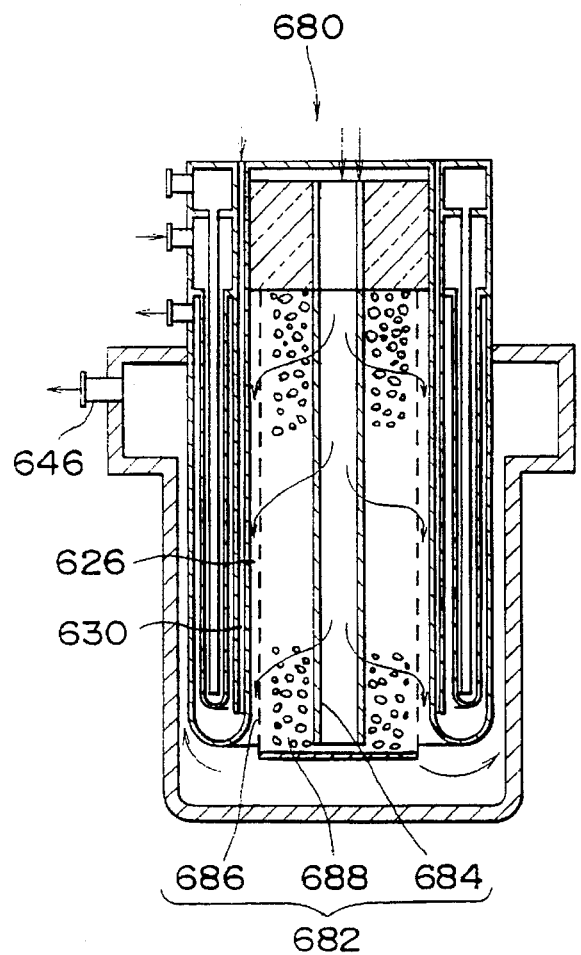
FIG. 28 is a longitudinal sectional view of embodiment 12 of the invention.

The hydrogen producing apparatus 680 in FIG. 28 is a modification of the apparatus 510 in FIG. 23. The apparatus 680 contains a column shaped catalyst burner 682 in the inner cylinder space 626, instead of a combustion burner. The catalyst burner 682 comprises an internal tube 684 which delivers the fuel gas and air and a mesh external tube 686 to surround the internal tube. A combustion catalyst layer 688 fills the space between the two tubes.

The fuel gas is burnt in the combustion catalyst layer 688 and heats the overall catalyst burner 682 to a uniform temperature. The heated catalyst burner 682 evenly heats the reforming catalyst layer 630, with almost uniform heat flux.

A specific example for the fourth aspect of the invention will be described in the following.

(1) Apparatus Structure

FIG. 23 shows a hydrogen producing apparatus 510. The reaction apparatus in FIG. 23 has an effective length of 600 mm and is structured as: inner cylinder 520 (internal diameter 100 mm); intermediate cylinder 518 (internal diameter 118 mm); outer cylinder 516 (internal diameter 175 mm); outermost outer cylinder 514 (internal diameter 190 mm); hydrogen-permeable tube 532 (external diameter 20 mm); and sweep gas tube 534 (external diameter 6 mm). Fifteen upright hydrogen-permeable tubes 532 are installed in the first catalyst layer of the second annulus 528 in an equidistant manner around the circumference.

Reforming catalyst A is a nickel based catalyst (average particle size: 2 mm in diameter). The furnace comprises a drooping burner 544, as shown in FIG. 23. The outermost outer cylinder 514 is insulated with 200 mm thick rockwool to reduce heat discharge to the external atmosphere.

(2) Operating Conditions

Supply of raw material gas (town gas 13A) on the reformer side: 32.1 mole/h

Steam supplied in raw material gas on the reformer side: 1.35 kg/h

Steam for reforming/raw material gas on the reformer side (mole ratio): 2.0

Reforming reaction temperature: 550° C.

Reforming reaction pressure: 6.03 kgf/cm$^2$-abs.

Quantity of sweep gas (steam) supplied: 1.41 kg/h

Sweep gas pressure: 1.22 kgf/cm$^2$-abs.

(3) Hydrogen Generation Test Results

A reaction under these above conditions produces 123.0 mole/h of hydrogen, accompanied by sweep gas. CO impurity in the hydrogen is less than 1 ppm. The conversion efficiency of hydrocarbons in the raw material gas is about 90%.

In contrast, a conventional reformer which does not use a hydrogen-permeable tube is hampered by chemical equilibrium, based on the relationship between operating temperature and pressure, resulting in a conversion efficiency of about 24% at this reaction temperature and pressure.

The fourth aspect of the invention facilitates industrial-scale hydrogen production, economically producing high purity hydrogen, and has the following advantages:

(a) The structure is simple and compact, comprising multiple layered cylinders. The apparatus can be constructed with a small quantity of materials.

(b) The heat capacity of the apparatus is small, as it is far lighter in weight than conventional multiple parallel reaction tube systems. The operation of the apparatus can be started and stopped quickly, and it has an excellent response to load changes.

(c) The catalyst layer can be more uniformly heated, as heat is applied from both sides. Radial thermal flux distribution is more uniform because of the structure of layered cylinders with a central furnace. This prevents the development of hot spots where temperature may exceed the limit the hydrogen-permeable tubes can withstand.

(d) Hydrogen is only generated in the second catalyst layer and is not separated or collected through the hydrogen-permeable tube there. The partial pressure of hydrogen in the generation gas therefore rises at the second catalyst layer outlet or the first catalyst layer inlet. This raises the substance transfer propulsion force for the separation and collection of hydrogen by the hydrogen-permeable tube in the first catalyst layer. It is therefore possible to reduce the area of permeation and achieve an improved separation efficiency.

(e) The collection efficiency of the generated hydrogen is improved by the counter-flow substance transfer between sweep gas in the hydrogen-permeable tube and the reformed gas in the catalyst layer.

(f) Separating and collecting the hydrogen through the hydrogen-permeable tube shifts the chemical equilibrium to the advantage of hydrogen production. The reforming temperature can therefore be reduced 150°–200° C. below that of conventional systems. As a consequence, carbon dialysis in the reforming catalyst layer is eased and the steam/hydrocarbon ratio (mole ratio) can be reduced from a standard value of 3 to 2–2.2. This vastly improves thermal efficiency while reducing the thermal energy required to heat raw material gas.

(g) The lower reaction temperature enables the use of inexpensive materials with lower heat resistance characteristics, thereby reducing construction costs.

(h) Radiating bodies ensure the catalyst layer to be heated with a uniform temperature distribution without any risk of overheating.

Figure 29:
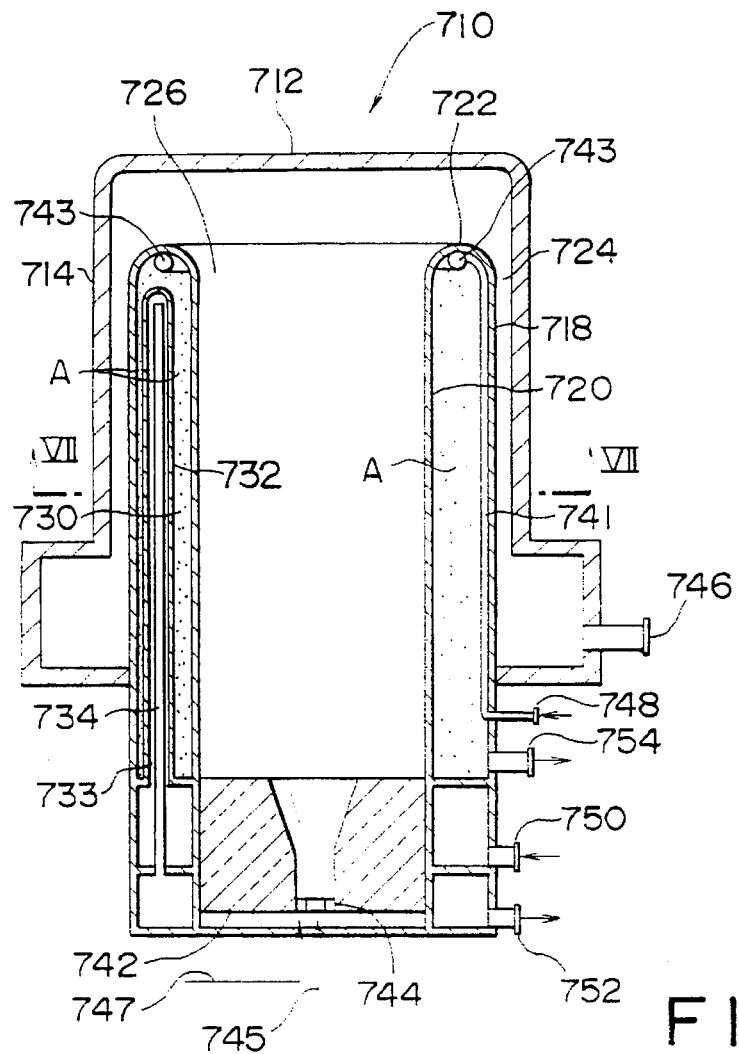
FIG. 29 is a longitudinal sectional view of embodiment 13 according to the fifth aspect of the invention.
Figure 30:
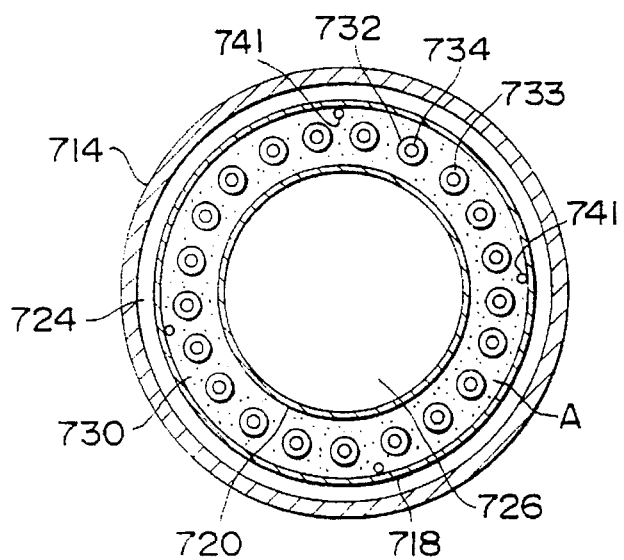
FIG. 30 is a typical transverse sectional view along the line VII—VII in FIG. 29.

FIG. 29 is a sectional view of an embodiment according to the fifth aspect of the invention. FIG. 30 outlines a horizontal section at the line VII—VII on the apparatus shown in FIG. 29.

FIGS. 29 and 30 show the hydrogen producing apparatus 710 equipped with a covered outer cylinder 714 with a ceiling 712. This cylinder contains an intermediate cylinder 718 and inner cylinder 720. All three vessels are upright cylinders.

The upper sections of the inner cylinder 720 and intermediate cylinder 718 form a closed annulus top section 722. The walls of the outer cylinder 714 and intermediate cylinder 718 create an outer annulus 724. The upper sections of the outer annulus 724 and inner cylinder space 726 are connected. An inner annulus 730 is created between the intermediate cylinder 718 and the inner cylinder 720.

A flow route for the combustion gas starts in the inner cylinder space 726 and passes through a space between the ceiling 712 of the outer cylinder 714 and the annulus connected top section 722 into the outer annulus 724. The wall and the ceiling 714 of the outer cylinder 714 are constructed of fire resistant bricks.

Reforming catalyst A fills the catalyst layer 730 in the inner annulus 730 (the same numeral is used for convenience). FIG. 30 shows a large number of cylindrical hydrogen-permeable tubes 732 with hydrogen-permeable metal membranes on an inorganic porous layer, installed vertically around the circumference of the inner annulus 730 in the catalyst layer 730. The cylindrical, stainless steel sweep gas tubes 734 are installed in a concentric manner in the hydrogen-permeable tube 732.

Figure 31:
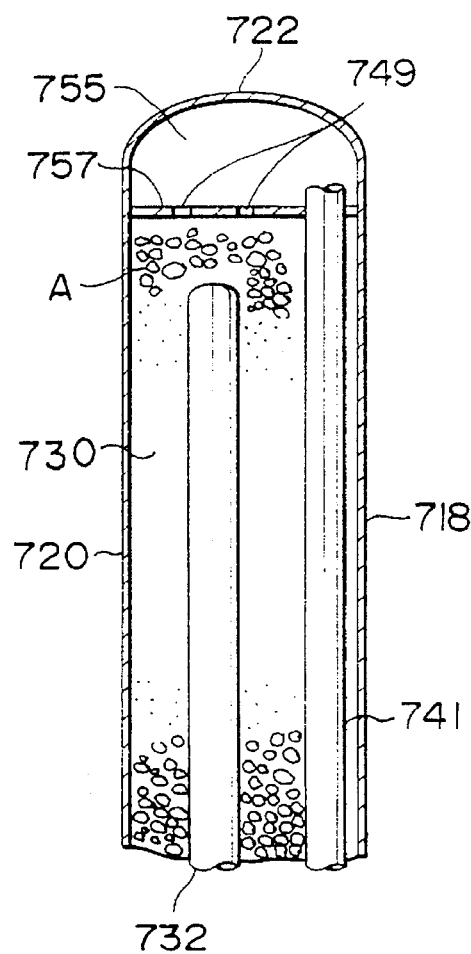
FIG. 31 shows another raw material gas distribution means of the invention.

The tubular hydrogen-permeable tube 732 has a closed top part and an external diameter of about 20 mm, as shown in FIG. 31. The tube contains a supporting material of stainless steel mesh 736. On top of the mesh is an inorganic porous layer 738 of woven stainless steel fabric, which carries the hydrogen-permeable metal membrane. A nonporous, Pd based alloy, hydrogen-permeable metal membrane 40 is coated on top of the fabric.

FIG. 29 shows the process feed gas structures. The raw material gas introduction tube 741 passes from the raw material gas inlet 748, through the reforming catalyst 730 of the inner annulus 730, and injects process feed gas directly into the top section of the inner annulus 730. The upper part is connected to the annular pipe header 743, which has many spray nozzles.

FIG. 31 shows another embodiment in which an annular space 755 is created by partitioning the top section of the inner annulus 730 with a partitioning plate 757. The raw material introduction tube 741 is connected to the annular space 755. Many small penetrated pores 749 can be created in the partitioning plate 757 as a means of distributing the gas.

An upward facing, upright combustion burner 744 is installed in the bottom section 742 of the inner cylinder space 726. The fuel gas tube 745 and air intake 747 are connected to this combustion burner 744.

FIGS. 29 and 30 support the following discussion of the processes of hydrogen producing apparatus 710. Fuel gas enters the upright combustion burner 744 via the fuel gas tube 745, and is burnt in air supplied by the air intake tube 747. The prescribed temperature is maintained by supplying to the reforming catalyst layer 730 with the heat energy necessary for the steam reforming reaction.

Combustion gas passes through the inner cylinder space 726, and the space created by the outer cylinder 714 and the connected annular top section 722 of the ceiling 712. It then moves through the outer annulus 724 and exhausts via the combustion gas outlet 746.

Both sides of the reforming catalyst A layer of the inner annulus 730 are heated during this period, achieving a uniform temperature.

The process feed gas comprises light hydrocarbon, a mixture of methanol gas or steam. This gas passes through the raw material gas inlet 748 to the raw material gas introduction tube 741 and pipe header 743. It then flows from the top section of the inner annulus 730 into the reforming catalyst layer 730, where the gas is converted into hydrogen. The generated hydrogen is selectively separated and collected through the hydrogen-permeable tube 732. The hydrogen and sweep gas exhaust from the hydrogen outlet 752 in the lower section of the hydrogen-permeable tube.

The sweep gas enters via the sweep gas inlet 750 in the top section of the apparatus. The gas rises up the dual tube space 733 between the sweep gas tube 734 and the hydrogen-permeable tube 732, sweeps the hydrogen, and enters the top end opening of the sweep gas tube 734. The gas and hydrogen move downward through the sweep gas tube and flow out of the hydrogen outlet 752. This process suppresses the partial pressure of hydrogen on the after-permeation side of the hydrogen-permeable tube 732. Steam and inert gas are used as sweep gas, for example.

Generated CO and $CO_2$ gas, plus any raw material gas which has not reacted after passing through the catalyst layer 730, flow out of the system via the off gas outlet 754.

In this embodiment, both sides of the reforming catalyst layer 730 are heated, maintaining a uniform temperature distribution. This prevents local overheating in the hydrogen-permeable tube.

Figure 32:
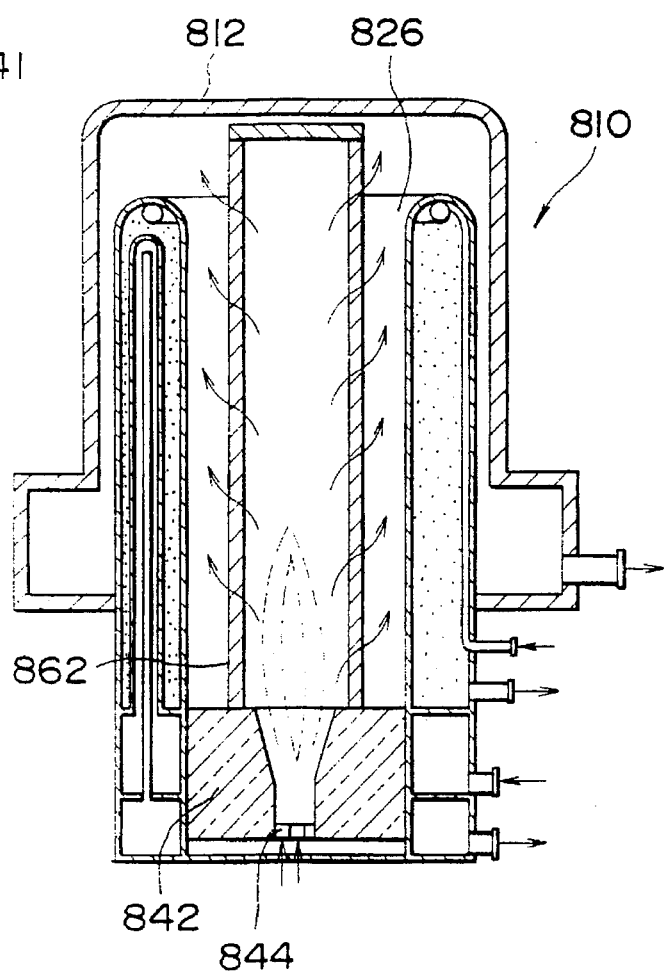
FIG. 32 is a longitudinal sectional view of embodiment 14 of the invention.
Figure 34:
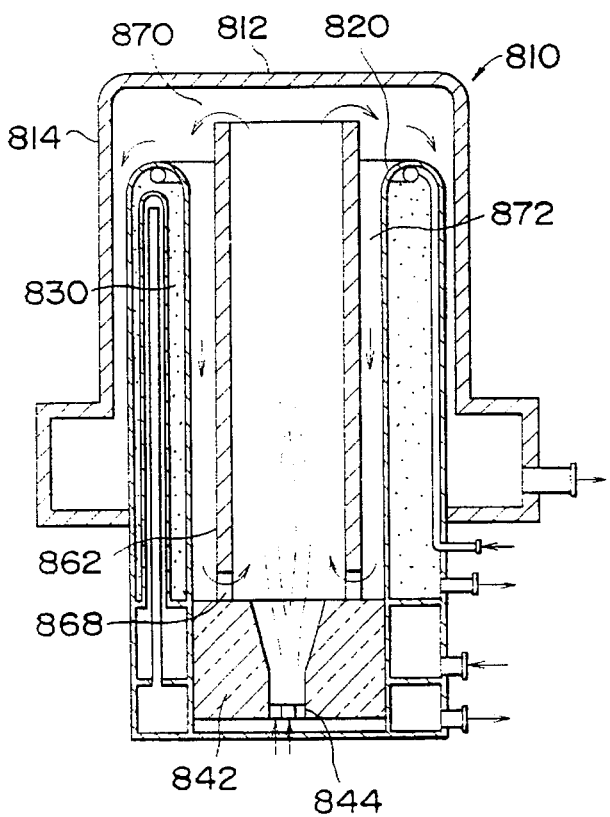
FIG. 34 is a longitudinal sectional view of another modification of embodiment 14 of the invention.

FIGS. 32 and 34 illustrate another embodiment. Only points which are different from FIGS. 29 and 30 will be described, discussions are omitted for the same points of FIGS. 29 and 30.

As shown in FIG. 32, the inner cylinder space 826 of hydrogen producing apparatus 810 contains a cylindrical radiating body 862 surrounding the upright combustion burner 844 flame. This cylindrical radiating body 862 has porous walls. The combustion burner 844 gas permeates the porous wall and flows into the inner cylinder space 826. The combustion gas heats the radiating body 862 during this process, resulting in a uniform overall temperature. The heated radiating bodies 862 evenly heats the reforming catalyst layer 830, with almost uniform heat flux.

Figure 33:
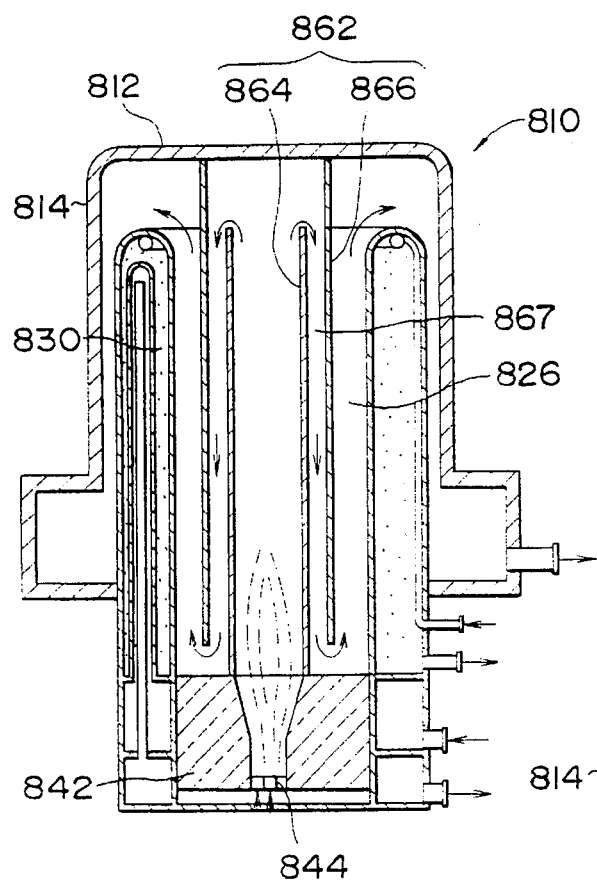
FIG. 33 is a longitudinal sectional view of a modification of embodiment 14 of the invention.

The hydrogen producing apparatus 810 in FIG. 33 is a modification of the radiating bodies 862 shown in FIG. 32. The radiating body assembly 862 shown in FIG. 33 has a dual cylinder configuration and comprises an inner cylinder radiating body 864 and an outer cylinder radiating body 866. The inner cylinder radiating body 864 is in contact with the bottom 842 of the inner cylinder 820, but has gaps between it's upper part and the ceiling 812 of the outermost outer cylinder 814. The outer cylinder radiating body 866 is in contact with the ceiling 812 in the top part, and its bottom wall is isolated in the lower part 842.

The upright combustion burner 844 gas flows up through the inner cylinder radiating body 864, then moves downward through the annulus 867 between the inner cylinder radiating body 864 and the external radiating body 866. The gas flows from the lower part of the outer cylindrical radiating body 866 into the inner cylinder space 826. The combustion gas heats up the inner cylinder radiating body 864 and the outer cylinder radiating body 866 during this process, achieving a uniform overall temperature. The heated internal radiating body 864 and external radiating body 866 heat the reforming catalyst layer 830 with an almost uniform heat flux.

The hydrogen producing apparatus 810 shown in FIG. 34 is another modification of the radiating bodies 862 in FIG. 32. The cylindrical radiating bodies 862 shown in FIG. 34 are constructed of fire resistant brick. There is a opening 868 between the lower section of the radiating bodies 862 and the bottom 842 of the hydrogen producing apparatus 810, and the top part of the radiating body 862 is separated from the ceiling 812 of the outer cylinder 814 to form a gap 870.

The combustion gas flows down through the radiating bodies 862 from the upright combustion burner 844, and out through an gap 870 in the upper section. A portion of the combustion gas moves down through the annulus 872 between the inner cylinder 820 and the radiating body 860, and returns to the radiating body 862 via the opening 868. The combustion gas thoroughly heats the radiating bodies 862 during this process, resulting in an almost uniform overall temperature. The heated radiating bodies 862 evenly heat the reforming catalyst layer 830, with almost uniform heat flux.

The hydrogen producing apparatus 810 in FIG. 35 is a modification of apparatus 710 shown in FIG. 29.

The apparatus 810 contains a column shaped catalyst burner 882 in the inner cylinder space 826, instead of an upright combustion burner. The catalyst burner 882 comprises an internal tube 884 which delivers the fuel gas and air, and a mesh external tube 886 to surround the internal tube. A combustion catalyst layer 888 fills the space between the two tubes.

The fuel gas is burnt in the combustion catalyst layer 888 and heats the overall catalyst burner 882 to a uniform temperature. The heated catalyst burner 882 evenly heats the reforming catalyst layer 830, with almost uniform heat flux.

In the following, a specific example for the fifth aspect of the invention will be described.

(1) Apparatus Structure

FIG. 29 shows a hydrogen producing apparatus 710. The reaction apparatus as shown in FIG. 29 has an effective length of 600 mm and is structured as: inner cylinder 720 (internal diameter 100 mm); intermediate cylinder 718 (internal diameter 173 mm); outer cylinder 714 (internal diameter 188 mm); hydrogen-permeable tube 732 (external diameter 20 mm); and sweep gas tube 734 (external diameter 6 mm). Fifteen upright hydrogen-permeable tubes 732 are installed in the reforming catalyst layer of the inner annulus 730 in an equidistant manner around the circumference.

Reforming catalyst A is a nickel based catalyst (average particle size: 2 mm in diameter). The furnace comprises a upright burner 744, as shown in FIG. 29. The outer cylinder 714 is insulated with 200 mm thick rockwool to reduce heat discharge to the external atmosphere.

(2) Operating Conditions

Supply of raw material gas (town gas 13A) on the reformer side: 47.8 mole/h

Steam supplied in raw material gas on the reformer side: 2.03 kg/h

Steam for reforming/raw material gas on the reformer side (mole ratio): 2.0

Reforming reaction temperature: 550° C.

Reforming reaction pressure: 6.05 kgf/cm$^2$-abs.

Quantity of sweep gas (steam) supplied: 2.08 kg/h

Sweep gas pressure: 1.08 kgf/cm$^2$-abs.

(3) Hydrogen Generation Test Results

A reaction under these above conditions produces 180.4 mole/h of hydrogen, accompanied by sweep gas. CO impurity in the hydrogen is less than 1 ppm. The conversion efficiency of hydrocarbons in the raw material gas is about 83%.

In contrast, a conventional reformer which does not use a hydrogen-permeable tube is hampered by chemical equilibrium, based on the relationship between operating temperature and pressure, resulting in a conversion efficiency of 24% at this reaction temperature and pressure.

In this embodiment, the raw material gas flows downward through the reforming catalyst layer from the upper section of the inner annulus. The sweep gas enters from the lower section of the annulus created between the hydrogen-permeable tube and the sweep gas tube. The sweep gas and hydrogen pass through the sweep gas tube and are extracted from its lower section. The same effects can be obtained when the raw material gas and sweep gas flow in opposite directions.

Based on the above structure, the fifth aspect of the invention facilitates industrial-scale hydrogen production, economically producing high purity hydrogen, and has the following advantages:

(a) The upward facing flame from the upright burner improves the stability of the flame and enables the construction of a larger hydrogen producing apparatus. This also supports significant changes in processing quantities while using one large apparatus.

(b) The lower end of the hydrogen-permeable tube is fixed while its upper section is free. This reduces catalyst powdering caused by friction between the hydrogen-permeable tube and the reforming catalyst layer as a result of thermal expansion. This structure also eliminates destruction of the reforming catalyst by pressure in the lower section which may occur when the upper end of the hydrogen-permeable tube is fixed. It is therefore possible to use reforming catalysts of relatively lower strength and construct larger apparatuses by making the reforming catalyst layer taller.

This hydrogen producing apparatus according to the fifth aspect of the invention has the above-mentioned advantages over hydrogen producing apparatuses with drooping combustion burners. In addition to the above mentioned advantages, the fifth aspect of the invention has the following benefits which are common with corresponding apparatuses having drooping combustion burners.

(c) The structure is simple and compact, comprising multiple layered cylinders. The apparatus can be constructed with a small quantity of materials.

(d) The heat capacity of the apparatus is small, as it is far lighter in weight than conventional multiple parallel reaction tube systems. The operation of the apparatus can be started and stopped quickly, and it has an excellent response to load changes.

(e) The catalyst layer can be more uniformly heated, as heat is applied from both sides of the layer. Radial thermal flux distribution is more uniform because of the structure of layered cylinders with a central furnace. This prevents the development of hot spots where temperature may exceed the limit the hydrogen-permeable tubes can withstand.

(f) Because the catalyst layer is heated from both sides, the amount of heat transfer from the combustion gas to the catalyst layer increases. In other words, it becomes possible to create a catalyst layer which is horizontally thicker.

(g) The collection efficiency of generated hydrogen is improved by the counter-flow substance transfer between sweep gas in the hydrogen-permeable tube and the reforming gas in the catalyst layer.

(h) Separating and collecting the hydrogen through the hydrogen-permeable tube shifts the chemical equilibrium to the advantage of hydrogen production. The reforming temperature can therefore be reduced 150°–200° C. below that of conventional systems. This vastly improves thermal efficiency while reducing the thermal energy required to heat raw material gas.

(i) The lower reaction temperature enables the use of inexpensive materials with lower heat resistance characteristics, thereby reducing construction costs.

(j) Radiating bodies ensure the catalyst layer is heated with a uniform temperature distribution without any risk of overheating.

Figure 36:
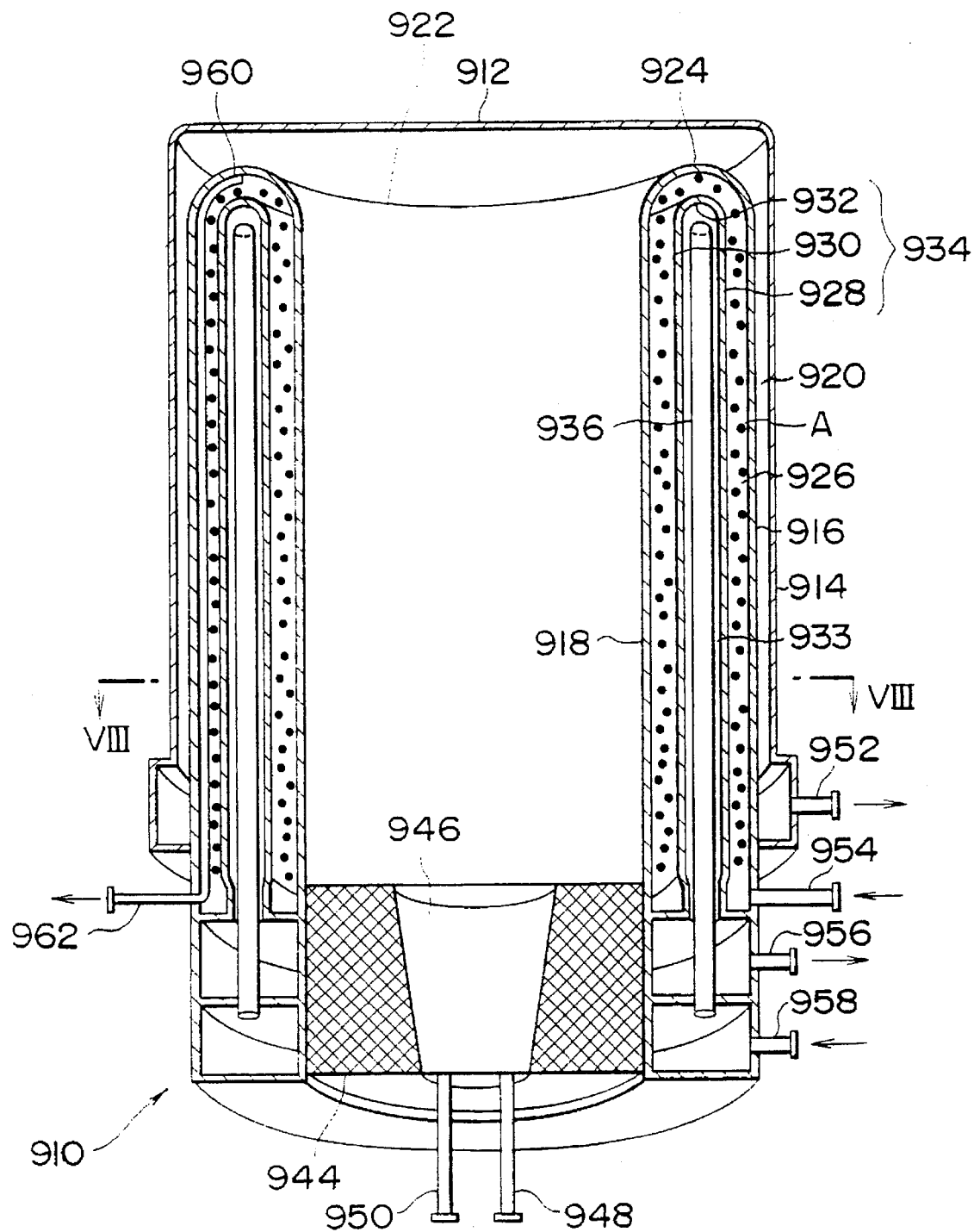
FIG. 36 is a perspective sectional view of embodiment 16 according to the sixth aspect of the invention.
Figure 37:
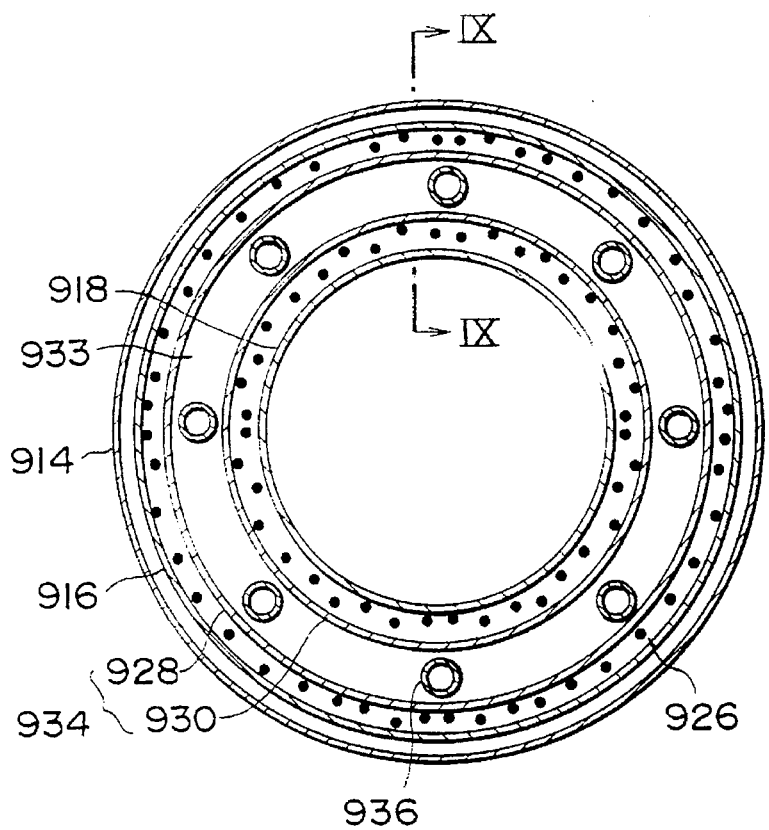
FIG. 37 is a typical transverse sectional view along the line VIII—VIII in FIG. 36.

FIG. 36 is an perspective sectional view of embodiment 16 for the sixth aspect of the invention. FIG. 37 is an outlined transverse sectional view of the apparatus in FIG. 36. FIGS. 37 and 37 show the hydrogen producing-apparatus 910 equipped with a covered outer cylinder 914 with a ceiling 912, and with an intermediate cylinder 916 and inner cylinder 918, both of which are installed in a concentric manner within the outer cylinder. In this embodiment the outer cylinder 914, intermediate cylinder 916 and inner cylinder 918 are all upright cylinders.

The outer cylinder 914 and intermediate cylinder 916 create the first annulus 920 between their walls. The first annulus 920 and the inner cylinder space 922 in the inner cylinder 918 are connected at their top parts. The upper sections of the intermediate cylinder 916 and inner cylinder 918 are connected, creating a closed annulus with a connected top part 924. These cylinders create a second annulus 926 between their walls.

A flow route for the combustion gas starts in the inner cylinder 922 and passes through a space between the ceiling 912 of the outer cylinder 914 and the top annulus 924 into the first annulus 920. The wall and the ceiling 912 of the outer cylinder 914 are both constructed of fire resistance bricks.

The catalyst layer 926 in the second annulus 926 (the same numeral is used for convenience) is filled with reforming catalyst A.

Furthermore, the catalyst layer, as will be explained later on in FIG. 38, has an external wall 928, which has a hydrogen-permeable nonporous Pd membrane 942 on an inorganic porous layer 940, an internal wall 930 and an annular top wall 932. The double-walled hydrogen-permeable cylinder 934 which creates the third annulus 933 is installed in a concentric manner in the second annulus 926. As shown in FIG. 37, the double-walled hydrogen-permeable cylinder 934 contains many parallel stainless steel cylindrical sweep gas tubes 936, installed around the inner circumference of the third annulus 933 of the double-walled hydrogen-permeable cylinder 934.

Figure 38:
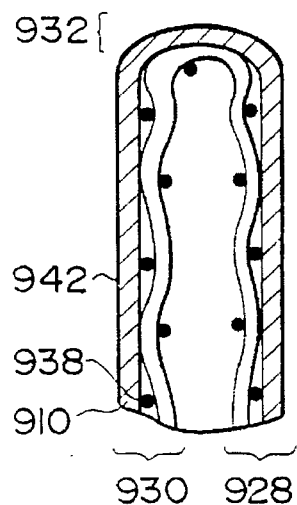
FIG. 38 is a partial sectional view of double-walled hydrogen-permeable cylinders along the line IX—IX in FIG. 37.

FIG. 38 shows the external wall 928 of the double-walled hydrogen-permeable cylinder 934, its internal wall 930 and the annular top wall 932. These walls all contain stainless steel mesh 938 as supporting material. An inorganic porous layer 940 of stainless steel non-woven fabric lies on top of the mesh as a frame for the hydrogen-permeable metallic membrane. A non-porous Pd membrane 942 is disposed on top of the fabric to form the hydrogen-permeable metallic membrane.

FIG. 36 shows an upright upwardly facing combustion burner 946 installed in the bottom wall 944 of the inner cylinder space 922. This combustion burner 946 is connected to a fuel gas tube 948 and an air intake tube 950.

Referring to FIGS. 36 and 37, the processes of the hydrogen producing apparatus 910 will be described in the following.

The upright combustion burner 946 in the bottom wall 944 of the inner cylinder 918 burns gas from the fuel gas tube 948 in air from the air intake tube 950. The combustion supplies the heat energy necessary to maintain the temperature required for the steam reforming reaction in the catalyst layer 926.

The combustion gas flows into the inner cylinder space 922, the space between the ceiling 912 and the annulus with the connected top 924 of the outer cylinder 914, and the first annulus 920. It is then exhausted via the combustion gas outlet 952. The gas heats the catalyst layer 926, which is filled with reforming catalyst A, in the second annulus 926 during this process.

The raw material gas comprises a mixture of with either steam, light hydrocarbons or methanol gas. It is introduced via the raw material gas inlet 954 in the lower section of the second annulus 926. The gas flows into the catalyst layer 926 and is converted into hydrogen at high temperatures.

The generated hydrogen is selectively separated and collected through double-walled hydrogen-permeable cylinders 934. The sweep gas and hydrogen pass through the third annulus 933 and exhaust through the hydrogen outlet 956 in the lower section of the third annulus 933.

The sweep gas enters through the sweep gas inlet 958 in the lower section of the apparatus. The sweep gas flows up the sweep gas tube 936, then into the third annulus 933 through the opening in the upper end. It then sweeps the hydrogen as it falls, and exits via the hydrogen outlet 956.

Extracting the hydrogen and sweep gas facilitates maintenance of a lower partial pressure of hydrogen on the after-permeation side of the hydrogen-permeable tube 932. Steam and inert gas are used as sweep gas.

Generated CO and $CO_2$ gas and any raw material gas which has not reacted after passing through the catalyst layer 926, is gathered by the off gas tube 960 which opens in the upper section of the catalyst layer 926, and is then exhausted from the system via the off gas outlet 962.

Figure 39:
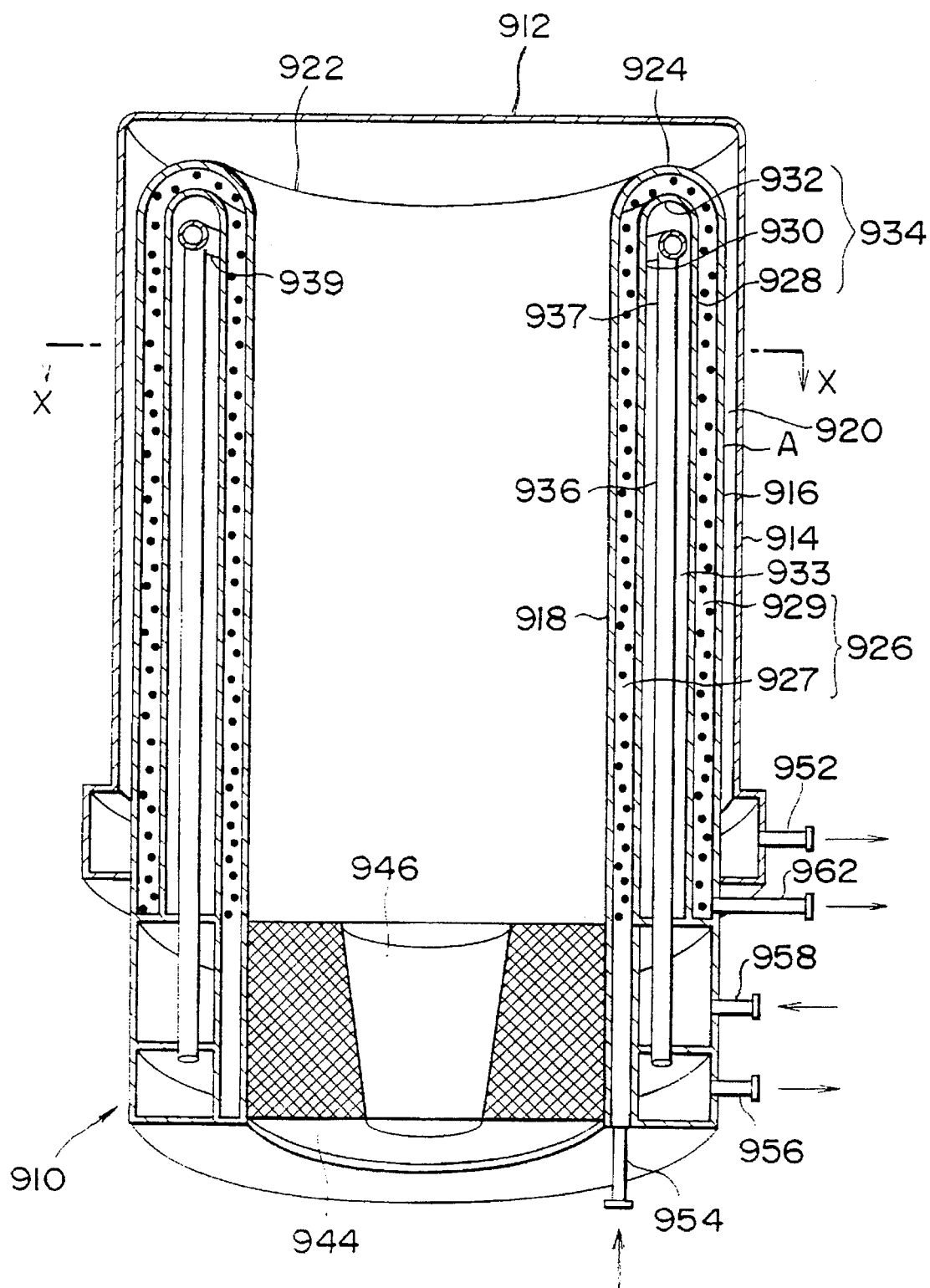
FIG. 39 is a perspective sectional view of embodiment 17 of the invention.
Figure 40:
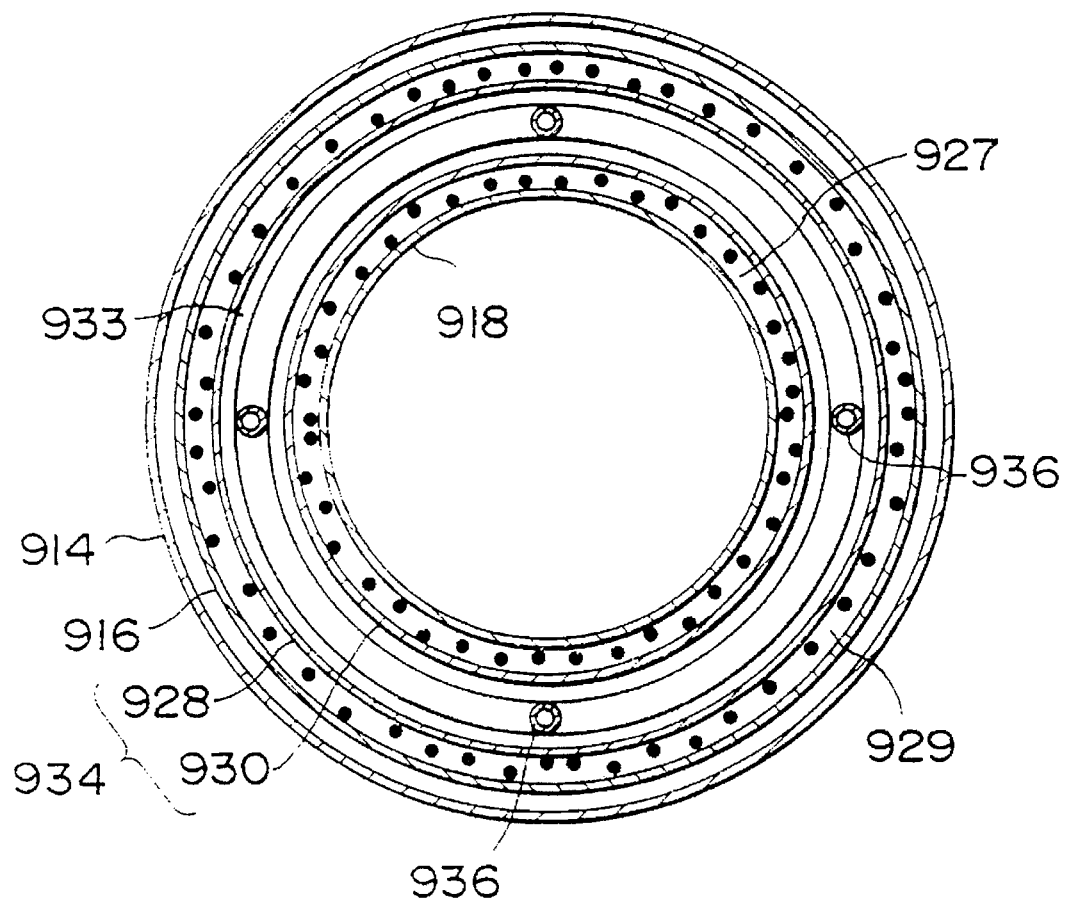
FIG. 40 is a typical transverse sectional view along the line X—X in FIG. 39.

FIG. 39 shows an perspective sectional view of the apparatus 910 in embodiment 17 for the sixth aspect of the invention. FIG. 40 is a transverse sectional view of the apparatus 910 in FIG. 39.

The apparatus 910 differs from embodiment 16 in the following points. First, the sweep gas tube structure is different, as a relatively small number, only four, sweep gas tubes 936 are installed in the third annulus 933 of the double-walled hydrogen-permeable cylinder 934. These tubes are connected to the annular pipe header 939 in the upper section 937 of the annular top wall 932 of the double-walled hydrogen-permeable cylinder 934. The annular pipe header 939 has many penetration pores (not illustrated) which perforate the header wall.

Second, the catalyst layer 926 comprises an inner catalyst layer 927 in the annulus created by the inner cylinder 918 and the internal wall 930 of the double-walled hydrogen-permeable cylinder 934, and an outer catalyst layer 929 in the annulus created by the intermediate cylinder 916 and the external wall 928 of the double-walled hydrogen-permeable cylinder 934.

Third, the raw material gas (process feed gas) enters through the raw material gas inlet 954 in the lower section of the inner catalyst layer 927, and flows upward through the inner catalyst layer 927. As it moves down through the outer catalyst layer 929, the gas is converted into hydrogen at high temperatures. The generated hydrogen gas is selectively separated by the double-walled hydrogen-permeable cylinders 934. Sweep gas collects the hydrogen, and passes through the penetration pores of the annular pipe header 939 and the sweep gas tube 936. The combined gases are exhausted via the hydrogen outlet 956 in the lower section of the sweep gas tube 936.

Forth, sweep gas is fed from the sweep gas inlet 958 in the lower part of the apparatus. The sweep gas and hydrogen flow up the annulus 933, through the penetration pores of the annular pipe header 939 and the sweep gas tube 936, and exhaust via the hydrogen outlet 956 in the lower part of the sweep gas tube 936.

Fifth, generated CO and $CO_2$ gases, and any raw material gas which has not reacted after passing through the outer catalyst layer 929, are exhausted via the off gas outlet 962 in the lower section of the outer catalyst layer 929.

Apart from these differences, the hydrogen producing apparatus 910 in embodiment 17 has the same structure as the apparatus in embodiment 16. The catalyst layer in embodiment 17 is twice as high as that of embodiment 16, and the apparatus in embodiment 17 provides more advantages to the reforming reaction.

Figure 41:
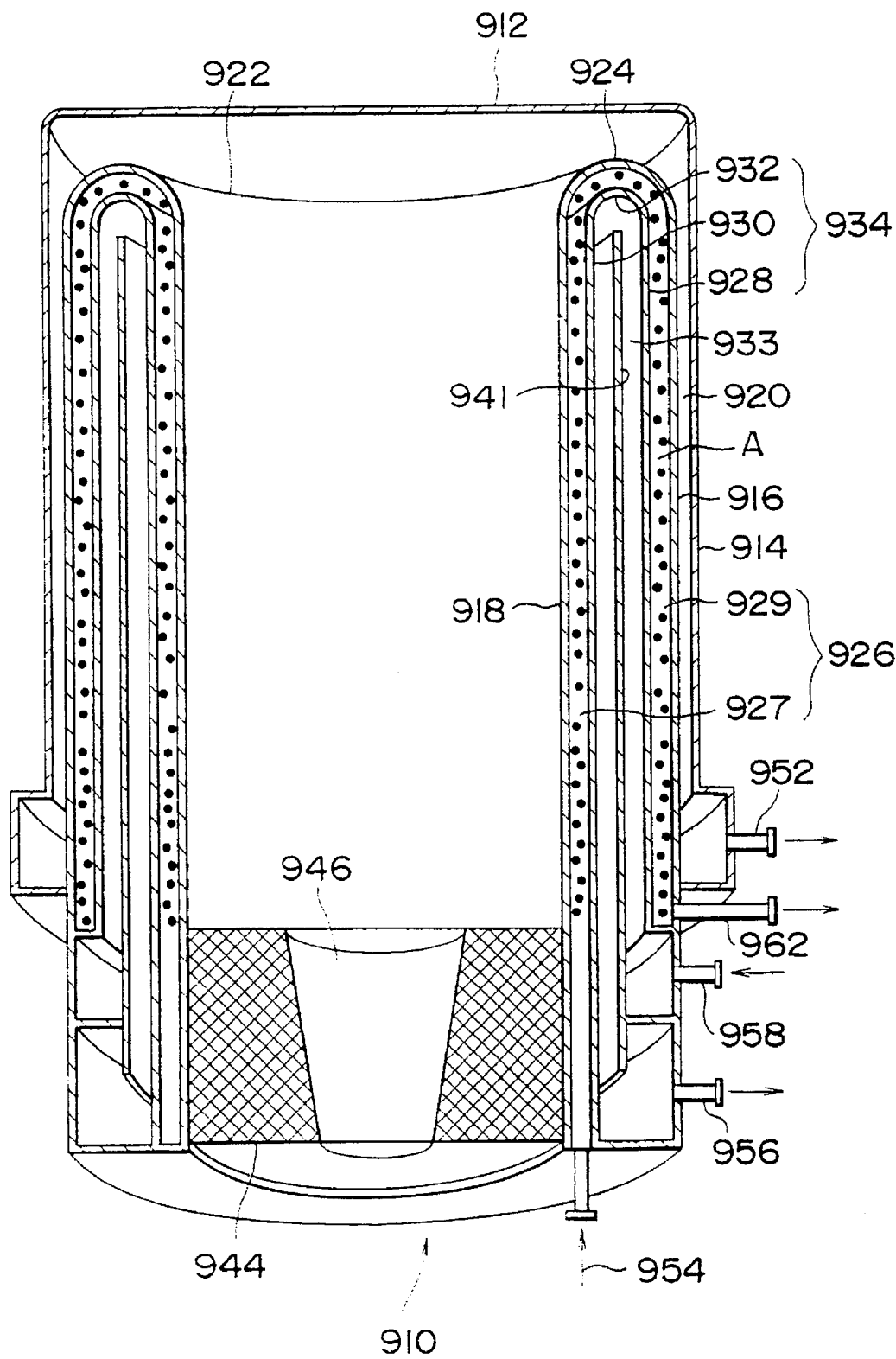
FIG. 41 is a perspective sectional view of embodiment 18 of the invention.

FIG. 41 is a perspective sectional view of embodiment 18 of the hydrogen producing apparatus 910 for the sixth aspect of the invention. The point of variance from embodiment 17 is that, instead of inserting the sweep gas tube as indicated in FIG. 41, the cylindrical partitioning wall 941 is installed in a concentric manner in the third annulus 933 of the double-walled hydrogen-permeable cylinder 934.

The sweep gas is fed from the sweep gas inlet 958 in the lower section of the apparatus, flows up the annulus between the partitioning wall 941 and external wall 928 of the double-walled hydrogen-permeable cylinder 934, mixing with and sweeping the hydrogen. The gas then flows from the top section of the annulus into the annulus between the partitioning wall 941 and the internal wall 930 of the double-walled hydrogen-permeable cylinder 934, moves down the annulus and passes out through the hydrogen outlet 956 in the lower section.

Apart from these differences, the structure of the hydrogen producing apparatus 910 in embodiment 18 is the same as the hydrogen producing apparatus 910 in embodiment 17. As embodiment 18 has a cylindrical partitioning wall 941 instead of the sweep gas tube found in embodiments 16 and 17, the structure of the apparatus is simpler.

An example will be described below for the sixth aspect of the invention.

(1) Apparatus Structure

FIG. 39 shows a hydrogen producing apparatus 910. The reaction apparatus in FIG. 39 has an effective length of 600 mm and is structured as: inner cylinder 918 (internal diameter 100 mm); intermediate cylinder 916 (internal diameter 173 mm); outer cylinder 914 (internal diameter 188 mm); double-walled hydrogen-permeable cylinder 934 (internal diameter 125 mm and external diameter 165 mm); and sweep gas tube 936 (external diameter 6 mm). A double-walled hydrogen-permeable cylinders 934 is installed in the catalyst layer of the second annulus 926.

Reforming catalyst A is a nickel based catalyst (average particle size: 2 mm in diameter). The furnace comprises an upright burner 46 as shown in FIG. 39. The outer cylinder 14 is insulated with 200 mm thick rockwool to reduce heat discharge to the external atmosphere.

(2) Operating Conditions

Supply of raw material gas (town gas 13A) on the reformer side: 43.0 mole/h

Steam supplied in raw material gas on the reformer side: 1.55 kg/h

Steam for reforming/raw material gas on the reformer side (mole ratio): 2.0

Reforming reaction temperature: 560° C.

Reforming reaction pressure: 6.10 $kgf/cm^2$-abs.

Quantity of sweep gas (steam) supplied: 1.90 kg/h

Sweep gas pressure: 1.25 $kgf/cm^2$-abs.

(3) Hydrogen Generation Test Results

A reaction under these conditions produces 162.0 mole/h of hydrogen, accompanied by sweep gas. CO impurity in the hydrogen is less than 1 ppm. The conversion efficiency of hydrocarbons in the raw material gas is about 85%.

In contrast, a conventional reformer which does not use a hydrogen-permeable tube is hampered by chemical equilibrium, based on the relationship between operating temperature and pressure, resulting in a conversion efficiency of 25% at this reaction temperature and pressure.

In embodiment 17, the raw material gas flows up the catalyst layer from the lower section of the second annulus. The sweep gas enters from the lower section of the sweep gas tube then flows down through the third annulus. The gas and hydrogen are extracted from the lower part of the annulus. In embodiment 18, the raw material gas enters from the lower section of the inner catalyst layer, flows up through the inner catalyst layer, and moves down through the outer catalyst layer. The sweep gas enters from the lower section of the third annulus then flows up through it. The gas and hydrogen are extracted from the lower section of the sweep gas tube via an annular pipe header. In embodiment 19, the raw material gas enters from the lower section of the inner catalyst layer. The sweep gas enters from the lower part of the annulus between the partitioning wall and the external wall of the double-walled hydrogen-permeable tube then flows up the annulus. The gas and hydrogen are extracted from the lower section of the annulus between the partitioning wall and the internal wall of the double-walled hydrogen-permeable tube. The same effect can be obtained by reversing the flow direction of the raw material gas and sweep gas in embodiments 17 and 19, or by reversing the flow direction or either of these gases in embodiment 18.

Based on the above structure, the sixth aspect of the invention facilitates industrial-scale hydrogen production, economically producing high purity hydrogen, and has the following advantages:

(a) The upward facing flames of the upright burner improve the stability of the flames and enable the construction of a larger hydrogen producing apparatus. This also supports significant changes in processing quantities while using one large apparatus.

(b) The lower end of the hydrogen-permeable tube is fixed while its upper section is free. This reduces catalyst powdering caused by friction between the hydrogen-permeable tube and the reforming catalyst layer as a result of thermal swelling. This structure also eliminates destruction of the reforming catalyst by pressure in the lower section which can occur when the upper end of the hydrogen-permeable tube is fixed. It is therefore possible to use reforming catalysts of relatively lower strength and construct larger apparatuses by making the reforming catalyst layer taller.

This hydrogen producing apparatus according to the sixth aspect of the invention has certain above-mentioned advantages over hydrogen producing apparatuses with drooping combustion burners. In addition to the above mentioned advantages, the sixth aspect of the invention offers the following benefits which are common with corresponding apparatuses with drooping combustion burners.

(c) The structure is simple and compact as the apparatus is composed of multiple layers of cylinders, including a double-walled hydrogen-permeable tube. It is therefore possible to build the apparatus economically and with a small quantity of materials.

(d) The heat capacity of this apparatus is small as it is far lighter in weight than conventional multiple tube systems with many parallel reaction tubes. The operation of the apparatus can be started and stopped quickly, and its response to load changes is excellent.

(e) The catalyst layer can be heated more uniformly because heat is applied from both sides. Radial thermal flux distribution is also more uniform because of the structure of layered cylinders with the furnace in the center. This also prevents hot spots from developing and from exceeding the temperature limit the double-walled hydrogen-permeable cylinders can withstand.

(f) The counter-flow substance transfer between the sweep gas in the double-walled hydrogen-permeable cylinder and the reformed gas in the catalyst layer improves the generated hydrogen collection efficiency.

(g) Separating and collecting the hydrogen via the double-walled hydrogen-permeable cylinder shifts the chemical equilibrium to the advantage of hydrogen production. It is therefore possible to reduce the reforming temperature by 150°–200° C. below that of conventional apparatuses. This reduces the energy required to heat the raw material gas and vastly improves thermal efficiency.

(h) The lower reaction temperature supports the use of inexpensive construction materials with low heat resistance characteristics. This reduces costs.

Figure 42:
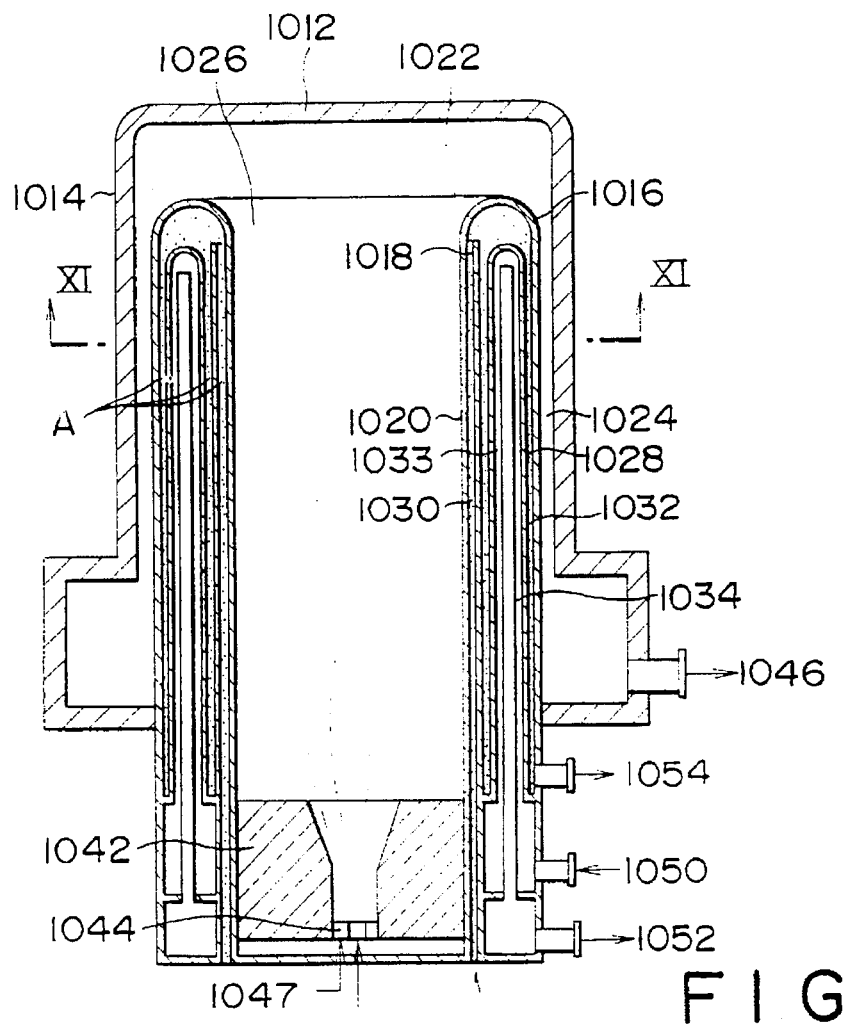
FIG. 42 is a longitudinal sectional view of embodiment 19 according to the seventh aspect of the invention.
Figure 43:
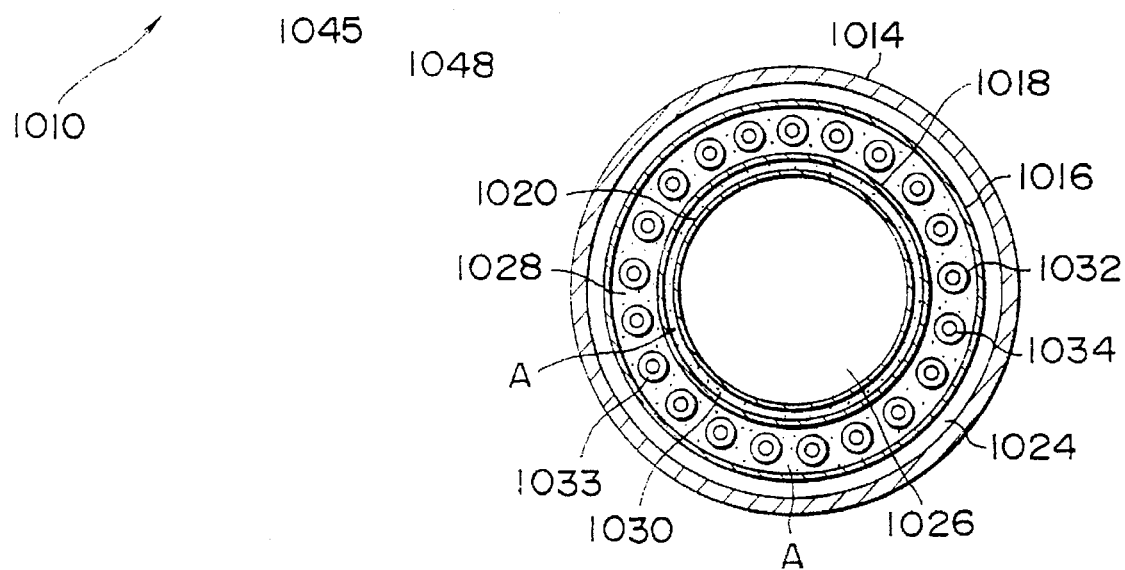
FIG. 43 is a typical transverse sectional view along the line XI—XI in FIG. 42.

FIG. 42 is an illustrated sectional view of embodiment 19 for the hydrogen producing apparatus according to the seventh aspect of the invention. FIG. 43 is a transverse sectional view at the line XI—XI in FIG. 42.

The hydrogen producing apparatus 1010 is equipped with a covered outermost outer cylinder 1014 with a ceiling 1012. Within this cylinder is a concentric arrangement consisting of an outer cylinder 1016, intermediate cylinder 1018 and inner cylinder 1020. All four vessels are upright cylinders.

The upper sections of the inner cylinder 1020 and the outer cylinder 1016 are connected, forming a closed annulus with a connected top 1022. The walls of the outermost cylinder 1014 and the outer cylinder 1016 create the first annulus 1024. The top sections of the first annulus 1024 and the inner cylinder space 1026 are connected. A flow route or the combustion gas starts in the inner cylinder space 1026 and passes through a space between the ceiling 1012 of the outermost cylinder 1014 and the connected top annulus 1022 into the first annulus 1024. The walls of the outer cylinder 1016 and the intermediate cylinder 1018 create a second annulus 1028. The walls of the intermediate cylinder 1018 and the inner cylinder 1020 create a third annulus 1030. The bottoms of the second annulus 1028 and the third annulus 1030 are connected.

The wall of the outermost outer cylinder 1014 and the ceiling wall 1012 of the outermost outer cylinder 1014 are constructed of fire resistant brick.

The first and second catalyst layer 1028 and 1030 (for the sake of convenience the same numerals as the second and third annuluses are used) which are filled with reforming catalyst A in the second annulus 1028 and the third annulus 1030 are created. FIG. 43 shows a large number of cylindrical hydrogen-permeable tubes 1032 with hydrogen-permeable metal membranes on an inorganic porous layer, installed vertically around the circumference of the second annulus 1028 in the first catalyst layer 1028. The cylindrical, stainless steel sweep gas tubes 1034 are installed in a concentric manner in the hydrogen-permeable tube 1032.

As shown in FIG. 3, the tubular hydrogen-permeable tube 1032 (or 32) has a closed end and an external diameter of about 20 mm. The tube contains a supporting material made of stainless steel mesh 36. On top of the mesh is an inorganic porous layer 38 of woven stainless steel fabric, which carries the hydrogen-permeable metal membrane. A non-porous, Pd based alloy, hydrogen-permeable metal membrane 40 is coated on top of the fabric.

FIG. 42 shows that the upright combustion burner 1044 faces upward from the bottom 1042 of the inner cylinder space 1026. The combustion burner 1044 is connected to a fuel gas tube 1045 and air intake tube 1047.

Referring to FIGS. 42 and 43, the processes of hydrogen producing apparatus 1010 will be described in the following. The fuel gas enters the combustion burner 1044 via the fuel gas tube 1045, and is burnt in air supplied by the air intake tube 1047. The prescribed temperature is maintained by supplying to the first and second catalyst 1028 and 1030 the heat energy necessary for the steam reforming reaction. Combustion gas passes through the space in the inner cylinder 1026 and the space created by the ceiling 1012 of the outermost outer cylinder 1014 and the annular connection section 1022. The gas then moves through the first annulus 1024 and exhausts via the combustion gas outlet 1046.

The process feed gas comprises either light hydrocarbons or a mixture of methanol gas and steam. The gas enters via the raw material gas inlet 1048 in the lower section of the third annulus 1030. It flows into the third annulus 1030 and up through the second catalyst layer 1030, where it is converted into hydrogen at a high temperature. It then flows into the top of the first catalyst layer 1028 of the second annulus 1028, where any process feed gas which has not reacted is converted into hydrogen.

The generated hydrogen is selectively collected through the hydrogen-permeable tube 1032 installed in the first catalyst layer 1028 and flows, with the sweep gas, through the hydrogen outlet 1052 in the lower section of the tube.

The sweep gas is fed from the sweep gas inlet 1050 in the lower part of the apparatus. The gas flows up through the dual tube space 1033 between the sweep gas tube 1034 and the hydrogen-permeable tube 1032, and flows into the open top end of the sweep gas tube 1034, sweeping the hydrogen as it moves. The gas and generated hydrogen fall and flow out of the hydrogen outlet 1052. By removing the hydrogen with sweep gas, the partial pressure of hydrogen on the after-permeation side of the hydrogen-permeable tube 1032 is suppressed. Steam and inert gas can be used as sweep gas.

The generated CO and $CO_2$, plus any raw material gas which has not reacted after passing through the first catalyst layer 1028, exit the system via the off gas outlet 1054.

In this embodiment, the process feed gas passes through the high temperature catalyst layer 1030 in the inner cylinder 1020 which forms the furnace. The gas is reformed into hydrogen at a high conversion rate, and is selectively collected through the hydrogen-permeable tube 1032 in the second annulus 1028. Any process feed gas which has not reacted is reformed in the reforming catalyst layer 1028 of the second annulus 1028, significantly improving the conversion efficiency for the entire apparatus.

Figure 44:
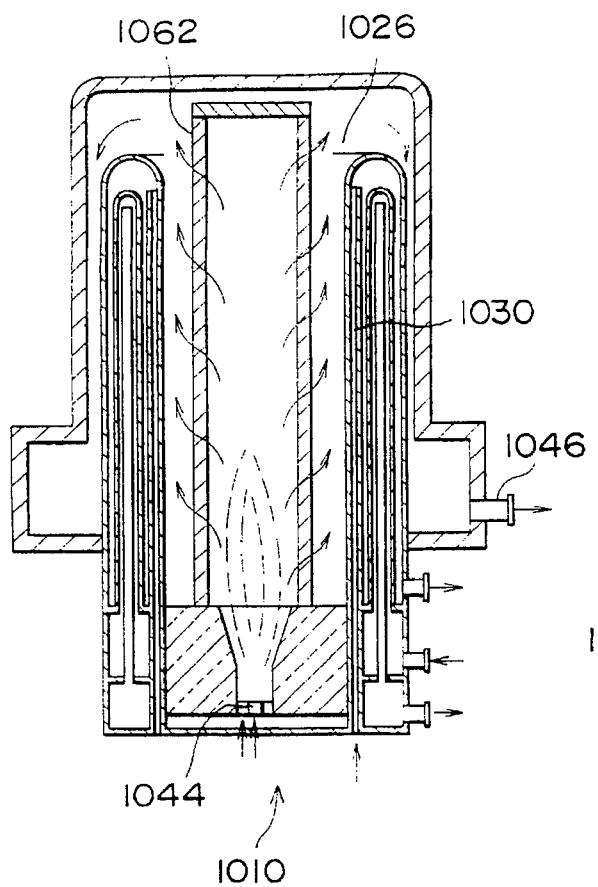
FIG. 44 is a longitudinal sectional view of embodiment 20 of the invention.
Figure 45:
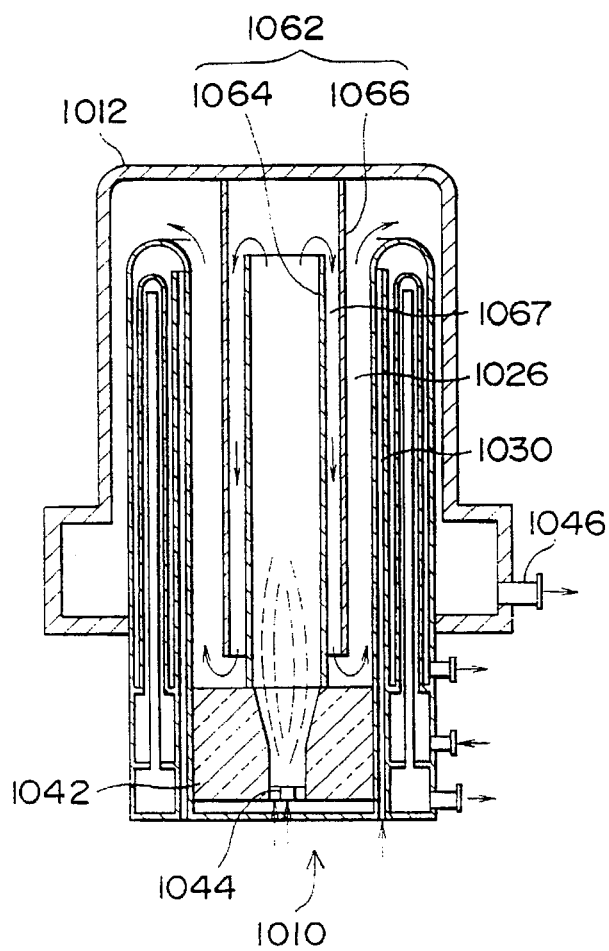
FIG. 45 is a longitudinal sectional view of a modification of embodiment 20 of the invention.
Figure 46:
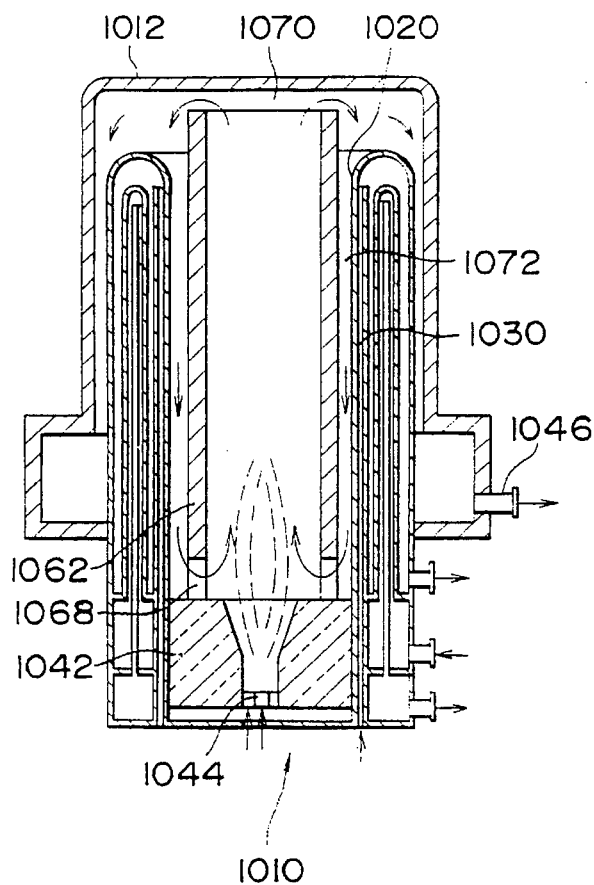
FIG. 46 is a longitudinal sectional view of another modification of embodiment 20 of the invention.

Referring to FIGS. 44 to 46, embodiment 20 will be described. Only those parts of these figures which are different from the hydrogen producing apparatus illustrated in FIGS. 42 and 43 will be explained.

The inner cylinder space 1026 of hydrogen producing-apparatus 1010 of FIG. 44 contains a cylindrical radiating body 1062 surrounding the upright combustion burner 1044 flame. This cylindrical radiating body 1062 has porous walls. The combustion burner 1044 gas permeates the porous wall and flows into the inner cylinder space 1026. The combustion gas heats the radiating body 1062 during this process, resulting in a uniform overall temperature. The heated radiating bodies 1062 evenly heat the reforming catalyst layer 1030, with almost uniform heat flux.

The hydrogen producing apparatus 1010 in FIG. 45 is a modification of the radiating bodies 1062 of FIG. 44. The radiating body assembly 1062 shown in FIG. 45 has a dual cylinder configuration and comprises an inner cylinder radiating body 1064 and outer cylinder radiating body 1066. The inner cylinder radiating body 1064 is in contact with the bottom 1042 of the inner cylinder 1020, but has gaps between it's upper part and the ceiling 1012 of the outermost outer cylinder 1014. The outer cylinder radiating body 1066 is in contact with the upper part of the ceiling 1012, and its lower section is separated from the bottom 442.

The combustion burner 1044 gas flows up through the internal radiating body 1064, then moves downward through the annulus 1067 between the internal radiating body 1064 and the external radiating body 1066. The gas flows from the lower part of the external radiating body 1066 into the inner cylinder space 1026. The combustion gas heats up the inner cylinder radiating body 1064 and the outer cylinder radiating body 1066 during this process, achieving a uniform overall temperature. The heated internal radiating body 1064 and external radiating body 1066 heat the reforming catalyst layer 1030 with an almost uniform heat flux.

The hydrogen producing apparatus 1010 in FIG. 46 illustrates another modification of the radiating body 1062 in FIG. 44. The radiating body 1062 in FIG. 46 is cylindrical, and constructed of fire resistant brick. There is a opening 1068 between the lower section of the radiating body 1062 and the bottom 1042 of the hydrogen producing apparatus 1010. The upper section of the radiating body 1062 has a gap 1070 which is separated from the ceiling 1012 of the outermost cylinder 1014.

The combustion gas flows up from the upright combustion burner 1044 though the radiating body 1062, and is emitted from the gap 1070 in the upper section. A portion of the combustion gas moves down in the annulus 1072 between the inner cylinder 1020 and the radiating body 1060, and circulates by flowing into the radiating body 1062, via the opening 1068. The temperature of the radiating body 1062 is maintained at a uniform level by this process. The heated radiating body 1062 heats the reforming catalyst layer 1030 in an even manner, with almost uniform heat flux.

Figure 47:
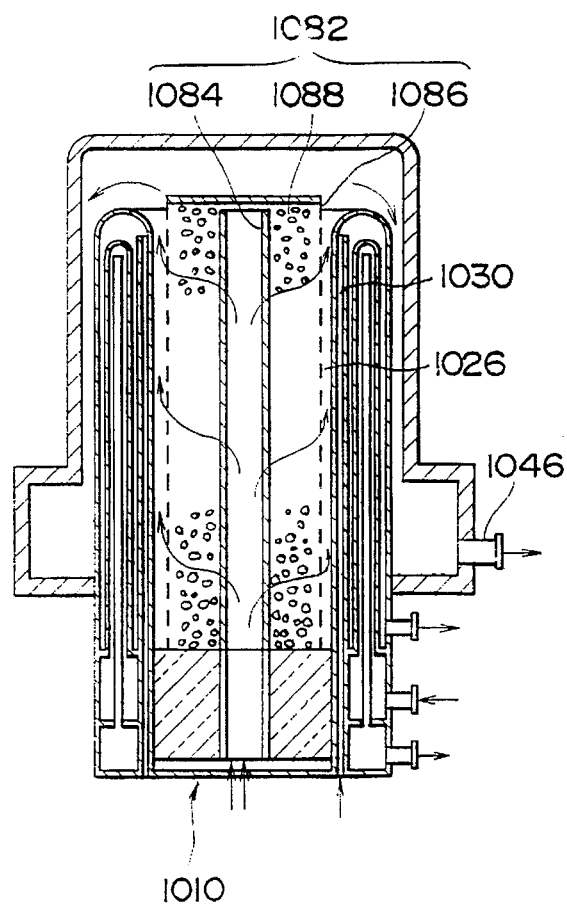
FIG. 47 is a longitudinal sectional view of embodiment 21 of the invention.

The hydrogen producing apparatus 1010 in FIG. 47 is a modification (embodiment 21) of the hydrogen producing apparatus 1010 in FIG. 42. In this instance, a column shaped catalyst burner 1082 is installed in the inner cylinder space 1026 instead of a combustion burner. The catalyst burner 1082 comprises a porous internal tube 1084 to introduce fuel gas and air, a mesh external tube 1086 surrounding the internal tube, and a combustion catalyst layer 1088 between these tubes.

Fuel gas burnt in the combustion catalyst layer 1088 heats the catalyst burner 1082 to a uniform temperature. The heated catalyst burner 1082 heats the reforming catalyst layer 1030 in an even manner, with almost uniform heat flux.

A specific example for the seventh aspect of the invention will be described in the following.

(1) Apparatus Structure

FIG. 42 shows a hydrogen producing apparatus 1010. The reaction apparatus in FIG. 42 has an effective length of 600 mm and is structured as: inner cylinder 1020 (internal diameter 100 mm); intermediate cylinder 1018 (internal diameter 118 mm); outer cylinder 1016 (internal diameter 175 mm); outermost outer cylinder 1014 (internal diameter 190 mm); hydrogen-permeable tube 832 (external diameter 20 mm); and sweep gas tube 1034 (external diameter 6 mm). Fifteen upright hydrogen-permeable tubes 32 are installed in the first catalyst layer of the second annulus 1028 in an equidistant manner around the circumference.

Reforming catalyst A is a nickel based catalyst (average particle size: 2 mm in diameter). The furnace comprises an upright burner 1044, as shown in FIG. 42. The outermost outer cylinder 1014 is insulated with 200 mm thick rockwool to reduce heat discharge to the external atmosphere.

(2) Operating Conditions

Supply of raw material gas (town gas 13A) on the reformer side: 32.1 mole/h

Steam supplied in raw material gas on the reformer side: 1.35 kg/h

Steam for reforming/raw material gas on the reformer side (mole ratio): 2.0

Reforming reaction temperature: 500° C.

Reforming reaction pressure: 6.03 kgf/cm²-abs.

Quantity of sweep gas (steam) supplied: 1.41 kg/h
Sweep gas pressure: 1.22 kgf/cm$^2$-abs (3) Hydrogen Generation Test Results A reaction under these conditions produces 123.0 mole/h of hydrogen, accompanied by sweep gas. CO impurity in the hydrogen is less than 1 ppm. The conversion efficiency of hydrocarbons in the raw material gas is about 90%.

In contrast, a conventional reformer which does not use a hydrogen-permeable tube is hampered by chemical equilibrium, based on the relationship between operating temperature and pressure, resulting in a conversion efficiency of 24% at this reaction temperature and pressure.

Based on the above structures, the seventh aspect of the invention facilitates industrial-scale hydrogen production, economically producing high purity hydrogen, and has the following advantages:

(a) The upward facing flame of the upright burner improves the stability of the flame and enables the construction of a larger hydrogen producing apparatus. This structure also supports significant changes in processing quantity in one large apparatus.

(b) The lower section of the hydrogen-permeable tube is fixed, while its upper part is free. This reduces catalyst powdering caused by friction between the hydrogen-permeable tube and the reforming catalyst layer occurring as a result of thermal expansion. This structure also eliminates destruction of the reforming catalyst caused by pressure in the lower part of the layer which occurs when the upper section of the hydrogen-permeable tube is fixed. It is therefore possible to use reforming catalysts of relatively low strength and construct larger apparatuses by making the reforming catalyst layer taller.

This hydrogen producing apparatus according to the seventh aspect of the invention has the above-mentioned advantages over conventional apparatuses with drooping combustion burners. In addition to the above mentioned advantages, the seventh aspect of the invention offers the following benefits which are common with corresponding apparatuses with drooping combustion burners.

(c) The structure is simple and compact, comprising multiple layered cylinders. The apparatus can be constructed with a small quantity of materials.

(d) The heat capacity of the apparatus is small, as it is far lighter in weight than conventional multiple parallel reaction tube systems. The operation of the apparatus can be started and stopped quickly, and it has an excellent response to load changes.

(e) The catalyst layer can be more uniformly heated, as heat is applied from both sides. Radial thermal flux distribution is more uniform because of the structure of layered cylinders with a central furnace. This prevents the development of hot spots where temperature may exceed the limit the hydrogen-permeable tubes can withstand.

(f) The second catalyst layer generates hydrogen but does not separate or collect it through a hydrogen-permeable tube. As a result the partial pressure of hydrogen in the generated gas rises at the outlet of the second catalyst layer, that is, at the inlet of the first catalyst layer. The consequent substance transfer propulsion force for the separation and collection of hydrogen by the hydrogen-permeable tube in the first catalyst layer enables the permeation area to be reduced as a result of the increased separation speed.

(g) The generated hydrogen collection efficiency is improved by the counter-flow substance transfer between the sweep gas in the hydrogen-permeable tube and the reformed gas in the catalyst layer.

(h) Separating and collecting the hydrogen through the hydrogen-permeable tube shifts the chemical equilibrium to the advantage of hydrogen production. The reforming temperature can therefore be reduced 150°–200{C. below that of conventional systems.

(i) The lower reaction temperature enables the use of inexpensive materials with lower heat resistance characteristics, thereby reducing construction costs.

(j) Radiating bodies ensure the catalyst layer to be heated with a uniform temperature distribution without any risk of overheating.

We claim:

1. A hydrogen producing apparatus in which hydrogen produced from a steam reforming reaction in a fixed bed catalyst is separated and collected by passing through a partitioning wall having selective permeability for hydrogen, said apparatus comprising:

an outer tubular cylinder having a closed end wall at one end thereof;

an intermediate tubular cylinder in said outer cylinder in coaxial spaced relationship thereto to form an outer annulus therebetween;

an inner tubular cylinder in said intermediate cylinder in coaxial spaced relationship therewith to form an inner annulus therebetween and having an inner hollow chamber;

heating means disposed substantially in said inner hollow chamber in said inner cylinder for producing a temperature in said hollow chamber and inner annulus sufficiently high to convert process gas in said inner annulus in the presence of a reforming catalyst into hydrogen, said intermediate and inner cylinders being joined together at one end of each in spaced relationship to said closed end wall of said outer cylinder to form a closed end portion of said inner annulus, and so that said outer annulus is in communication with said inner hollow chamber in said inner cylinder;

a catalyst layer of reforming catalyst in said inner annulus;

a source of sweep gas;

at least one hydrogen-permeable tube having hydrogen permeability disposed in said catalyst layer in said inner annulus and having an open end communicating with said source of sweep gas and a closed end adjacent said closed end portion of said inner annulus;

a source of process feed gas;

process feed gas inlet means for conducting process feed gas from said source thereof to said inner annulus, said process feed gas means comprising means for introducing said process feed gas adjacent said closed end portion of said inner annulus so that said process feed gas flows upwardly in said reforming catalyst layer;

process feed gas outlet means communicating with said inner annulus for discharging said feed gas after separation of hydrogen therefrom; and a sweep gas tube disposed within said at least one hydrogen-permeable tube and having an open inlet end proximate said closed end of said at least one hydrogen-permeable tube and an outlet end;

so that said heating means produces said high temperature in said hollow chamber and said inner annulus, process feed gas introduced into said inner annulus flows through said catalyst layer and is converted into hydrogen at said high temperature, said process feed gas and sweep gas flow at least partly in counter-flowing relation with respect to each other and said hydrogen permeates said at least one hydrogen-permeable tube and is selectively separated thereby and flows with said sweep gas through said open end of said sweep gas tube, through said sweep gas tube and out of said apparatus through said outlet end of said sweep gas tube.

2. The hydrogen producing apparatus as claimed in claim 1 wherein:

said outer cylinder, intermediate cylinder and inner cylinder are upright;

said inner cylinder has an upper end;

a ceiling wall is provided on said upper end of said inner cylinder;

said heating means comprises a drooping combustion burner located on said ceiling wall of said inner cylinder so that said burner is directed downwardly into said hollow chamber in said inner cylinder;

said at least one hydrogen-permeable tube comprises a plurality of hydrogen-permeable tubes arranged in substantially circular spaced relationship in said inner annulus, each hydrogen-permeable tube comprising an outer hydrogen-permeable metal membrane having an inner wall, and an inorganic porous layer on said inner wall of said metal membrane;

said sweep gas tube comprises a sweep gas tube in spaced relationship within said inorganic porous layer in each hydrogen-permeable tube; and an annular sweep gas inlet space is defined between said hydrogen-permeable tube and said sweep gas tube and has an upper portion coinciding with said open end of each of said hydrogen-permeable tubes so that sweep gas introduced from said source thereof flows through said annular sweep gas inlet space downwardly between said sweep gas tube and said inorganic porous layer of each of said hydrogen-permeable tubes, upwardly through said inlet end of said sweep gas tubes and through said sweep gas tubes and out of said apparatus through said outlet ends of said sweep gas tubes at a top portion thereof.

3. The apparatus as claimed in claim 2 wherein:

said hydrogen-permeable metal membrane comprises a non-porous thin film made of an alloy containing at least one element selected from the group consisting of Pd, Ni and V.

4. The apparatus as claimed in claim 2 and further comprising:

at least one hollow cylindrical radiating body disposed in said inner hollow chamber in said inner cylinder to surround a flame of said combustion burner.

5. The apparatus as claimed in claim 4 wherein:

said at least one radiating body has a porous wall.

6. The apparatus as claimed in claim 4, wherein said at least one radiating body comprises:

an inner cylindrical radiating body in spaced relationship within an outer cylindrical radiating body to provide an annular space therebetween, said inner and outer cylindrical radiating bodies being supported in said inner chamber so that combustion gas from said combustion burner flows downward in said inner cylindrical radiating body, then upward in said annular space between said inner and outer cylindrical radiating bodies, and then downward in an annular space between said outer cylindrical radiating body and said inner cylinder.

7. The apparatus as claimed in claim 5 wherein:

said at least one radiating body is cylindrical;

an upper end is provided on said at least one radiating body in spaced relationship to said ceiling wall of said inner cylinder; and said at least one radiating body has a lower part with at least one opening therein communicating with said inner hollow chamber adjacent said closed end of said outer cylinder;

so that combustion gas from said combustion burner flows downward inside said radiating body, through said at least one opening in said radiating body, and a part thereof flows upward in an annular space between said inner cylinder and said at least one radiating body and through said space between said upper end of said at least one radiating body and said ceiling wall and then downward again inside said at least one radiating body, the combustion gas circulating inside and outside said radiating body.

8. The apparatus as claimed in claim 1 wherein:

said heating means comprises a columnar catalytic combustor disposed in said inner hollow chamber in said inner cylinder.

9. The apparatus as claimed in claim 2 and further comprising:

a cylindrical partitioning wall in said inner annulus in radial spaced relationship to said at least one hydrogen-permeable tube and said intermediate cylinder and having a lower end in adjacent spaced relationship to said closed end portion of said inner annulus, said catalyst layer being disposed between said partitioning wall and said at least one hydrogen-permeable tube;

so that said process feed gas flows from said process feed gas inlet means through said space between said intermediate cylinder and said partitioning wall, through said space between said lower end of said partitioning wall and said closed end portion of said inner annulus, and then through said catalyst layer.

10. The apparatus as claimed in claim 9 wherein:

said hydrogen-permeable metal membrane comprises a non-porous thin film made of an alloy containing at least one element selected from the group consisting of Pd, Ni and V.

11. The apparatus as claimed in claim 9 and further comprising:

at least one hollow cylindrical radiating body disposed in said inner hollow chamber in said inner cylinder to surround a flame of said combustion burner.

12. The apparatus as claimed in claim 11 wherein:

said at least one radiating body has a porous wall.

13. The apparatus as claimed in claim 11, wherein said at least one radiating body comprises:

an inner cylindrical radiating body in spaced relationship within an outer cylindrical radiating body to provide an annular space therebetween, said inner and outer cylindrical radiating bodies being supported in said inner chamber so that combustion gas from said combustion burner flows downward in said inner cylindrical radiating body, then upward in said annular space between said inner and outer cylindrical radiating bodies, and then downward in an annular space between said outer cylindrical radiating body and said inner cylinder.

14. The apparatus as claimed in claim 9 wherein said at least one radiating body is cylindrical;

an upper end is provided on said at least one radiating body in spaced relationship to said ceiling wall of said inner cylinder; and said at least one radiating body has a lower part with at least one opening therein communicating with said inner hollow chamber adjacent said closed end of said outer cylinder;

so that combustion gas from said combustion burner flows downward inside said radiating body, through said at least one opening in said radiating body, and a part thereof flows upward in an annular space between said inner cylinder and said at least one radiating body and through said space between said upper end of said at least one radiating body and said ceiling wall and then downward again inside said at least one radiating body, the combustion gas circulating inside and outside said radiating body.

15. The apparatus as claimed in claim 9 wherein:

said heating means comprises a columnar catalytic combustor disposed in said inner hollow chamber in said inner cylinder.

16. The apparatus as claimed in claim 2 and further comprising:

a cylindrical partitioning wall in said inner annulus between said inner tubular cylinder and said at least one hydrogen-permeable tube and having a lower end in adjacent space relationship with respect to said closed end portion of said inner annulus.

17. The apparatus as claimed in claim 16 wherein:

said hydrogen-permeable metal membrane comprises a non-porous thin film made of an alloy containing at least one element selected from the group consisting of Pd, Ni and V.

18. The apparatus as claimed in claim 17 and further comprising:

at least one hollow cylindrical radiating body disposed in said inner hollow chamber in said inner cylinder to surround a flame of said combustion burner.

19. The apparatus as claimed in claim 18 wherein:

said at least one radiating body has a porous wall.

20. The apparatus as claimed in claim 18, wherein said at least one radiating body comprises:

an inner cylindrical radiating body in spaced relationship within an outer cylindrical radiating body to provide an annular space therebetween, said inner and outer cylindrical radiating bodies being supported in said inner chamber so that combustion gas from said combustion burner flows downward in said inner cylindrical radiating body, then upward in said annular space between said inner and outer cylindrical radiating bodies, and then downward in an annular space between said outer cylindrical radiating body and said inner cylinder.

21. The apparatus as claimed in claim 18, wherein:

said at least one radiating body is cylindrical;

an upper end is provided on said at least one radiating body in spaced relationship to said ceiling wall of said inner cylinder; and said at least one radiating body has a lower part with at least one opening therein communicating with said inner hollow chamber adjacent said closed end of said outer cylinder;

so that combustion gas from said combustion burner flows downward inside said radiating body, through said at least one opening in said radiating body, and a part thereof flows upward in an annular space between said inner cylinder and said at least one radiating body and through said space between said upper end of said at least one radiating body and said ceiling wall and then downward again inside said at least one radiating body, the combustion gas circulating inside and outside said radiating body.

22. The apparatus as claimed in claim 16 wherein:

said heating means comprises a columnar catalytic combustor disposed in said inner hollow chamber in said inner cylinder.

23. A hydrogen producing apparatus in which hydrogen produced from a steam reforming reaction in a fixed bed catalyst is separated and collected by passing through a partitioning wall having selective permeability for hydrogen, said apparatus comprising:

an outer tubular cylinder having a closed end wall at one end thereof;

an intermediate tubular cylinder in said outer cylinder in coaxial spaced relationship thereto to form an outer annulus therebetween;

an inner tubular cylinder in said intermediate cylinder in coaxial spaced relationship therewith to form an inner annulus therebetween and having an inner hollow chamber;

heating means disposed substantially in said inner hollow chamber in said inner cylinder for producing a temperature in said hollow chamber and inner annulus sufficiently high to convert process gas in said inner annulus in the the presence of a reforming catalyst into hydrogen, said intermediate and inner cylinders being joined together at one end of each in spaced relationship to said closed end wall of said outer cylinder to form a closed end portion of said inner annulus, and so that said outer annulus is in communication with said inner hollow chamber in said inner cylinder;

a catalyst layer of reforming catalyst in said inner annulus;

at least one hydrogen-permeable tube having hydrogen permeability disposed in said catalyst layer in said inner annulus and having a closed end proximate said closed end portion of said inner annulus and an outlet end;

a source of process feed gas;

process feed gas inlet means for conducting process feed gas from said source thereof to said inner annulus, said process feed gas means comprising means for introducing said process feed gas adjacent said closed end portion of said inner annulus so that said process feed gas flows upwardly in said reforming catalyst layer; and process feed gas outlet means communicating with said inner annulus for discharging said feed gas after separation of hydrogen therefrom; and a suction pump having an inlet connectable to said outlet end of said at least one hydrogen-permeable tube;

so that said heating means produces said high temperature in said hollow chamber and said inner annulus, process gas introduced into said inner annulus flows through said catalyst layer and is converted into hydrogen at said high temperature, and said hydrogen permeates said at least one hydrogen-permeable tube and is selectively separated thereby and is conducted out of said apparatus through said outlet end of said at least one hydrogen-permeable tube by said suction pump.

24. A hydrogen producing apparatus in which hydrogen produced from a steam reforming reaction in a fixed bed catalyst is separated and collected by passing through a partitioning wall having selective permeability for hydrogen, said apparatus comprising:

an upright outer tubular cylinder having a closed bottom end wall;

an upright intermediate tubular cylinder in said outer cylinder in coaxial spaced relationship therewith to form an outer annulus therebetween;

an upright inner tubular cylinder in said intermediate cylinder in coaxial spaced relationship therewith to form an inner annulus therebetween and having an inner hollow chamber, an upper end portion of said inner hollow chamber and a ceiling wall in said upper end portion;

a drooping combustion burner heating means on said ceiling wall for producing a temperature in said hollow chamber and inner annulus sufficiently high to convert process gas in said inner annulus in the presence of a reforming catalyst into hydrogen;

means for joining said intermediate and inner cylinders together at the lower ends thereof in spaced relationship to said closed end wall of said outer cylinder to form a closed lower end portion of said inner annulus, and so that said outer annulus is in communication with said inner hollow chamber in said inner cylinder;

a catalyst layer of reforming catalyst in said inner annulus;

a double-walled hydrogen-permeable cylinder in said catalyst in said inner annulus in coaxial spaced relationship with said intermediate and inner cylinders and comprising coaxial spaced outer and inner walls and an annular bottom wall connected to said outer and inner walls to form a further annulus therebetween closed at the lower end thereof, said walls comprising an outer hydrogen-permeable metal membrane on an inorganic porous layer;

an outlet end for said hydrogen-permeable cylinder communicating with said further annulus therein;

a source of process feed gas;

process feed gas inlet means for conducting process feed gas from said source thereof to said inner annulus;

process feed gas outlet means communicating with said inner annulus for discharging said feed gas after separation of hydrogen therefrom; and a source of sweep gas; and at least one sweep gas tube disposed within said further annulus in said double-walled hydrogen-permeable cylinder and having an inlet end connectable to said source of sweep gas and an outlet end proximate said annular bottom wall of said hydrogen-permeable cylinder;

so that said heating means produces said high temperature in said hollow chamber and said inner annulus, process gas introduced into said inner annulus flows through said catalyst layer and is converted into hydrogen at said high temperature, and said hydrogen permeates said double-walled hydrogen-permeable cylinder and is selectively separated thereby and flows with said sweep gas through said further annulus and out of said apparatus through said outlet end of said hydrogen-permeable cylinder.

25. The apparatus as claimed in claim 24 wherein:
said hydrogen-permeable metal membrane comprises a non-porous thin film made of an alloy containing at least one element selected from the group consisting of Pd, Ni and V.

26. A hydrogen producing apparatus in which hydrogen produced from a steam reforming reaction in a fixed bed catalyst is separated and collected by passing through a partitioning wall having selective permeability for hydrogen, said apparatus comprising:

an upright outer tubular cylinder having a closed bottom end wall;

an upright intermediate tubular cylinder in said outer cylinder in coaxial spaced relationship therewith to form an outer annulus therebetween;

an upright inner tubular cylinder in said intermediate cylinder in coaxial spaced relationship therewith to form an inner annulus therebetween and having an inner hollow chamber, an upper end portion of said inner hollow chamber and a ceiling wall in said upper end portion;

a drooping combustion burner heating means on said ceiling wall for producing a temperature in said hollow chamber and inner annulus sufficiently high to convert process gas in said inner annulus in the presence of a reforming catalyst into hydrogen;

means for joining said intermediate and inner cylinders together at the lower ends thereof in spaced relationship to said closed end wall of said outer cylinder to form a closed lower end portion of said inner annulus, and so that said outer annulus is in communication with said inner hollow chamber in said inner cylinder;

a reforming catalyst in said inner annulus;

a double-walled hydrogen-permeable cylinder in said inner annulus in coaxial spaced relationship with said intermediate and inner cylinders and comprising coaxial spaced outer and inner walls and an annular bottom wall connected to said outer and inner walls to form a further annulus therebetween closed at the lower end thereof, said walls comprising an outer hydrogen-permeable metal membrane on an inorganic porous layer;

an inner catalyst layer of reforming catalyst between said inner wall and said inner cylinder;

an outer catalyst layer of reforming catalyst between said outer wall and said outer cylinder, and communicating with said inner catalyst layer in said closed lower end portion of said inner annulus;

a source of sweep gas;

an upper open end for said hydrogen-permeable cylinder communicating with said source of sweep gas;

a source of process feed gas;

process feed gas inlet means for conducting process feed gas from said source thereof to said inner catalyst layer;

process feed gas outlet means communicating with said inner annulus for discharging said feed gas after separation of hydrogen therefrom;

at least one sweep gas tube disposed within said further annulus in said double-walled hydrogen-permeable cylinder and having a lower open end proximate said annular bottom wall of said hydrogen-permeable cylinder and an upper outlet end;

an annular pipe header proximate said annular bottom wall in said further annulus and connected to said lower open end of said at least one sweep gas tube; and a plurality of inlet holes in said pipe header;

so that said heating means produces said high temperature in said hollow chamber and said inner annulus, process feed gas introduced into said inner catalyst layer flows downwardly through said inner catalyst layer and upwardly through said outer catalyst layer and is converted into hydrogen at said high temperature, and said hydrogen permeates said double-walled hydrogen-permeable cylinder and is selectively separated thereby and flows with said sweep gas through said further annulus, through said inlet holes in said pipe header, through said pipe header and sweep gas tube and out of said apparatus through said upper outlet end of said sweep gas tube.

27. A hydrogen producing apparatus in which hydrogen produced from a steam reforming reaction in a fixed bed catalyst is separated and collected by passing through a partitioning wall having selective permeability for hydrogen, said apparatus comprising:

an upright outer tubular cylinder having a closed bottom end wall;

an upright intermediate tubular cylinder in said outer cylinder in coaxial spaced relationship therewith to form an outer annulus therebetween;

an upright inner tubular cylinder in said intermediate cylinder in coaxial spaced relationship therewith to form an inner annulus therebetween and having an inner hollow chamber, an upper end portion of said inner hollow chamber and a ceiling wall in said upper end portion;

a drooping combustion burner heating means on said ceiling wall for producing a temperature in said hollow chamber and inner annulus sufficiently high to convert process gas in said inner annulus in the presence of a reforming catalyst into hydrogen;

means for joining said intermediate and inner cylinders together at the lower ends thereof in spaced relationship to said closed end wall of said outer cylinder to form a closed lower end portion of said inner annulus, and so that said outer annulus is in communication with said inner hollow chamber in said inner cylinder;

a catalyst layer of reforming catalyst in said inner annulus;

a double-walled hydrogen-permeable cylinder in said catalyst in said inner annulus in coaxial spaced relationship with said intermediate and inner cylinders and comprising coaxial spaced outer and inner walls and an annular bottom wall connected to said outer and inner walls to form a further annulus therebetween closed at the lower end thereof, each of said walls comprising an outer hydrogen-permeable metal membrane on an inorganic porous layer;

an outlet end for said hydrogen-permeable cylinder communicating with said further annulus therein;

a source of process feed gas;

process feed gas inlet means for conducting process feed gas from said source thereof to said inner annulus;

process feed gas outlet means communicating with said inner annulus for discharging said feed gas after separation of hydrogen therefrom; and a source of sweep gas; and a cylindrical partitioning wall disposed within said further annulus in said double-walled hydrogen-permeable cylinder and having a lower end in adjacent spaced relationship to said annular bottom wall of said hydrogen-permeable cylinder, said partitioning wall dividing said inner annulus into two coaxial annular sweep gas flow channels;

so that said heating means produces said high temperature in said hollow chamber and said inner annulus, process gas introduced into said inner annulus flows through said catalyst layer and is converted into hydrogen at said high temperature, and said hydrogen permeates said double-walled hydrogen-permeable cylinder and is selectively separated thereby and flows with said sweep gas through said two flow channels and out of said apparatus through said outlet end of said hydrogen-permeable cylinder.

28. A hydrogen producing apparatus in which hydrogen produced from a steam reforming reaction in a fixed bed catalyst is separated and collected by passing through a partitioning wall having selective permeability for hydrogen, said apparatus comprising:

an upright outer tubular cylinder having a closed bottom end wall;

an upright intermediate tubular cylinder in said outer cylinder in coaxial spaced relationship therewith to form an outer annulus therebetween;

an upright inner tubular cylinder in said intermediate cylinder in coaxial spaced relationship therewith to form an inner annulus therebetween and having an inner hollow chamber, an upper end portion of said inner hollow chamber and a ceiling wall in said upper end portion;

a drooping combustion burner heating means on said ceiling wall for producing a temperature in said hollow chamber and inner annulus sufficiently high to convert process gas in said inner annulus in the presence of a reforming catalyst into hydrogen;

means for joining said intermediate and inner cylinders together at the lower ends thereof in spaced relationship to said closed end wall of said outer cylinder to form a closed lower end portion of said inner annulus, and so that said outer annulus is in communication with said inner hollow chamber in said inner cylinder;

a catalyst layer of reforming catalyst in said inner annulus;

a double-walled hydrogen-permeable cylinder in said catalyst in said inner annulus in coaxial spaced relationship with said intermediate and inner cylinders and comprising coaxial spaced outer and inner walls and an annular bottom wall connected to said outer and inner walls to form a further annulus therebetween closed at the lower end thereof, said walls comprising an outer hydrogen-permeable metal membrane on an inorganic porous layer;

an outlet end for said hydrogen-permeable cylinder communicating with said further annulus therein;

a source of process feed gas;

process feed gas inlet means connected to said inner annulus for conducting process feed gas from said source thereof to said inner annulus; and process feed gas outlet means communicating with said inner annulus for discharging said feed gas after separation of hydrogen therefrom; and suction pump means operatively connected to said outlet end of said double-walled hydrogen-permeable cylinder for drawing hydrogen from said further annulus;

so that said heating means produces said high temperature in said hollow chamber and said inner annulus, process feed gas introduced into said inner annulus flows through said catalyst layer and is converted into hydrogen at said high temperature, and said hydrogen permeates said double-walled hydrogen-permeable cylinder and is selectively separated thereby and flows through said further annulus and out of said apparatus through said outlet end of said hydrogen-permeable cylinder and said suction pump.

29. A hydrogen producing apparatus in which hydrogen produced from a steam reforming reaction in a fixed bed catalyst is separated and collected by passing through a partitioning wall having selective permeability for hydrogen, said apparatus comprising:

an upright outer tubular cylinder having a closed end wall at one end thereof;

an upright intermediate tubular cylinder in said outer cylinder in coaxial spaced relationship thereto to form an outer annulus therebetween;

an upright inner tubular cylinder in said intermediate cylinder in coaxial spaced relationship therewith to form an inner annulus therebetween and having an inner hollow chamber and an upper end;

a ceiling wall on said upper end of said inner cylinder;

drooping combustion burner heating means located on said ceiling wall so that said burner is directed downwardly into said inner hollow chamber in said inner cylinder for producing a temperature in said hollow chamber and inner annulus sufficiently high to convert process gas in said inner annulus in the presence of a reforming catalyst into hydrogen, said intermediate and inner cylinders being joined together at one end of each in spaced relationship to said closed end wall of said outer cylinder to form a closed end portion of said inner annulus, and so that said outer annulus is in communication with said inner hollow chamber in said inner cylinder;

a catalyst layer of reforming catalyst in said inner annulus;

a plurality of hydrogen-permeable tubes having hydrogen permeability disposed in said catalyst layer in said inner annulus in substantially circular spaced relationship, each hydrogen-permeable tube having a closed end adjacent said closed end portion of said inner annulus and comprising an outer hydrogen-permeable metal membrane having an inner wall, and an inorganic porous layer on said inner wall of said metal membrane;

a source of process feed gas;

process feed gas inlet means for conducting process feed gas from said source thereof to said inner annulus;

process feed gas outlet means communicating with said inner annulus for discharging said feed gas after separation of hydrogen therefrom;

a cylindrical partitioning wall in said inner annulus in radial spaced relationship to and between said hydrogen-permeable tubes and said intermediate cylinder and having a lower end in adjacent spaced relationship to said closed end portion of said inner annulus and an upper end defining with an upper portion of said intermediate cylinder said process feed gas inlet means, said catalyst layer being disposed between said partitioning wall and said hydrogen-permeable tubes; and suction pump means operatively connected to said hydrogen-permeable tubes for withdrawing separated hydrogen therefrom;

so that said heating means produces said high temperature in said hollow chamber and said inner annulus, process feed gas introduced into said inner annulus through said inlet means therefor flows through said space between said intermediate cylinder and said partitioning wall, through said space between said lower end of said partitioning wall, through said closed end portion of said inner annulus and through said catalyst layer, said hydrogen permeates said hydrogen-permeable tubes and is selectively separated thereby and flows through said hydrogen-permeable tubes and out of said apparatus through said suction pump means.

30. A hydrogen producing apparatus in which hydrogen produced from a steam reforming reaction in a fixed bed catalyst is separated and collected by passing through a partitioning wall having selective permeability for hydrogen, said apparatus comprising:

an upright outer tubular cylinder having a closed end wall at one end thereof;

an upright intermediate tubular cylinder in said outer cylinder in coaxial spaced relationship thereto to form an outer annulus therebetween;

an upright inner tubular cylinder in said intermediate cylinder in coaxial spaced relationship therewith to form an inner annulus therebetween and having an inner hollow chamber and an upper end;

a ceiling wall on said upper end of said inner cylinder;

drooping combustion burner heating means located on said ceiling wall so that said burner is directed downwardly into said inner hollow chamber in said inner cylinder for producing a temperature in said hollow chamber and inner annulus sufficiently high to convert process gas in said inner annulus in the presence of a reforming catalyst into hydrogen, said intermediate and inner cylinders being joined together at one end of each in spaced relationship to said closed end wall of said outer cylinder to form a closed end portion of said inner annulus, and so that said outer annulus is in communication with said inner hollow chamber in said inner cylinder;

a catalyst layer of reforming catalyst in said inner annulus;

a plurality of hydrogen-permeable tubes having hydrogen permeability disposed in said catalyst layer in said inner annulus in substantially circular spaced relationship, each hydrogen-permeable tube having a closed end adjacent said closed end portion of said inner annulus and comprising an outer hydrogen-permeable metal membrane having an inner wall, and an inorganic porous layer on said inner wall of said metal membrane;

a source of process feed gas;

process feed gas inlet means for conducting process feed gas from said source thereof to said inner annulus;

process feed gas outlet means communicating with said inner annulus for discharging said feed gas after separation of hydrogen therefrom;

a cylindrical partitioning wall in said inner annulus in radial spaced relationship to and between said hydrogen-permeable tubes and said inner cylinder and having a lower end in adjacent spaced relationship to said closed end portion of said inner annulus and an upper end defining with an upper portion of said inner cylinder said process feed gas inlet means; and suction pump means operatively connected to said hydrogen-permeable tubes for withdrawing separated hydrogen therefrom;

so that said heating means produces said high temperature in said hollow chamber and said inner annulus, process feed gas introduced into said inner annulus through said inlet means therefor flows through said space between said inner cylinder and said partitioning wall, through said space between said lower end of said partitioning wall, through said closed end portion of said inner annulus and through said catalyst layer, said hydrogen permeates said hydrogen-permeable tubes and is selectively separated thereby and flows through said hydrogen-permeable tubes and out of said apparatus through said suction pump means.

* * * * *